US012695123B1

(12) United States Patent
Bolton et al.

(10) Patent No.: US 12,695,123 B1
(45) Date of Patent: Jul. 28, 2026

(54) ELECTROLYTE ADDITIVES FOR BATTERIES

(71) Applicant: OCTET SCIENTIFIC, INC., Cleveland, OH (US)

(72) Inventors: Onas Bolton, Pepper Pike, OH (US); Emily Dickens, Chicago, IL (US); Akash Kota, Beachwood, OH (US); Mahala Hobbs, Mentor, OH (US)

(73) Assignee: OCTET SCIENTIFIC, INC.

( * ) Notice: Subject to any disclaimer, the term of this patent is extended or adjusted under 35 U.S.C. 154(b) by 0 days.

(21) Appl. No.: 19/348,631

(22) Filed: Oct. 2, 2025

Related U.S. Application Data

(60) Provisional application No. 63/892,408, filed on Oct. 2, 2025, provisional application No. 63/867,417, filed on Aug. 20, 2025.

(51) Int. Cl.
*H01M 10/42* (2006.01)
*H01M 10/26* (2006.01)

(52) U.S. Cl.
CPC ....... *H01M 10/4235* (2013.01); *H01M 10/26* (2013.01); *H01M 2300/0014* (2013.01)

(58) Field of Classification Search
CPC ............. H01M 10/26; H01M 10/4235; H01M 2300/0002; H01M 2300/0014
See application file for complete search history.

(56) References Cited

U.S. PATENT DOCUMENTS 10,586,997 B1 3/2020 Ingersoll et al.
2011/0250495 A1* 10/2011 Webber ............... H01M 10/488 429/188
2014/0134477 A1 5/2014 Kuriyama et al.
2019/0356031 A1* 11/2019 Takenaka .............. H01M 12/08
2023/0110251 A1 4/2023 Mizuno et al.
2024/0274812 A1* 8/2024 Teng ........................ H01M 4/52

FOREIGN PATENT DOCUMENTS

| | | | |
|---|---|---|---|
| CN | 115084673 | A | 9/2022 |
| CN | 116598606 | * | 8/2023 |
| CN | 116598606 | A | 8/2023 |
| CN | 117293313 | A | 12/2023 |
| CN | 117525597 | * | 2/2024 |
| CN | 117996232 | A | 5/2024 |
| CN | 118073670 | A | 5/2024 |
| DE | 000003147676 | | 6/1983 |
| WO | WO 2015/048550 | A1 | 4/2015 |
| WO | WO 2021165525 | A1 | 8/2021 |

OTHER PUBLICATIONS

English translation of CN Publication 117525597, Feb. 2024.*
English translation of CN Publication 116598606, Aug. 2023.*
Li et al., “Trace Sulfonic Acid Additives Modulate Zn2+ Transport Through SEI and Desolvation for Highly Reversible Zinc Anodes”, Research Article, Small 2025, 21, 2503002, 2503002 (1 of 12); DOI: 10.1002/smll.202503002.
Wedege et al., “Organic Redox Species in Aqueous Flow Batteries: Redox Potentials, Chemical Stability and Solubility”, Scientific Reports, 6:39101; DOI: 10.1038/srep39101.

* cited by examiner

*Primary Examiner* — Brittany L Raymond
(74) *Attorney, Agent, or Firm* — Squire Patton Boggs (US) LLP

(57) ABSTRACT

Provided herein are aqueous electrolyte compositions including an additive, wherein the additive is an aromatic dye including an electron withdrawing substituent and an electron donating substituent.

10 Claims, No Drawings

ELECTROLYTE ADDITIVES FOR BATTERIES

CROSS-REFERENCE TO RELATED APPLICATIONS

This application claims priority to U.S. Patent Application No. 63/892,408 filed Oct. 2, 2025, and U.S. Patent Application No. 63/867,417 filed Aug. 20, 2025, the entire contents of which are incorporated herein by reference in their entirety for all purposes.

FIELD

The present disclosure concerns electrolyte additives for batteries including dyes substituted with an electron donating and electron withdrawing substituents.

BACKGROUND

Electrolyte additives are used in a variety of battery types in order to improve the battery performance, thermal stability, safety, and other properties of the electrolyte.

Zinc and Iron are non-toxic, inexpensive metals that are compatible with aqueous electrolytes. Batteries based on these metals are nonflammable, widely recycled, and environmentally friendly. Zinc and Iron may evolve hydrogen gas when used in aqueous electrolyte batteries due to electrode corrosion and self-discharge. This shortens battery shelf-life, reduces cycle efficiency and battery capacity, as well as increases internal pressure, which may cause mechanical failures. What is needed are compositions, including but not limited to aqueous electrolyte additives, and methods or making and using the same to, for example, reduce hydrogen evolution and corrosion in zinc- and/or iron-batteries as well as other types of batteries that incorporate aqueous electrolytes.

Dendrite growth on zinc anodes is a major cause of failure and poor performance for zinc-batteries. Poor and/or insufficient metal deposition on metal anodes like zinc or iron are similarly sources of poor performance in zinc- and iron-based batteries. One method of controlling and mitigating if not preventing dendrite formation and poor deposition includes using battery electrolyte additive chemicals. See, e.g., US Patent Publication No. 2020/0243909, which published Jul. 30, 2020, and is titled ZINC BATTERY ELECTROLYTE ADDITIVE, the entire contents of which are herein incorporated by reference in its entirety for all purposes.

What is needed are compositions and methods that control and prevent dendrite formation in batteries that incorporate aqueous electrolytes.

SUMMARY

Provided herein are aqueous electrolyte compositions comprising an additive, wherein the additive is a dye present at 10 parts per million (ppm) to 50% weight percent (w/w). Herein, 10 ppm to 50% w/w refers to the amount of additive relative to the weight of the pure electrolyte solvent (e.g., $H_2O$). In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof, wherein the dye typically includes at least one electron donating substituent and at least one electron withdrawing substituent.

DETAILED DESCRIPTION

The following description is presented to enable one of ordinary skill in the art to make and use the instant disclosure and to incorporate it in the context of particular applications. Various modifications, as well as a variety of uses in different applications will be readily apparent to those skilled in the art, and the general principles defined herein may be applied to a wide range of embodiments. Thus, the disclosure herein is not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Definitions

As used herein, the singular forms "a," "an" and "the" include plural referents unless the context clearly dictates otherwise.

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, "dye" refers to an organic aromatic compound that absorbs certain wavelengths of visible to near-visible light and reflects certain wavelengths of visible or near-visible light. In an embodiment, the dye refers to an aromatic compound that includes at least one electron donating substituent and at least one electron withdrawing substituent. In an embodiment, electron withdrawing substituents pull electron density away from a conjugated system. In an embodiment, the electron withdrawing substituents include nitro, nitroso, diazolium, cyano, carbonyl, sulfonyl, ammonium and halide groups. In an embodiment, electron donating substituents contribute electron density to a conjugated system. The electron donating substituents can include hydroxyl, alkoxy, alkoxide, amino, and alkyl groups. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof, wherein the dye includes at least one electron donating substituent and at least one electron withdrawing substituent.

As used herein, "alkyl" refers to a monovalent and saturated hydrocarbon radical moiety. Alkyl is optionally substituted and can be linear, branched, or cyclic, i.e., cycloalkyl. Alkyl includes, but is not limited to, those having 1-10 carbon atoms, i.e., $C_{1-10}$ alkyl; Examples of alkyl moieties include, but are not limited to methyl, ethyl, n-propyl, i-propyl, n-butyl, s-butyl, t-butyl, i-butyl, a pentyl moiety, a hexyl moiety, cyclopropyl, cyclobutyl, cyclopentyl, and cyclohexyl. In one embodiment, alkyl is linear. In one embodiment, alkyl is branched.

As used herein, "alkenyl" refers to a monovalent unsaturated hydrocarbon group, in certain embodiments, having from two to six carbon atoms, which can be linear or branched, and has at least one site of olefinic unsaturation. Alkenyl can be optionally substituted.

As used herein, "alkylene" refers to a divalent moiety of an alkyl compound. Alkylene may have from 1 to 6 carbon atoms, e.g., $C_1$alkylene, $C_2$alkylene, $C_3$alkylene, $C_4$alkylene, $C_5$alkylene, or $C_6$alkylene. Examples of alkylene moieties include, but are not limited to methylene, ethylene, propylene, butylene, pentylene, and hexylene.

As used herein, "cycloalkylene" refers to a divalent moiety of a cycloalkyl compound as described herein.

As used herein, "heterocycloalkylene" refers to a divalent moiety of an heterocycloalkyl compound as described herein.

As used herein, "alkoxy" refers to the group —OR' wherein R' is alkyl. Alkoxy groups include, but are not limited to, methoxy, ethoxy, n-propoxy, isopropoxy, n-butoxy, tert-butoxy, and sec-butoxy.

As used herein, "aryl" refers to a monovalent moiety that is a radical of an aromatic compound wherein the ring atoms are carbon atoms. Aryl is optionally substituted and can be monocyclic or polycyclic, e.g., bicyclic or tricyclic. Examples of aryl moieties include, but are not limited to, those having 6 to 20 ring carbon atoms, i.e., $C_{6-20}$ aryl; 6 to 15 ring carbon atoms, i.e., $C_{6-15}$ aryl, and 6 to 10 ring carbon atoms, i.e., $C_{6-10}$ aryl. Examples of aryl moieties include, but are limited to, phenyl, naphthyl, fluorenyl, azulenyl, anthryl, phenanthryl, and pyrenyl.

As used herein, "cycloalkyl" refers to a monovalent, saturated monocyclic hydrocarbon. In some embodiments, the cycloalkyl group includes three to six carbon atoms, i.e., $C_3$-$C_6$cycloalkyl. Non-limiting examples of cycloalkyl include cyclopropyl, cyclobutyl, cyclopentyl, and cyclohexyl.

As used herein, "heteroaryl" refers to a monovalent moiety that is a radical of an aromatic compound wherein the ring atoms contain carbon atoms and at least one oxygen, sulfur, nitrogen, or phosphorus atom. Examples of heteroaryl moieties include, but are not limited to, those having 5 to 20 ring atoms; 5 to 15 ring atoms; and 5 to 10 ring atoms. Heteroaryl is optionally substituted unless explicitly stated otherwise. In certain embodiments, the heteroaryl contains 0, 1, or 2 nitrogen atoms and when 1 or 2 nitrogen atoms are present, at least 1 of the nitrogen atoms can be a quaternary nitrogen.

As used herein, "aryl$C_1$-$C_4$alkyl" refers to an $C_{1-4}$alkyl group, as used herein, substituted with an aryl group, as defined herein. "Bn" or "benzyl" refers to "$CH_2$-phenyl."

As used herein, "heterocycloalkyl" or "heterocycle" refers to a cycloalkyl in which one or more carbon atoms are replaced by heteroatoms. Suitable heteroatoms include, but are not limited to, nitrogen, oxygen, and sulfur atoms. Heterocycloalkyl is optionally substituted. Examples of heterocycloalkyl moieties include, but are not limited to, morpholinyl, piperidinyl, tetrahydropyranyl, pyrrolidinyl, imidazolidinyl, oxazolidinyl, thiazolidinyl, dioxolanyl, dithiolanyl, oxanyl, or thianyl. In certain embodiments, the heterocycloalkyl or heterocycle contains 0, 1, or 2 nitrogen atoms and when 1 or 2 nitrogen atoms are present, at least 1 of the nitrogen atoms can be a quaternary nitrogen.

As used herein, "hydroxy$C_1$-$C_4$alkyl" is an $C_{1-4}$alkyl group, as used herein, substituted with at least one hydroxyl group.

As used herein, "halogen" and "halo" refer to chloro, bromo, iodo, or fluoro.

As used herein, "optionally substituted," when used to describe a radical moiety, e.g., optionally substituted alkyl, means that such moiety is optionally bonded to one or more substituents. Examples of such substituents include, but are not limited to halo, cyano, nitro, haloalkyl, azido, epoxy, optionally substituted heteroaryl, optionally substituted heterocycloalkyl,

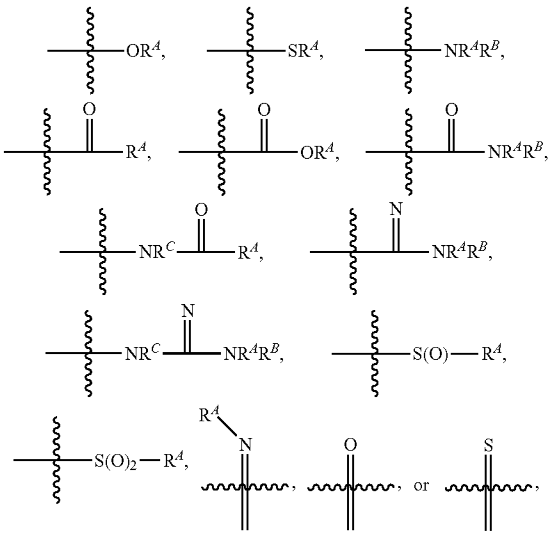

wherein $R^A$, $R^B$, and $R^C$ are, independently at each occurrence, a hydrogen atom, alkyl, alkenyl, alkynyl, aryl, alkaryl, aralkyl, heteroalkyl, heteroaryl, or heterocycloalkyl, or $R^A$ and $R^B$, together with the atoms to which they are bonded, form a saturated or unsaturated carbocyclic ring, wherein the ring is optionally substituted and wherein one or more ring atoms is optionally replaced with a heteroatom. In certain embodiments, when a radical moiety is optionally substituted with an optionally substituted heteroaryl, optionally substituted heterocycloalkyl, or optionally substituted saturated or unsaturated carbocyclic ring, the substituents on the optionally substituted heteroaryl, optionally substituted heterocycloalkyl, or optionally substituted saturated or unsaturated carbocyclic ring, if they are substituted, are not substituted with substituents which are further optionally substituted with additional substituents.

Electrolyte

Provided herein are aqueous electrolytes comprising an additive, wherein the additive is a dye present at 10 ppm to 50% w/w. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof.

In an embodiment, the dye is an aromatic compound that includes at least one electron donating substituent and at least one electron withdrawing substituent. In an embodiment, electron withdrawing substituents pull electron density away from a conjugated system. In an embodiment, the electron withdrawing substituents include nitro, nitroso, diazolium, cyano, carbonyl, sulfonyl, ammonium and halide groups. In an embodiment, electron donating substituents contribute electron density to a conjugated system. The electron donating substituents can include hydroxyl, alkoxy, alkoxide, amino, and alkyl groups. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof. In an embodiment, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof, wherein the dye includes at least one electron donating substituent and at least one electron withdrawing substituent.

In an embodiment, the aqueous electrolyte includes the additive, wherein the additive is present at a concentration of 1% to 40% w/w. In an embodiment, the additive is present at a concentration of 1% to 25% w/w. In an embodiment, the aqueous electrolyte composition set forth herein, wherein the additive is present at a concentration of 1% to 10% w/w. In an embodiment, the additive is present at a concentration of 1% to 5% w/w. In an embodiment, the additive is present at a concentration of 10 ppm to 100 ppm. In an embodiment, the additive is present at a concentration of 100 ppm to 1% w/w. In an embodiment, the additive is present at a concentration of 10 ppm, 100 ppm, 1% w/w, 4% w/w, 5% w/w, 10% w/w, 25% w/w, or 40% w/w. In an embodiment, the additive is present at a concentration of 1% w/w. In an embodiment, the additive is present at a concentration of 2% w/w. In an embodiment, the additive is present at a concentration of 3% w/w. In an embodiment, the additive is present at a concentration of 4% w/w. In an embodiment, the additive is present at a concentration of 5% w/w. In an embodiment, the additive is present at a concentration of 6% w/w. In an embodiment, the additive is present at a concentration of 7% w/w. In an embodiment, the additive is present at a concentration of 8% w/w. In an embodiment, the additive is present at a concentration of 9% w/w. In an embodiment, the additive is present at a concentration of 10% w/w. In an embodiment, the additive is present at a concentration of 11% w/w. In an embodiment, the additive is present at a concentration of 12% w/w. In an embodiment, the additive is present at a concentration of 13% w/w. In an embodiment, the additive is present at a concentration of 14% w/w. In an embodiment, the additive is present at a concentration of 15% w/w. In an embodiment, the additive is present at a concentration of 16% w/w. In an embodiment, the additive is present at a concentration of 17% w/w. In an embodiment, the additive is present at a concentration of 18% w/w. In an embodiment, the additive is present at a concentration of 19% w/w. In an embodiment, the additive is present at a concentration of 20% w/w. In an embodiment, the additive is present at a concentration of 21% w/w. In an embodiment, the additive is present at a concentration of 22% w/w. In an embodiment, the additive is present at a concentration of 23% w/w. In an embodiment, the additive is present at a concentration of 24% w/w. In an embodiment, the additive is present at a concentration of 25% w/w. In an embodiment, the additive is present at a concentration of 26% w/w. In an embodiment, the additive is present at a concentration of 27% w/w. In an embodiment, the additive is present at a concentration of 28% w/w. In an embodiment, the additive is present at a concentration of 29% w/w. In an embodiment, the additive is present at a concentration of 30% w/w. In an embodiment, the additive is present at a concentration of 31% w/w. In an embodiment, the additive is present at a concentration of 32% w/w. In an embodiment, the additive is present at a concentration of 33% w/w. In an embodiment, the additive is present at a concentration of 34% w/w. In an embodiment, the additive is present at a concentration of 35% w/w. In an embodiment, the additive is present at a concentration of 36% w/w. In an embodiment, the additive is present at a concentration of 37% w/w. In an embodiment, the additive is present at a concentration of 38% w/w. In an embodiment, the additive is present at a concentration of 39% w/w. In an embodiment, the additive is present at a concentration of 40% w/w.

In an embodiment, the aqueous electrolyte comprises two electrolyte additives.

In an embodiment, the aqueous electrolyte comprises two electrolyte additives and the concentration of each additive is between about 1 wt % and 40 wt %. In an embodiment, the aqueous electrolyte comprises two electrolyte additives and the combined concentration of the two additives is between about 1 wt % and 25 wt %.

In an embodiment, the aqueous electrolyte comprises two electrolyte additives and the concentration of each additive is between about 10 ppm to 100 ppm. In an embodiment, the aqueous electrolyte comprises two electrolyte additives and the combined concentration of the two additives is between about 10 ppm to 50 ppm. In an embodiment, the additive is present at a concentration of 100 ppm to 1 wt % w/w.

In an embodiment, the concentration of the electrolyte additive is the concentration of a single additive of Formulas I, Formula II, Formula III, Formula IV, Formula V, Formula VI, Formula VII, Formula VIII, or Formula IX, or a salt thereof, anion thereof, hydrolytic product thereof, or an electrochemical reduction product thereof. In certain embodiments, the concentration of the electrolyte additive is the concentration of a combination of additives of Formula I, Formula II, Formula III, Formula IV, Formula V, Formula VI, Formula VII, Formula VIII, and/or Formula IX, or a salt thereof, anion thereof, hydrolytic product thereof, or electrochemical reduction product thereof.

Provided herein is a battery comprising the aqueous electrolyte composition. In an embodiment the battery is a zinc battery, such as zinc-air, zinc-manganese dioxide, zinc-nickel, zinc-sulfate, zinc-carbon, zinc-chloride, zinc-bromide, zinc-iodide, zinc-silver, zinc-cerium, zinc-ion; an iron battery, such as iron-air, iron-chloride, iron-chromium, iron-zinc, iron-sodium, iron-redox; an aluminum battery, such as aluminum-air, aluminum-sulfur, aluminum-chloride, aluminum-ion; a vanadium battery, such as a vanadium-redox; a magnesium battery, such as magnesium-air, magnesium-sulfur, magnesium-sodium, magnesium-ion; a nickel battery, such as nickel-zinc, nickel-iron, nickel-hydride, nickel-cadmium; a silver battery, such as silver-zinc, silver-cadmium; or a lead battery, such as lead-sulfuric acid.

In an embodiment, the battery is a zinc battery, an iron battery, an aluminum battery, a vanadium battery, a magnesium battery, a nickel battery, a silver battery, or a lead battery. In an embodiment, the battery is a zinc-bromide battery.

In an embodiment, including any of the foregoing, set forth herein is a zinc-battery or electrochemical cell comprising at least one electrolyte additive as set forth herein. In an embodiment, the battery comprises an anode wherein the anode is a metallic element, including but not limited to, zinc. In an embodiment, the battery comprises a zinc anode.

In an embodiment, including any of the foregoing, set forth herein is an iron-battery or electrochemical cell comprising at least one electrolyte additive as set forth herein. In an embodiment, the battery comprises an anode wherein the anode is a metallic element, including but not limited to, iron. In an embodiment, the battery comprises an iron anode.

In an embodiment, including any of the foregoing, set forth herein is an electrochemical cell comprising an anode wherein the anode is a metallic element; a cathode selected from oxygen, lithium, carbon, cerium, chloride, bromide, iodide, iron, manganese dioxide, nickel, and silver oxide; and an aqueous electrolyte as set forth herein. In some examples, the anode is zinc. In an embodiment, the battery comprises an iron anode.

In an embodiment, including any of the foregoing, set forth herein is an electrochemical cell comprising a zinc anode paired with a cathode of any of the following: lithium, carbon, chloride, bromide, iron, manganese dioxide, iodide, nickel, air, and silver oxide; and at least one electrolyte additive as set forth herein. In an embodiment, the electrochemical cell comprises a chemistry selected from zinc-lithium, zinc-carbon, zinc-chloride, zinc-bromide, zinc-air, zinc-iron, zinc-manganese dioxide, zinc-iodide, zinc-nickel, or zinc-silver oxide; and at least one electrolyte additive as set forth herein.

In an embodiment, the zinc-battery comprises an aqueous electrolyte that comprises at least one additive as set forth herein and further comprises potassium hydroxide (KOH). In one embodiment, the pH of the aqueous electrolyte is about 8 to 13. In an embodiment, the pH of the aqueous electrolyte is about 10. In an embodiment, the pH of the aqueous electrolyte is above 14. In an embodiment, the concentration of KOH is 8M. In an embodiment the concentration of KOH is 6.5M. In an embodiment, the concentration of KOH is 5.5M. In an embodiment, the aqueous electrolyte that comprises at least one additive as set forth herein further comprises $ZnSO_4$ or $ZnBr_2$.

In an embodiment, including any of the foregoing, set forth herein is an electrochemical cell comprising an iron anode paired with a cathode of any of the following: chloride, bromide, iodide, chromium, and air; and at least one electrolyte additive as set forth herein. In an embodiment, the electrochemical cell comprises a chemistry selected from iron-chloride, iron-bromide, iron-iodide, iron-chromium, or iron-air; and at least one electrolyte additive as set forth herein.

In an embodiment, the iron-battery comprises an aqueous electrolyte that comprises at least one additive as set forth herein and further comprises potassium hydroxide (KOH). In an embodiment, the pH of the aqueous electrolyte is about 10 to above 14. In an embodiment, the concentration of KOH is 8M. In an embodiment, the concentration of KOH is 6.5M. In an embodiment, the concentration of KOH is 5.5M. In an embodiment, the aqueous electrolyte that comprises at least one additive as set forth herein further comprises $FeCl_2$.

In an embodiment, the additive is according to Formula I:

(I)

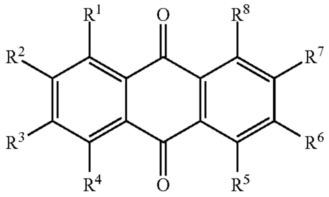

wherein $R^1$, $R^2$, $R^3$, $R^4$, $R^5$, $R^6$, $R^7$, and $R^8$ are independently selected from H, $NH_2$, $NO_2$, NO, $NHR^{40}$, $OR^{40}$, $CO_2R^{40}$, $SO_2R^{50}$, or $SO_3R^{30}$, wherein $R^{30}$ is absent, H, Na, Li, K, or combinations thereof;

wherein $R^{40}$ is absent, H, $C_{1-6}$alkyl, or $C_6$aryl-$S(O)_2$—$CH_2$—$CH_2$—O—$SO_3$—$R^{30}$;

wherein $R^{50}$ is H, $O^-$, O—$R^{30}$, $C_{1-6}$alkyl, $C_{1-6}$alkoxy, $C_{5-8}$aryl, or $C_{5-8}$heteroaryl.

In an embodiment, $R^2$, $R^3$, $R^6$, and $R^7$ are independently selected from H, OH, or $SO_3R^{30}$, wherein $R^{30}$ is absent, H, Na, Li, K, or combinations thereof; wherein $R^1$, $R^4$, $R^5$, and $R^8$ are independently selected from H, $NH_2$, or OH. In an embodiment, $R^5$ is OH. In an embodiment, at least one or more substituents selected from the group consisting of $R^2$, $R^3$, $R^6$, and $R^7$, is $SO_3R^{30}$, wherein $R^{30}$ is absent, H, Na, Li, K, or combinations thereof.

In an embodiment, the additive is according to at least one of the following structures:

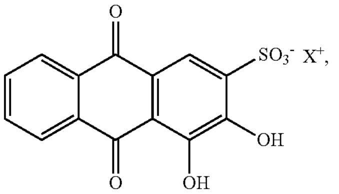

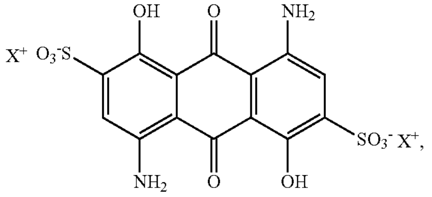

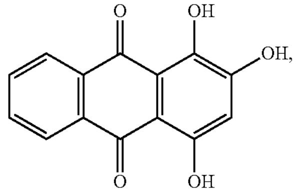

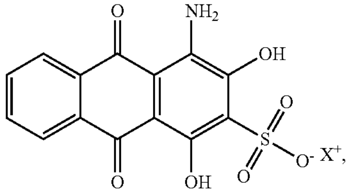

-continued

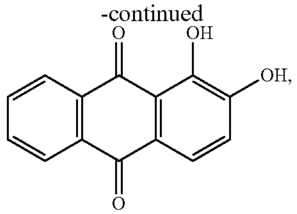

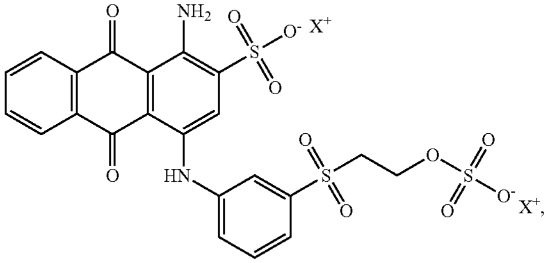

or

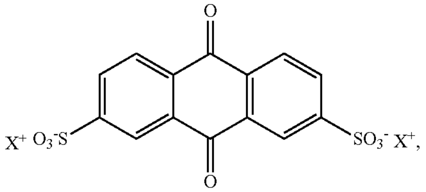

wherein $X^+$ is an alkali metal ion, alkaline metal ion, $H^+$, or combinations thereof.

In an embodiment, the additive is according to the following structure:

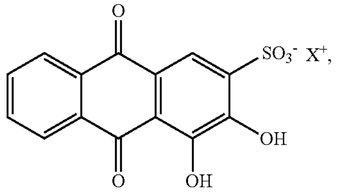

wherein $X^+$ is an alkali metal ion, alkaline metal ion, $H^+$, or combinations thereof.

In an embodiment, the additive is according to Formula II:

$$Ar^2—N{=}N—Ar^1 \quad (II)$$

wherein $Ar^1$ and $Ar^2$ are independently selected from phenyl or naphthyl, wherein the $Ar^1$, $Ar^2$, or both are optionally substituted with at least one substituent selected from a halogen, NO, $C_{1-6}$alkoxy, $C_{1-6}$alkyl, $NO_2$, $N_2^+$, $N(R^{20})_2$, $OR^{45}$, $CO_2R^{45}$, $SO_2R^{55}$, or $SO_3R^{30}$, or combinations thereof;

wherein $R^{20}$ is independently H, $C_{1-6}$alkyl, $C(O)R^{60}$, wherein $R^{60}$ is H, $C_{1-6}$alkyl, or $C_{1-6}$alkoxy;

wherein $R^{30}$ is absent, H, Na, Li, K, or combinations thereof;

wherein $R^{45}$ is absent, H, Na, Li, K, or $C_{1-6}$alkyl;

wherein $R^{55}$ is H, $O^-$, $C_{1-6}$alkyl, $C_{1-6}$alkoxy, $C_{5-8}$aryl, or $C_{5-8}$heteroaryl.

In an embodiment, $Ar^1$ and $Ar^2$ are substituted with at least one $SO_3R^{31}$.

In an embodiment, the additive is according to Formula III:

(III)

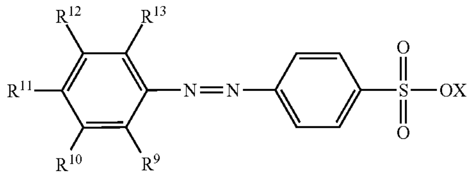

wherein $R^9$, $R^{10}$, $R^{11}$, $R^{12}$, and $R^{13}$ are independently selected from H and OH, wherein at least one of $R^9$, $R^{10}$, $R^{11}$, $R^{12}$, and $R^{13}$ is OH; wherein $X^+$ is an alkali metal ion, alkaline metal ion, $H^+$, or combinations thereof.

In an embodiment, the additive is according to one of the following structures:

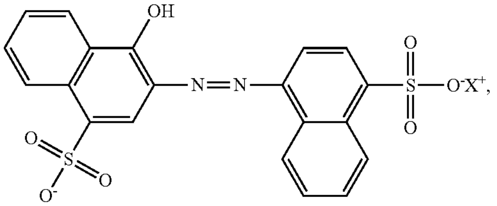

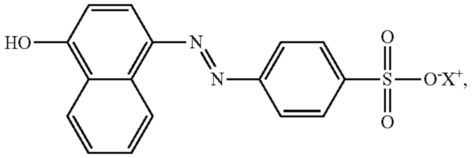

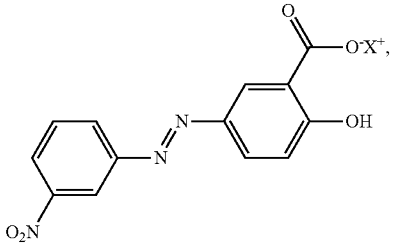

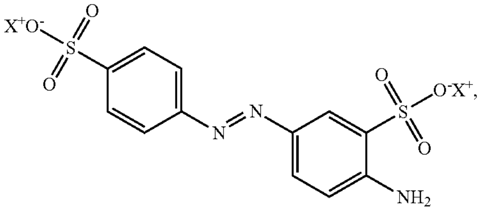

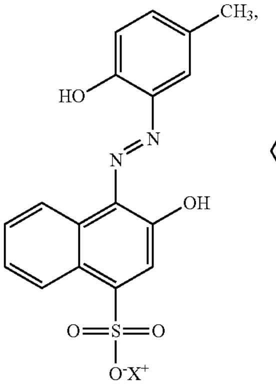

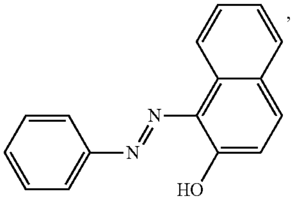

-continued
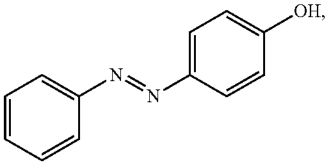
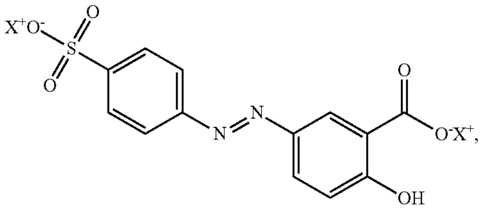
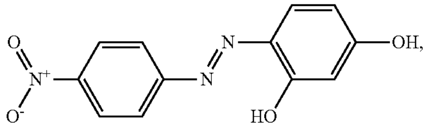
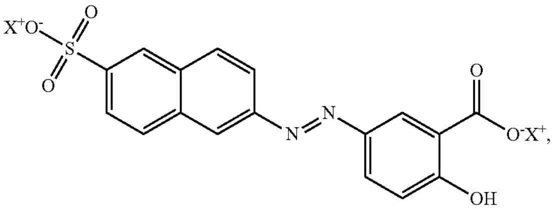
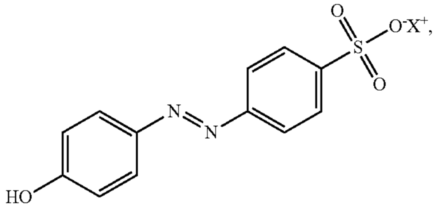
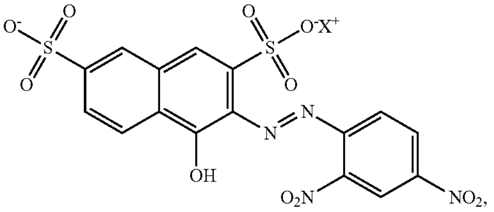
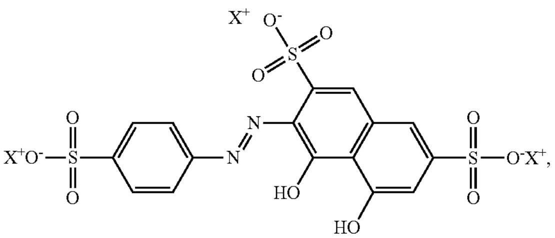
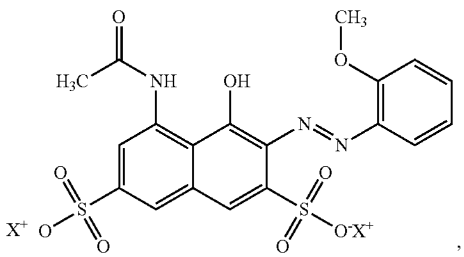
,
-continued
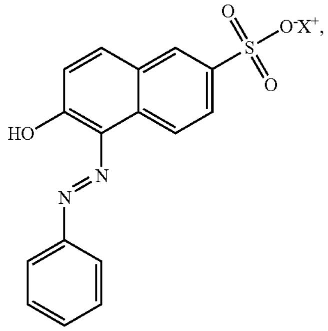
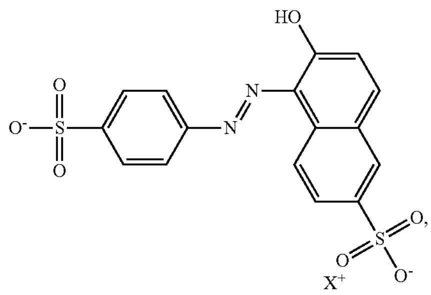
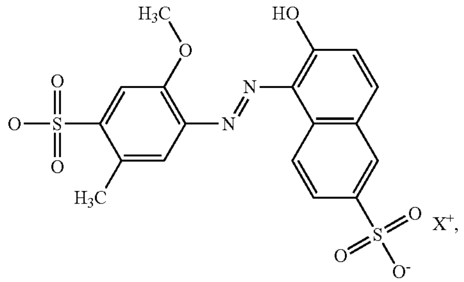
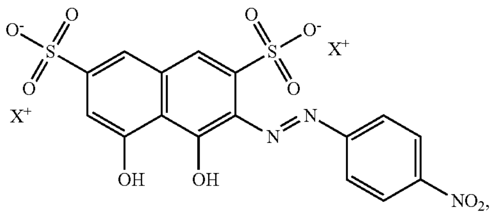
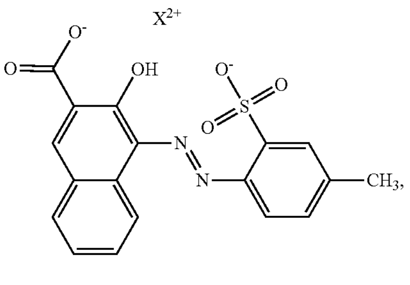
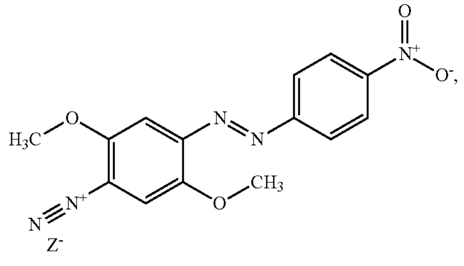

-continued

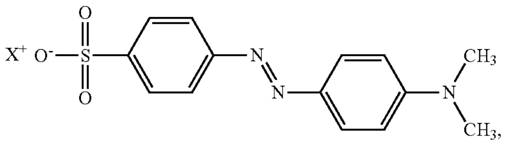

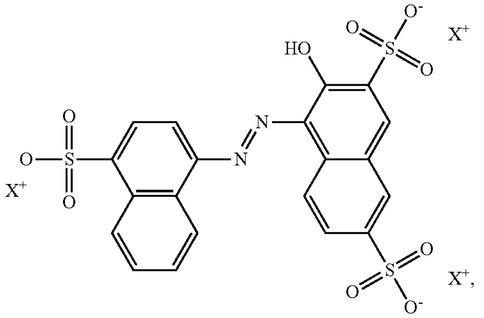

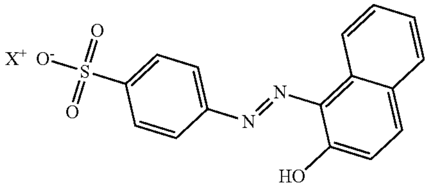

,

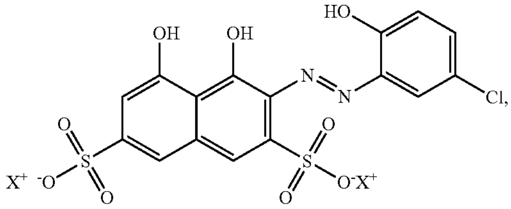

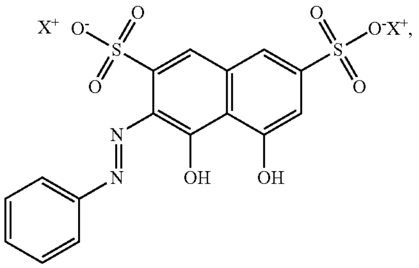

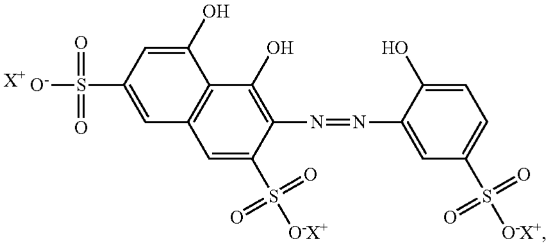

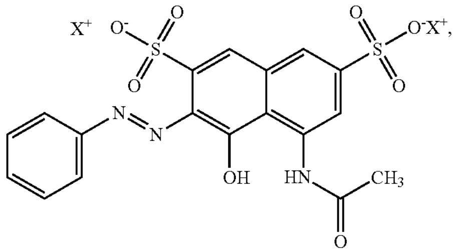

-continued

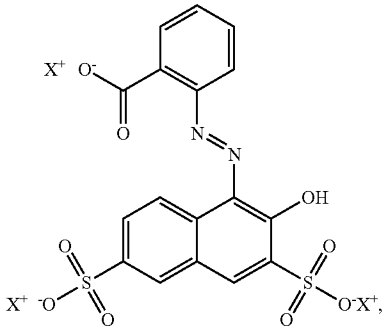

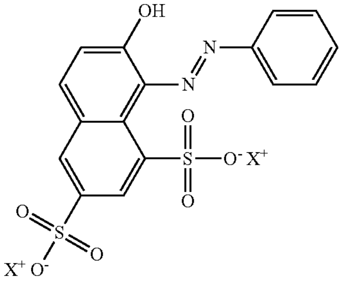

,

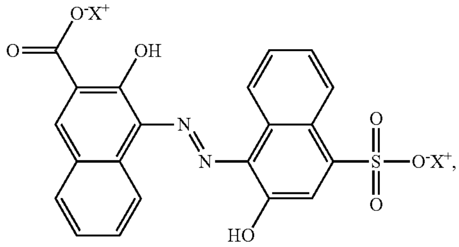

or

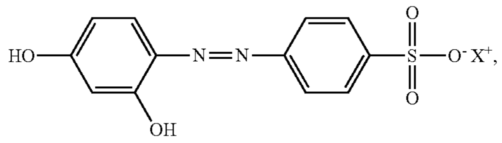

wherein $X^+$ is an alkali metal ion, alkaline metal ion, $H^+$, or combinations thereof; wherein $Z^-$ is a halide ion.

In an embodiment, the additive is according to Formula IV:

$$Ar^1—N{=}N—Ar^5—Ar^6 \quad (IV)$$

wherein $Ar^1$ is selected from phenyl or naphthyl, $Ar^5$ is pyrazolyl, and $Ar^6$ is phenyl; wherein at least one of $Ar^1$ $Ar^5$, and $Ar^6$ is substituted with at least one substituent selected from OH, $O^-$, halogen, $C_{1-6}$alkoxy, $C_{1-6}$alkyl, $NO_2$, $N_2^+$, $N(R^{21})_2$, $OR^{45}$, $CO_2R^{45}$, $SO_2R^{55}$, or $SO_3R^{30}$, or combinations thereof;

wherein $R^{20}$ is independently H, $C_{1-6}$alkyl, $C(O)R^{60}$, wherein $R^{60}$ is H, $C_{1-6}$alkyl, or $C_{1-6}$alkoxy;

wherein $R^{30}$ is absent, H, Na, Li, K, or combinations thereof;

wherein $R^{45}$ is absent, H, Na, Li, K, or $C_{1-6}$alkyl;

wherein $R^{55}$ is H, $O^-$, OX, $C_{1-6}$alkyl, $C_{1-6}$alkoxy, $C_{5-8}$aryl, or $C_{5-8}$heteroaryl, wherein X is an alkali metal, alkaline metal, H, or combinations thereof.

In an embodiment, the additive is according to the following structures:

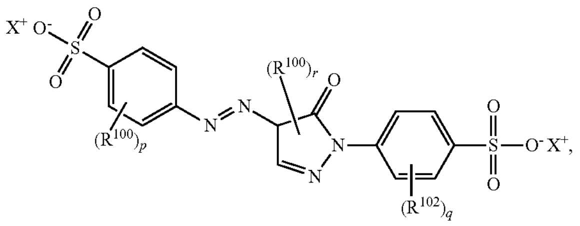

wherein $R^{100}$, $R^{101}$, or $R^{102}$, are each individually selected from OH, $O^-$, halogen, $C_{1-6}$alkoxy, $C_{1-6}$alkyl, $NO_2$, $N_2^+$, $N(R^{20})_2$, $OR^{40}$, $CO_2R^{40}$, $SO_2R^{50}$, or $SO_3R^{30}$, or combinations thereof;

wherein $R^{20}$ is independently H, $C_{1-6}$alkyl, $C(O)R^{60}$, wherein $R^{60}$ is H, $C_{1-6}$alkyl, or $C_{1-6}$alkoxy;

wherein $R^{30}$ is absent, H, Na, Li, K, or combinations thereof;

wherein $R^{40}$ is absent, H, Na, Li, K, or $C_{1-6}$alkyl;

wherein $R^{50}$ is H, $O^-$, $C_{1-6}$alkyl, $C_{1-6}$alkoxy, $C_{5-8}$aromatic, or $C_{5-8}$heteroaromatic, wherein $X^+$ is an alkali metal ion, alkaline metal ion, $H^+$, or combinations thereof; and wherein subscripts p, q, and r, are individually an integer selected from 1, 2, 3, or 4.

In an embodiment, the additive is according to the following structures:

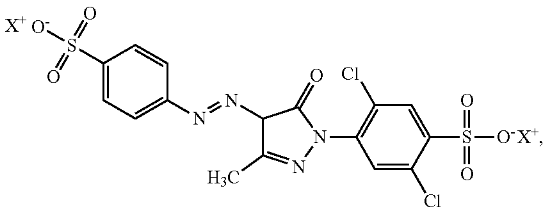

or

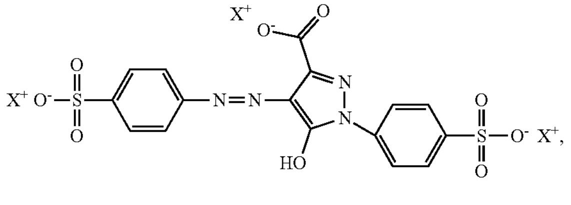

wherein $X^+$ is an alkali metal ion, alkaline metal ion, $H^+$, or combinations thereof.

In an embodiment, the additive is according to Formula V:

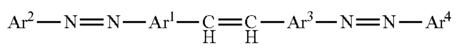

(V)

wherein $Ar^1$, $Ar^2$, $Ar^3$, and $Ar^4$ are independently selected from phenyl, naphthyl, or pyrazolyl wherein at least one of $Ar^1$, $Ar^2$, $Ar^3$, and $Ar^4$ are substituted with at least one of OH or $SO_3R^{30}$, wherein $R^{30}$ is absent, H, Na, Li, K, or combinations thereof.

In an embodiment, the additive is according to the following structure:

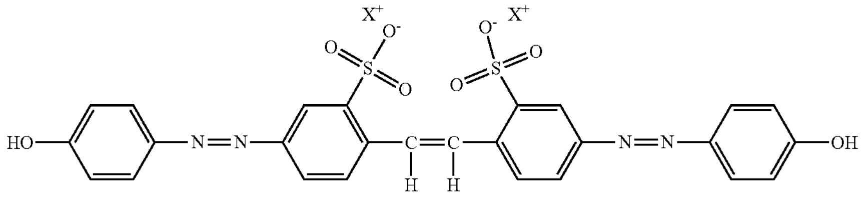

wherein $X^+$ is an alkali metal ion, alkaline metal ion, $H^+$, or combinations thereof.

In an embodiment, the additive is according to Formula VI:

$$Ar^2—N{=}N—(Ar^1)_n—N{=}N—Ar^3 \qquad (VI)$$

wherein $Ar^1$, $Ar^2$, and $Ar^3$ are independently selected from phenyl, naphthyl, or pyrazolyl, wherein at least one of $Ar^1$, $Ar^2$, and $Ar^3$ are substituted with at least one substituent selected from OH, $C_{1-6}$alkyl, $NO_2$, $SO_3$—$R^{30}$, $SO_2(CH_2)_2$—O—$SO_3$—$R^{30}$, $N(R^{21})_2$, or combinations thereof; wherein $R^{30}$ is absent, H, Na, Li, K, or combinations thereof; wherein $R^{21}$ is independently H or $C_{1-6}$alkyl;

wherein n is an integer from 1 to 3.

In an embodiment, the additive is according to one of the following structures:
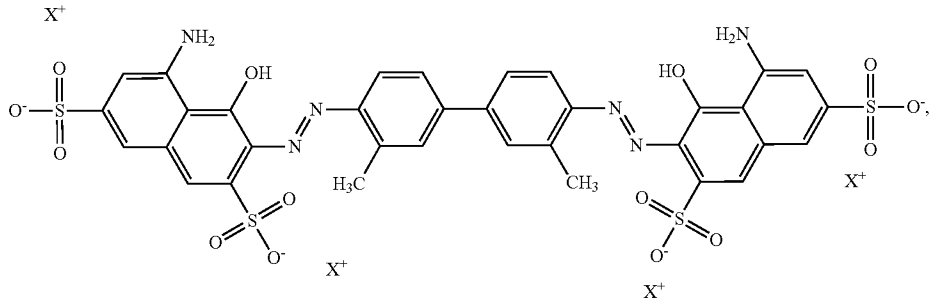
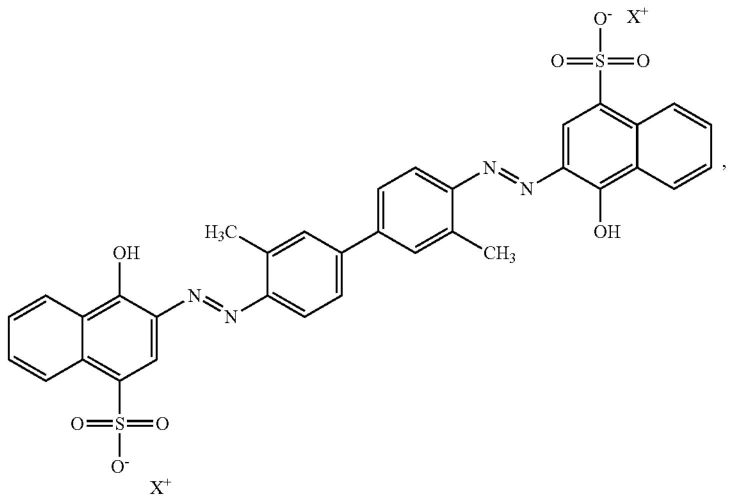
,
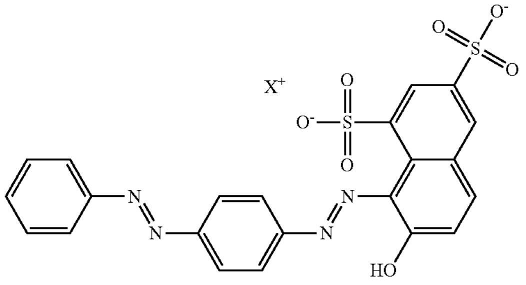
,
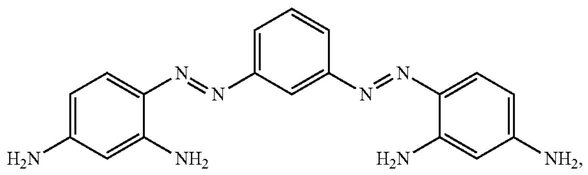
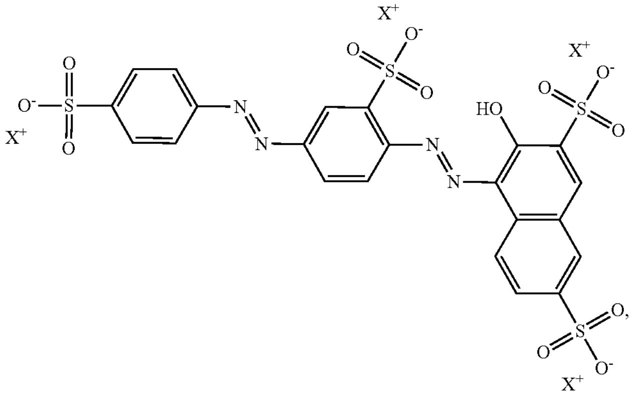

-continued

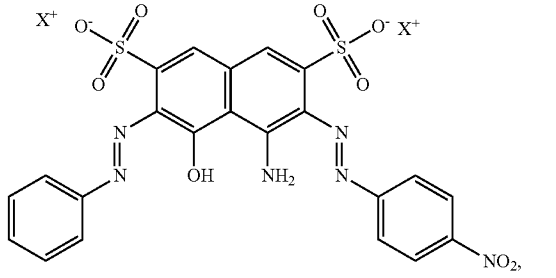

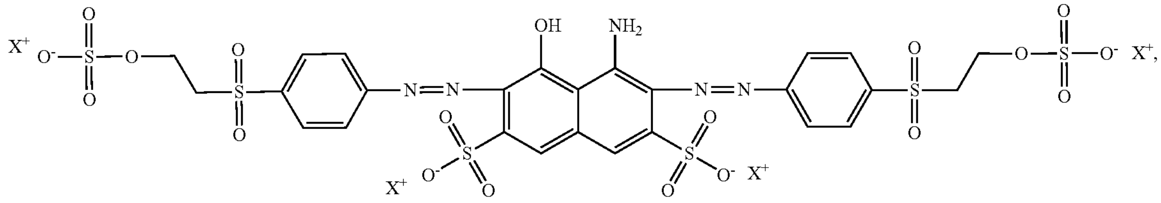

or

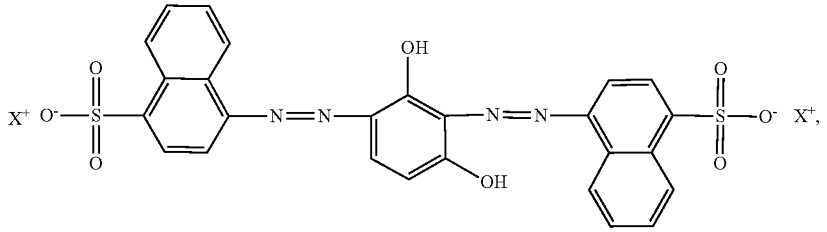

wherein $X^+$ is an alkali metal ion, alkaline metal ion, $H^+$, or combinations thereof.

In an embodiment, the additive is an aryl moiety, wherein the aryl is benzene, naphthalene, or combinations thereof, wherein the aryl is substituted with at least one substituent selected from $C_{1-6}$alkyl, $CHCH_2$, OH, $OCH_3$, $SO_3R^{30}$, NO, $NO_2$, $NH_2$, $C(O)NH_2$, $C(O)C_6H_5$, or —NC(H)-phenol, $O^-$, or combinations thereof; wherein $R^{30}$ is absent, H, Na, Li, K, or combinations thereof.

In an embodiment, the additive is according to Formula (VII):

(VII)

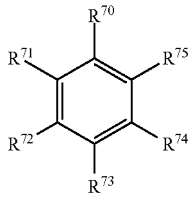

wherein $R^{70}$, $R^{71}$, $R^{72}$, $R^{73}$, $R^{74}$, and $R^{75}$ are independently selected from H, $CH_3$, $CHCH_2$, $C(O)NH_2$, OH, $OCH_3$, NO, $NO_2$, $NH_2$, $C(O)C_6H_5$, $SO_3R^{30}$, or combinations thereof; wherein $R^{30}$ is absent, H, Na, Li, K, or combinations thereof;

wherein at least one of $R^{70}$, $R^{71}$, $R^{72}$, $R^{73}$, $R^{74}$, and $R^{75}$ is OH, $CH_3$, $CHCH_2$, $C(O)NH_2$, $OCH_3$, $SO_3R^{30}$, or combinations thereof; wherein $R^{30}$ is absent, H, Na, Li, K, or combinations thereof.

In an embodiment, the additive is according to Formula (VIII):

(VIII)

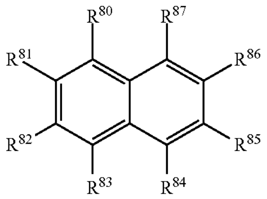

wherein $R^{80}$, $R^{81}$, $R^{82}$, $R^{83}$, $R^{84}$, $R^{85}$, $R^{86}$, and $R^{87}$ are independently selected from H; OH; $O^-$, NO, $NO_2$, NC(H)-phenol, $OCH_3$; $SO_3R^{30}$, wherein $R^{30}$ is absent, H, Na, Li, or K; or combinations thereof, wherein at least one of $R^{80}$, $R^{81}$, $R^{82}$, $R^{83}$, $R^{84}$, $R^{85}$, $R^{86}$, and $R^{87}$ is OH, $O^-$, $OCH_3$, or $SO_3R^{30}$, wherein $R^{30}$ is absent, H, Na, Li, K, Fe, or combinations thereof.

In an embodiment, the additive is according to one of the following structure:

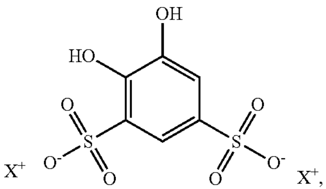

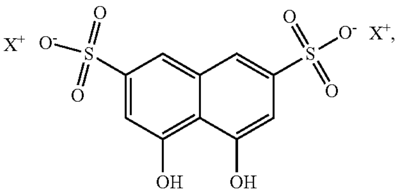

-continued

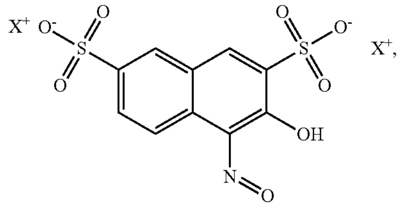

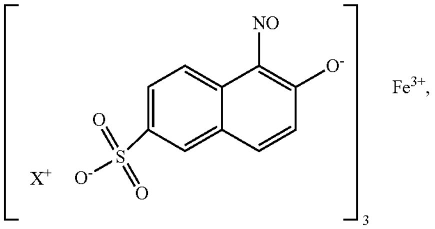

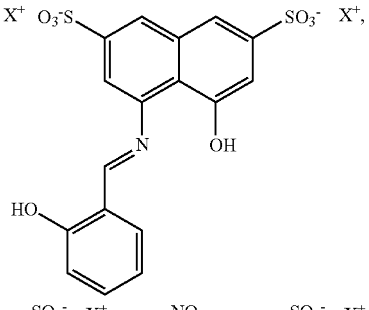

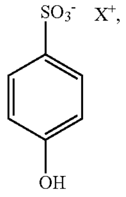

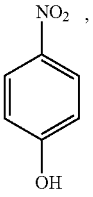

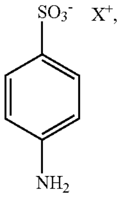

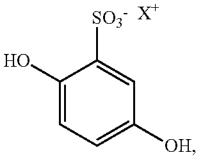

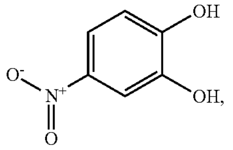

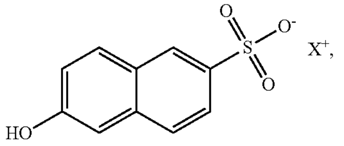

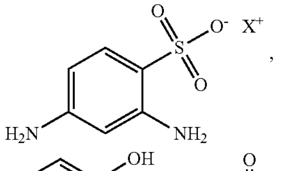

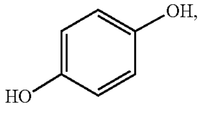

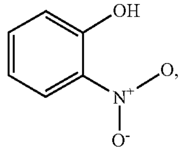

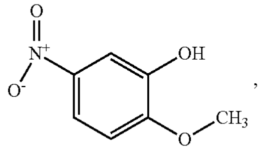

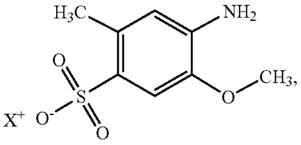

-continued

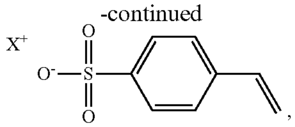

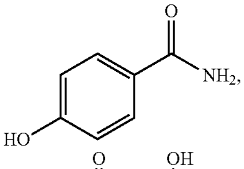

or

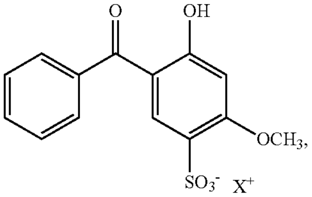

wherein $X^+$ is an alkali metal ion, alkaline metal ion, $H^+$, or combinations thereof.

In an embodiment, the additive is according to Formula IX:

(IX)

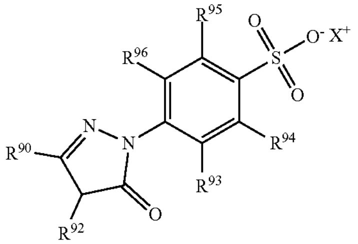

wherein $R^{90}$ and $R^{92}$ are independently selected from H, $C_{1-3}$alkyl, $C(O)OR^{30}$, wherein at least one of $R^{90}$ and $R^{92}$ is $C_{1-3}$alkyl, $C(O)OR^{31}$; wherein $R^{30}$ is absent, H, Na, Li, K, or combinations thereof;

wherein $R^{93}$, $R^{94}$, $R^{95}$, and $R^{96}$ are independently selected from H or a halogen.

In an embodiment, the additive is according to one of the following structures:

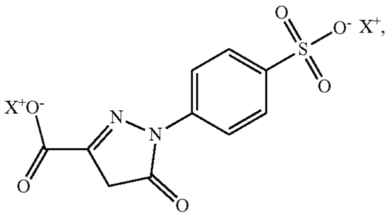

or

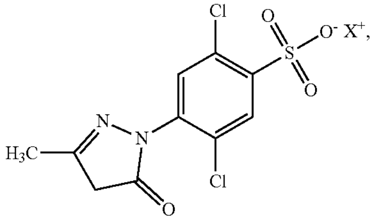

wherein $X^+$ is an alkali metal ion, alkaline metal ion, $H^+$, or combinations thereof.

In an embodiment, the additive is according to one of the following structures:
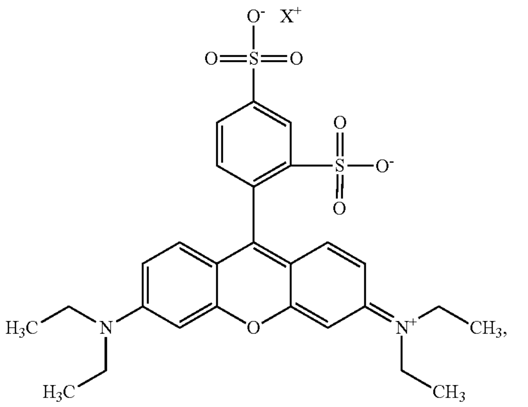
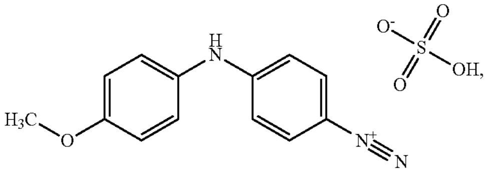
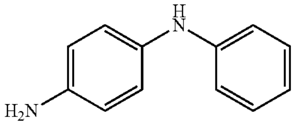
,
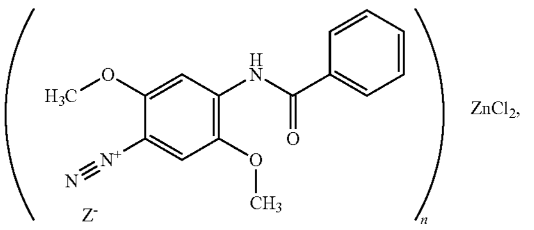
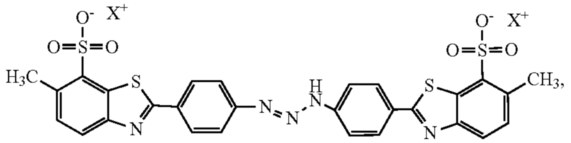
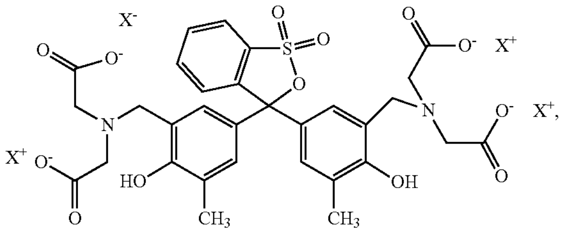
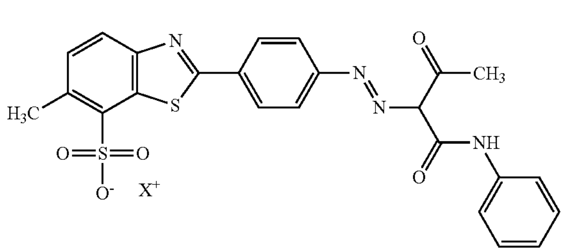
,
-continued
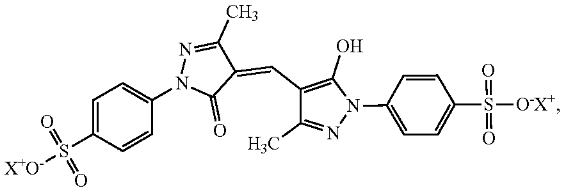
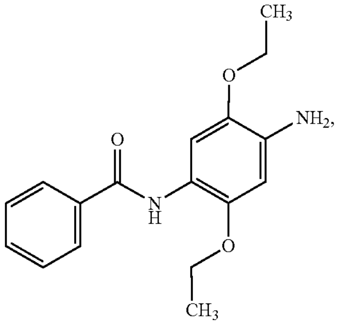
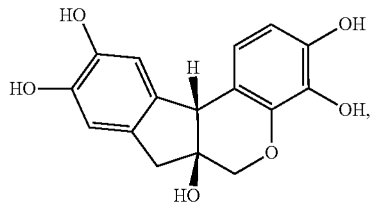
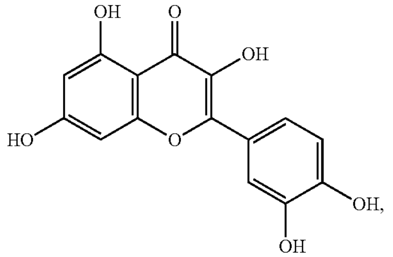
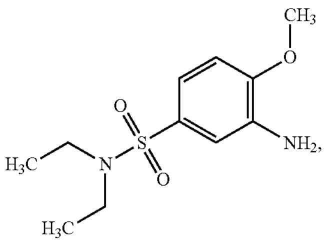
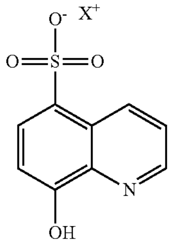
,
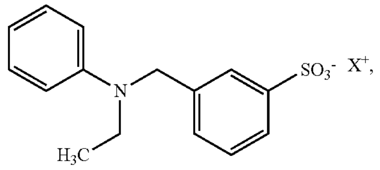

-continued

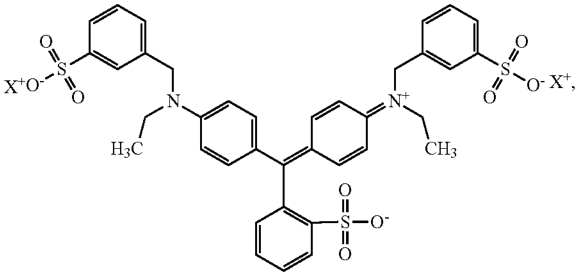

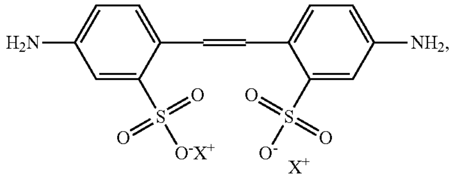

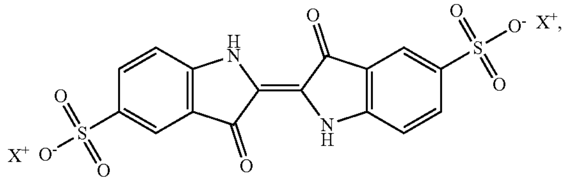

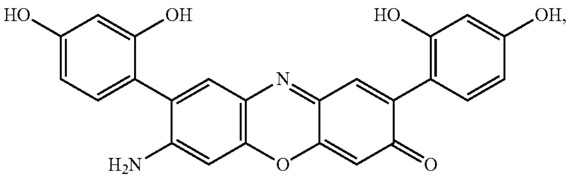

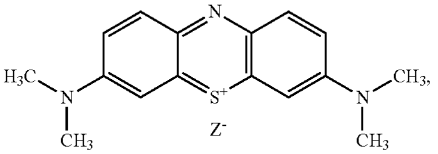

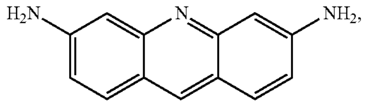

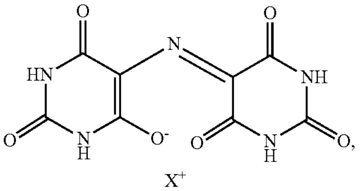

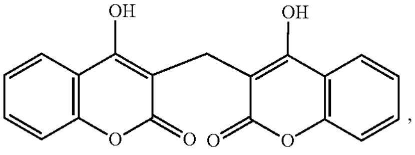

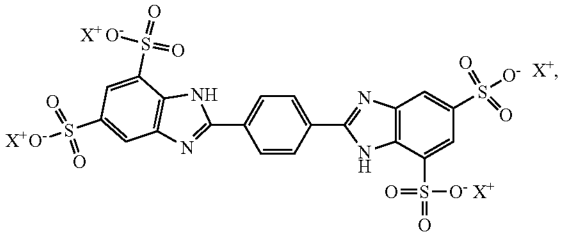

-continued

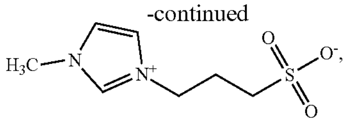

or

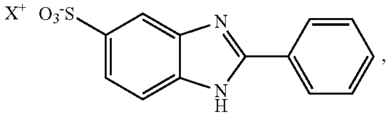

wherein $X^+$ is an alkali metal ion, alkaline metal ion, $H^+$, $NH_4^+$, or combinations thereof;

wherein $Z^-$ is a halide ion.

In an embodiment, set forth herein is a process for making a battery, comprising contacting an electrolyte having an electrolyte additive described herein with a battery electrode. In an embodiment, the electrolyte is an aqueous electrolyte composition comprising an additive disclosed herein, wherein the additive is present at 10 ppm to 50%.

In an embodiment, set forth herein is a process for making a zinc battery, comprising contacting an electrolyte having an electrolyte additive described herein with a zinc-battery electrode.

In an embodiment, set forth herein is a method of using a zinc battery, comprising electrochemically cycling a zinc-battery comprising an electrolyte having an electrolyte additive set forth herein.

In another example, set forth herein is a method of reducing or eliminating self-discharge and/or preventing hydrogen production comprising (a) providing an electrochemical cell comprising a zinc-lithium, zinc-carbon, zinc-chloride, zinc-bromide, zinc-air, zinc-iron, zinc-manganese dioxide, zinc-iodide, zinc-nickel, or zinc-silver oxide anode-cathode; and (b) an aqueous electrolyte comprising at least one electrolyte additive described herein.

In an embodiment, set forth herein is a process for making an iron battery, comprising contacting an electrolyte having an electrolyte additive described herein with an iron-battery electrode.

In an embodiment, set forth herein is a method of using an iron battery, comprising electrochemically cycling an iron-battery comprising an electrolyte having an electrolyte additive set forth herein.

In another example, set forth herein is a method of reducing or eliminating self-discharge and/or preventing hydrogen production comprising (a) providing an electrochemical cell comprising an iron-chloride, iron-bromide, iron-iodide, iron-chromium, or iron-air anode-cathode; and (b) an aqueous electrolyte comprising at least one electrolyte additive described herein.

Additional Embodiments

In an embodiment, set forth herein is an aqueous electrolyte comprising an additive, wherein the additive is a dye, wherein the additive is present at 10 parts per million (ppm) to 50% weight percent (w/w) of the aqueous electrolyte.

In some embodiments, including any of the foregoing, the dye is an azo compound, anthraquinone, acridine, triarylmethane, nitro compound, nitroso compound, indigo, porphyrin, thiazole, xanthene, oxonol, thiazin, oxazin, phenolphthalein, phenol, naphthol, or combinations thereof.

In some embodiments, including any of the foregoing, the additive is according to Formula I:

(I)

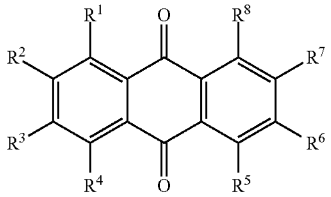

wherein $R^1$, $R^2$, $R^3$, $R^4$, $R^5$, $R^6$, $R^7$, and $R^8$ are independently selected from H, $NH_2$, $NO_2$, NO, $NHR^{40}$, $OR^{40}$, $CO_2R^{40}$, $SO_2R^{50}$, or $SO_3R^{30}$, wherein $R^{30}$ is absent, H, Na, Li, K, or combinations thereof;

wherein $R^{40}$ is absent, H, $C_{1-6}$alkyl, or $C_6$aryl-$S(O)_2$—$CH_2$—$CH_2$—O—$SO_3$—$R^{30}$—;

wherein $R^{50}$ is H, $O^-$, O—$R^{30}$, $C_{1-6}$alkyl, $C_{1-6}$alkoxy, $C_{5-8}$aryl, or $C_{5-8}$heteroaryl.

In some embodiments, including any of the foregoing, the additive is according to Formula I:

(I)

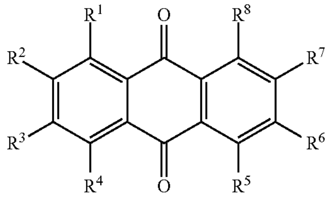

wherein $R^2$, $R^3$, $R^6$, and $R^7$ are independently selected from H, OH, or $SO_3R^{30}$, wherein $R^{30}$ is absent, H, Na, Li, K, or combinations thereof;

wherein $R^1$, $R^4$, $R^5$, and $R^8$ are independently selected from H, $NH_2$, or OH.

In some embodiments, including any of the foregoing, $R^5$ is OH.

In some embodiments, including any of the foregoing, at least one or more of substituents selected from the group consisting of $R^2$, $R^3$, $R^6$, and $R^7$, is $SO_3R^{30}$, wherein $R^{30}$ is absent, H, Na, Li, K, or combinations thereof.

In some embodiments, including any of the foregoing, the additive is according to one of the following structures:

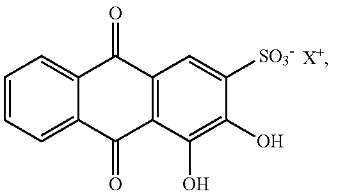

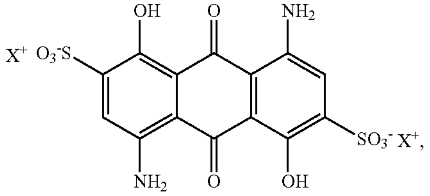

-continued

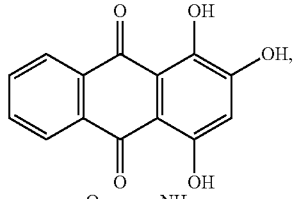

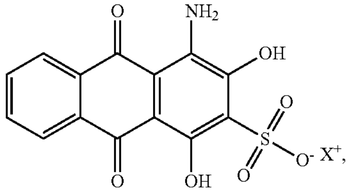

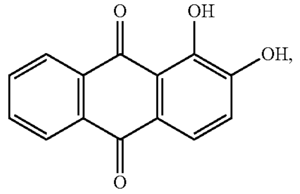

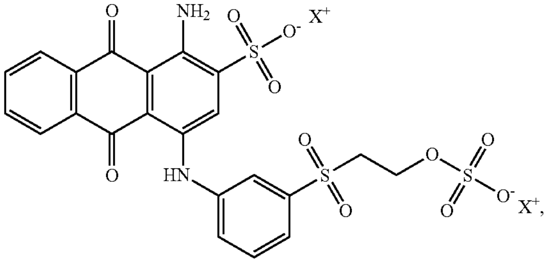

or

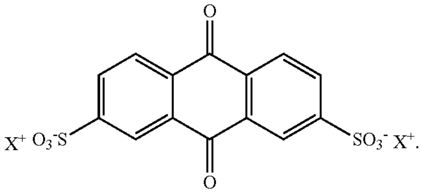

wherein $X^+$ is an alkali metal ion, alkaline metal ion, $H^+$, or combinations thereof.

In some embodiments, including any of the foregoing, the additive is according to Formula II:

$$Ar^2—N{=}N—Ar^1 \quad (II)$$

wherein $Ar^1$ and $Ar^2$ are independently selected from phenyl or naphthyl, wherein the $Ar^1$, $Ar^2$, or both are optionally substituted with at least one substituent selected from a halogen, $C_{1-6}$alkoxy, $C_{1-6}$alkyl, NO, $NO_2$, $N_2^+$, $N(R^{20})_2$, $OR^{45}$, $CO_2R^{45}$, $SO_2R^{55}$, or $SO_3R^{30}$, or combinations thereof;

wherein $R^{20}$ is independently H, $C_{1-6}$alkyl, $C(O)R^{60}$, wherein $R^{60}$ is H, $C_{1-6}$alkyl, or $C_{1-6}$alkoxy;

wherein $R^{30}$ is absent, H, Na, Li, K, or combinations thereof;

wherein $R^{45}$ is absent, H, Na, Li, K, or $C_{1-6}$alkyl;

wherein $R^{55}$ is H, $O^-$, OX, $C_{1-6}$alkyl, $C_{1-6}$alkoxy, $C_{5-8}$aryl, or $C_{5-8}$heteroaryl;

wherein X is an alkali metal, alkaline metal, H, or combinations thereof.

In some embodiments, including any of the foregoing, the at least one or both of $Ar^1$ and $Ar^2$ are substituted with at least one $SO_3R^{30}$.

In some embodiments, including any of the foregoing, the additive is according to Formula III:

(III)

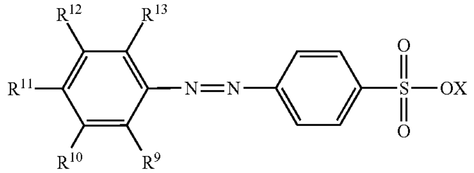

wherein $R^9$, $R^{10}$, $R^{11}$, $R^{12}$, and $R^{13}$ are independently selected from H and OH, wherein at least one of $R^9$, $R^{10}$, $R^{11}$, $R^{12}$, and $R^{13}$ is OH; wherein $X^+$ is an alkali metal ion, alkaline metal ion, $H^+$, or combinations thereof.

In some embodiments, including any of the foregoing, the additive is according to one of the following structures:

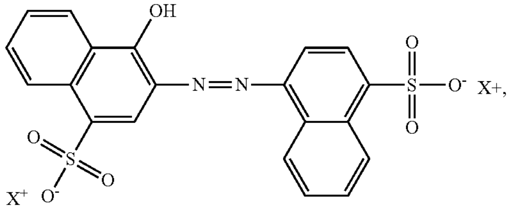

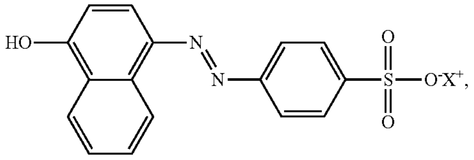

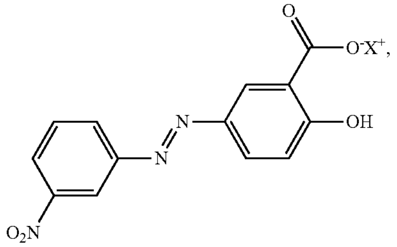

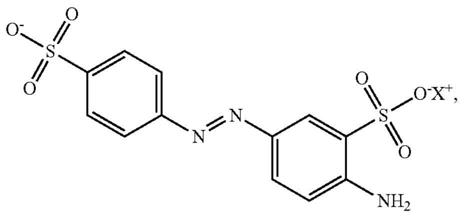

-continued

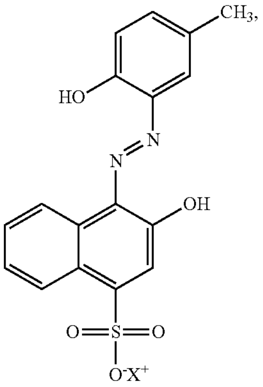

,

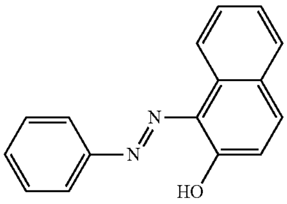

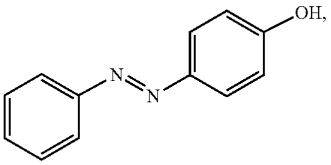

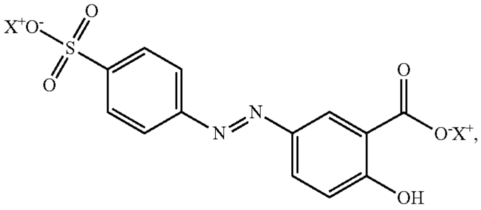

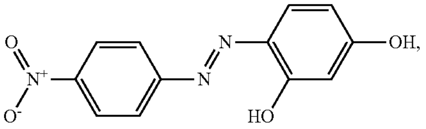

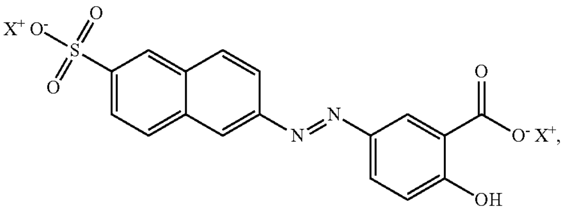

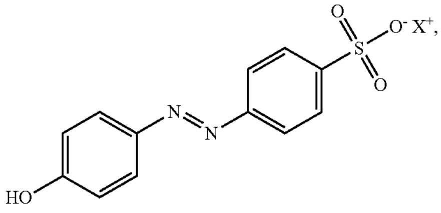

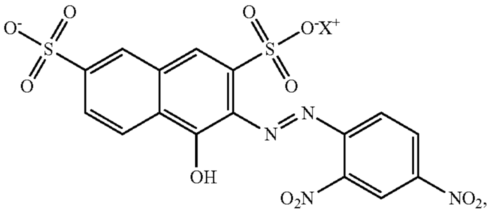

-continued
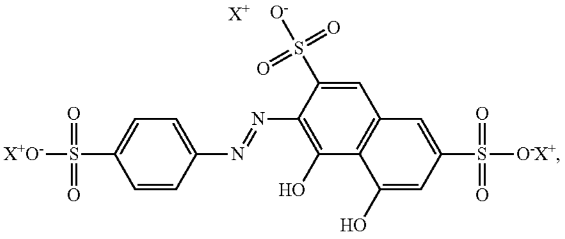
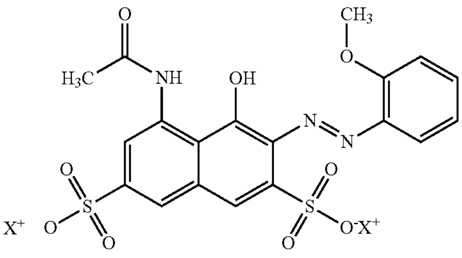
,
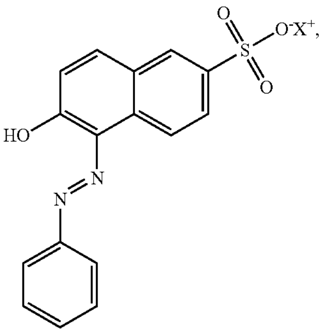
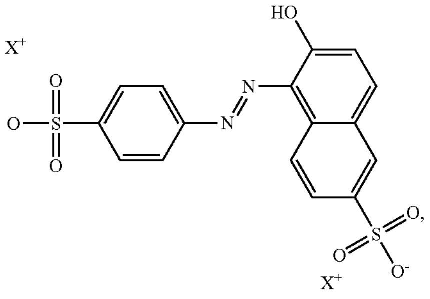
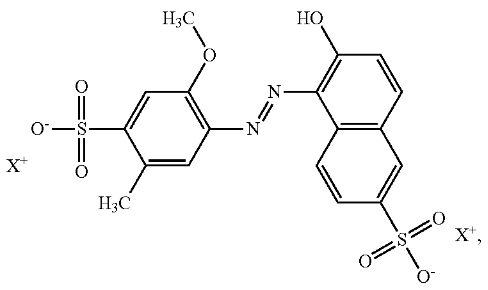
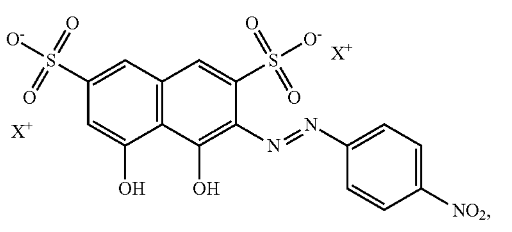
-continued
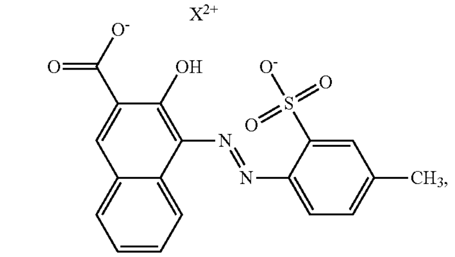
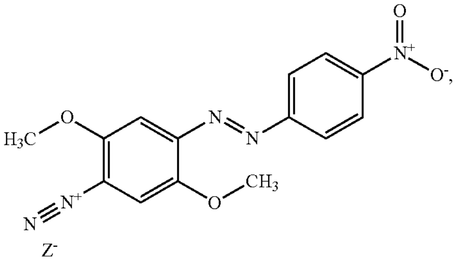
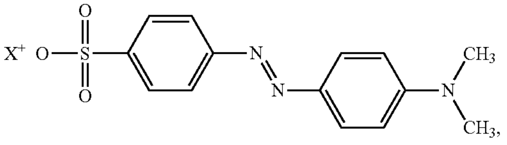
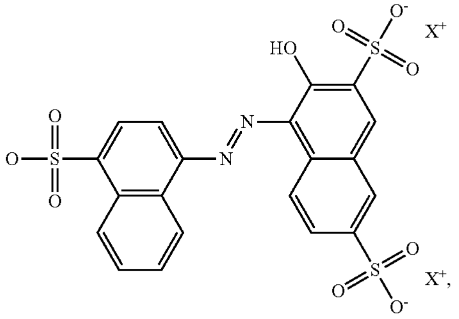
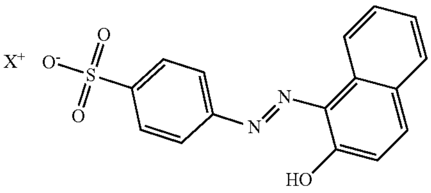
,
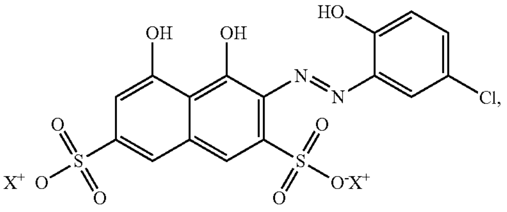
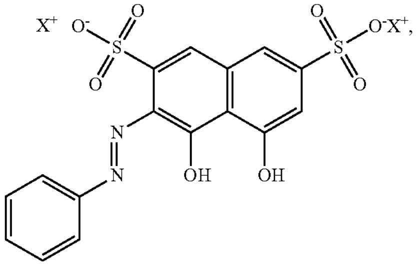

-continued

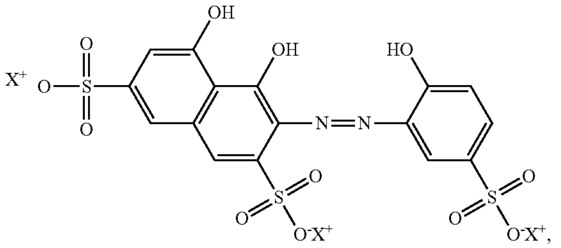

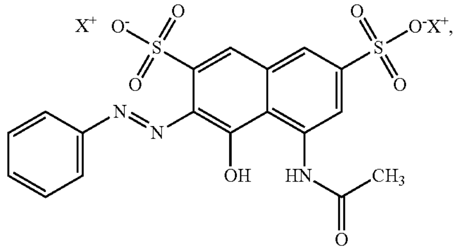

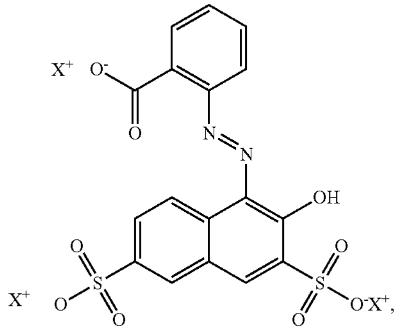

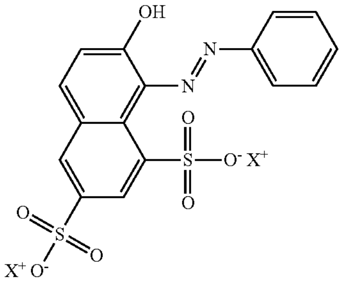

,

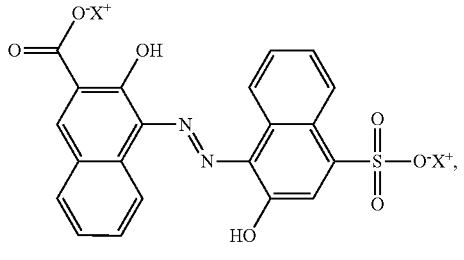

or

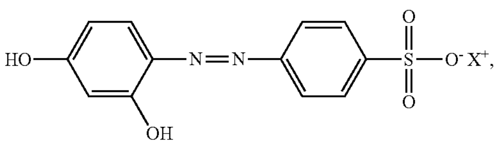

wherein $X^+$ is an alkali metal ion, alkaline metal ion, $H^+$, or combinations thereof; wherein $Z^-$ is a halide ion.

In some embodiments, including any of the foregoing, the additive is according to Formula IV:

$$Ar^1—N{=}N—Ar^5—Ar^6 \quad (IV)$$

wherein $Ar^1$ is selected from phenyl or naphthyl, $Ar^5$ is pyrazolyl, and $Ar^6$ is phenyl; wherein at least one of $Ar^1$ $Ar^5$, and $Ar^6$ is substituted with at least one substituent selected from OH, $O^-$, halogen, $C_{1-6}$alkoxy, $C_{1-6}$alkyl, $NO_2$, $N_2^+$, $N(R^{20})_2$, $OR^{45}$, $CO_2R^{45}$, $SO_2R^{55}$, or $SO_3R^{30}$, or combinations thereof; wherein $R^{20}$ is independently H, $C_{1-6}$alkyl, $C(O)R^{60}$, wherein $R^{60}$ is H, $C_{1-6}$alkyl, or $C_{1-6}$alkoxy; wherein $R^{30}$ is absent, H, Na, Li, K, or combinations thereof; wherein $R^{45}$ is absent, H, Na, Li, K, or $C_{1-6}$alkyl; wherein $R^{55}$ is H, $O^-$, OX, $C_{1-6}$alkyl, $C_{1-6}$alkoxy, $C_{5-8}$aryl, or $C_{5-8}$heteroaryl, wherein X is an alkali metal, alkaline metal, H, or combinations thereof.

In some embodiments, including any of the foregoing, the additive is according to the following structures:

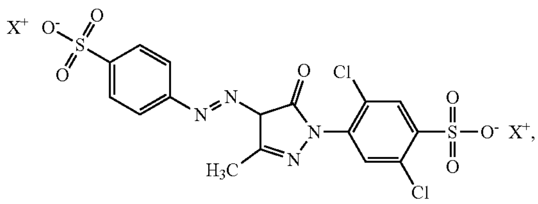

or

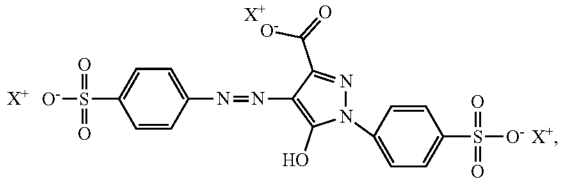

wherein $X^+$ is an alkali metal ion, alkaline metal ion, $H^+$, or combinations thereof.

In some embodiments, including any of the foregoing, the additive is according to Formula V:

$$Ar^2—N{=}N—Ar^1—\underset{H}{C}{=}\underset{H}{C}—Ar^3—N{=}N—Ar^4 \quad (V)$$

wherein $Ar^1$, $Ar^2$, $Ar^3$, and $Ar^4$ are independently selected from phenyl, naphthyl, or pyrazolyl wherein at least two of $Ar^1$, $Ar^2$, $Ar^3$, and $Ar^4$ are substituted with at least one of OH or $SO_3R^{30}$, wherein $R^{30}$ is absent, H, Na, Li, K, or combinations thereof.

In some embodiments, including any of the foregoing, the additive is according to the following structure:

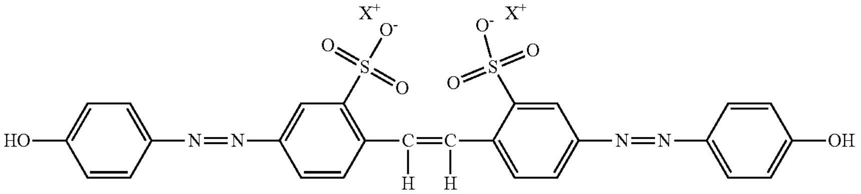

wherein $X^+$ is an alkali metal ion, alkaline metal ion, $H^+$, or combinations thereof.

In some embodiments, including any of the foregoing, the additive is according to Formula VI:

$$Ar^2-N=N-(Ar^1)_n-N=N-Ar^3 \quad \text{(VI)}$$

wherein $Ar^1$, $Ar^2$, and $Ar^3$ are independently selected from phenyl, naphthyl, or pyrazolyl, wherein at least one of $Ar^1$, $Ar^2$, and $Ar^3$ are substituted with at least one substituent selected from OH, $C_{1-6}$alkyl, $NO_2$, $SO_3$—$R^{30}$, $SO_2(CH_2)_2$—O—$SO_3$—$R^{30}$, $N(R^{21})_2$, or combinations thereof; wherein $R^{30}$ is absent, H, Na, Li, K, or combinations thereof; wherein $R^{20}$ is independently H or $C_{1-6}$alkyl;

wherein n is an integer from 1 to 3.

In some embodiments, including any of the foregoing, the additive is according to one of the following structures:

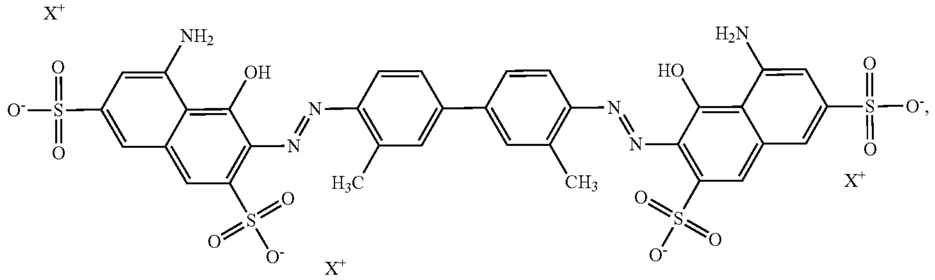

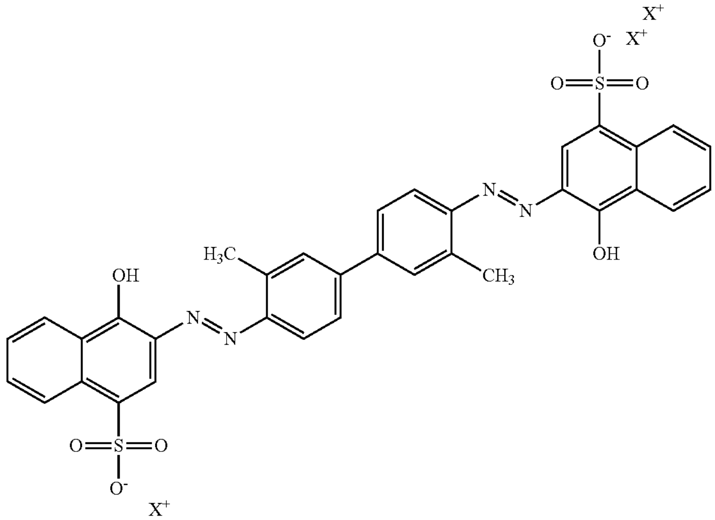

,

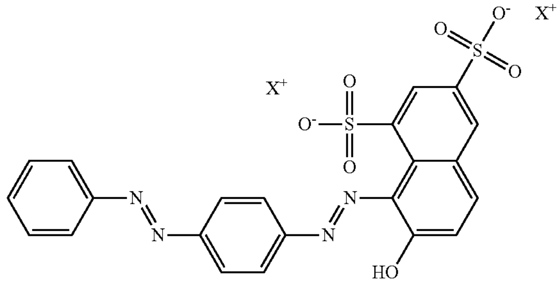

,

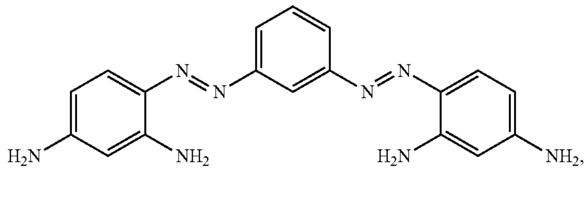

-continued

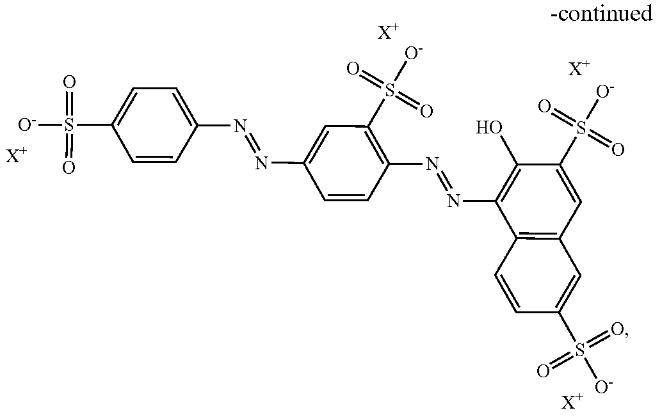

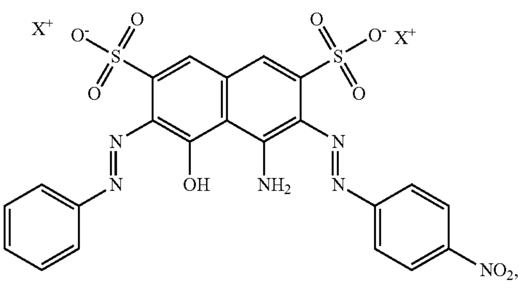

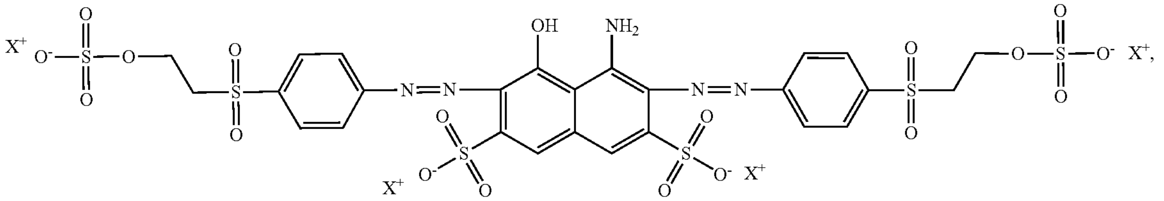

or

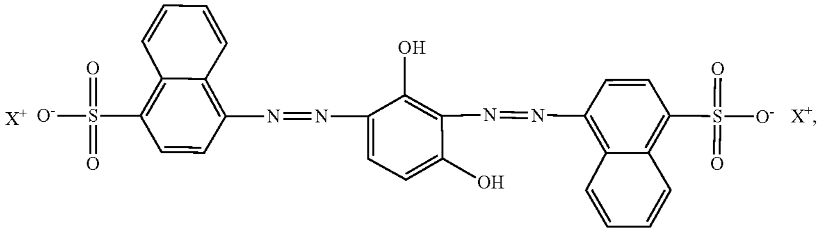

wherein $X^+$ is an alkali metal ion, alkaline metal ion, $H^+$, or combinations thereof.

In some embodiments, including any of the foregoing, the additive is an aryl moiety, wherein the aryl is benzene, naphthalene, or combinations thereof, wherein the aryl is substituted with at least one substituent selected from $C_{1-6}$alkyl, $CHCH_2$, OH, $OCH_3$, $SO_3R^{30}$, NO, $NO_2$, $NH_2$, C(O)$NH_2$, C(O)$C_6H_5$, or —NC(H)-phenol, $O^-$, or combinations thereof; wherein $R^{30}$ is absent, H, Na, Li, K, or combinations thereof.

In some embodiments, including any of the foregoing, the additive is according to Formula (VII):

(VII)

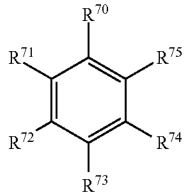

wherein $R^{70}$, $R^{71}$, $R^{72}$, $R^{73}$, $R^{74}$, and $R^{75}$ are independently selected from H, $CH_3$, $CHCH_2$, C(O)$NH_2$, OH, $OCH_3$, NO, $NO_2$, $NH_2$, C(O)$C_6H_5$, $SO_3R^{30}$, or combinations thereof; wherein $R^{30}$ is absent, H, Na, Li, K, or combinations thereof;

wherein at least one of $R^{70}$, $R^{71}$, $R^{72}$, $R^{73}$, $R^{74}$, and $R^{75}$ is OH, $CH_3$, $CHCH_2$, C(O)$NH_2$, $OCH_3$, $SO_3R^{30}$, or combinations thereof; wherein $R^{30}$ is absent, H, Na, Li, K, or combinations thereof.

In some embodiments, including any of the foregoing, the additive is according to Formula (VIII):

(VIII)

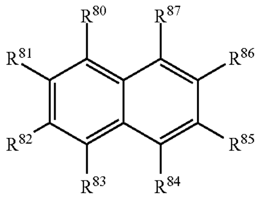

wherein $R^{80}$, $R^{81}$, $R^{82}$, $R^{83}$, $R^{84}$, $R^{85}$, $R^{86}$, and $R^{87}$ are independently selected from H; OH; $O^-$, NO, $NO_2$, NC(H)-phenol, $OCH_3$; $SO_3R^{30}$, wherein $R^{30}$ is absent, H, Na, Li, or K; or combinations thereof, wherein at least one of $R^{80}$, $R^{81}$, $R^{82}$, $R^{83}$, $R^{84}$, $R^{85}$, $R^{86}$, and $R^{87}$ is OH, $O^-$, $OCH_3$, or $SO_3R^{30}$, wherein $R^{30}$ is absent, H, Na, Li, K, Fe, or combinations thereof.

In some embodiments, including any of the foregoing, the additive is according to one of the following structure:

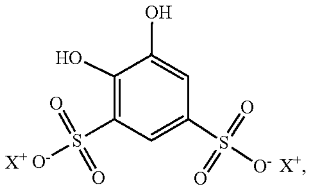

-continued

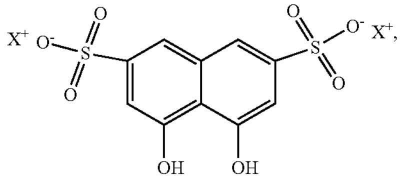

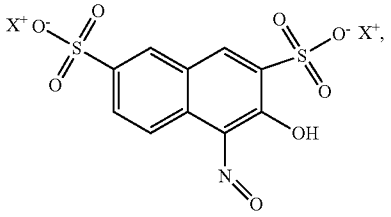

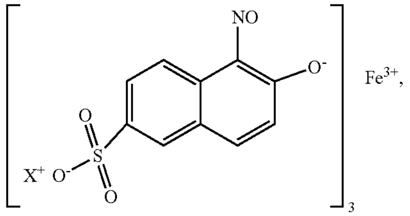

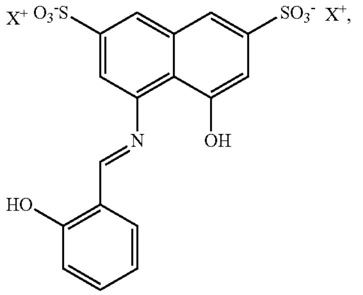

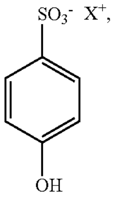

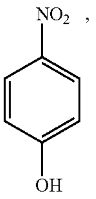

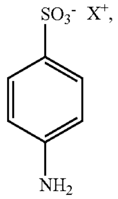

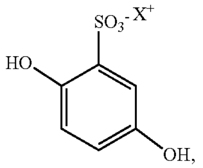

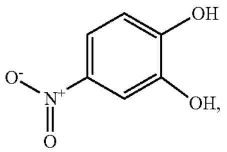

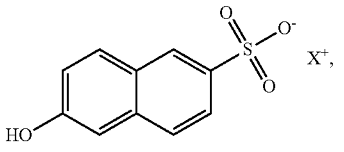

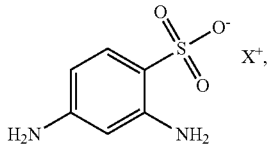

-continued

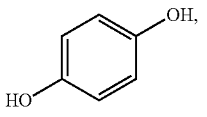

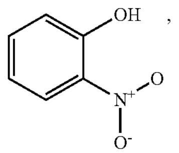

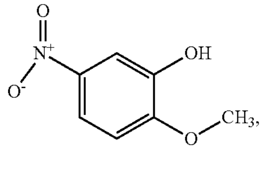

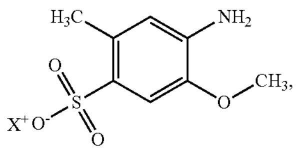

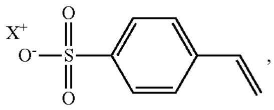

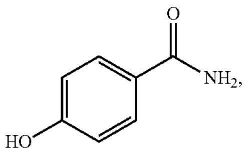

or

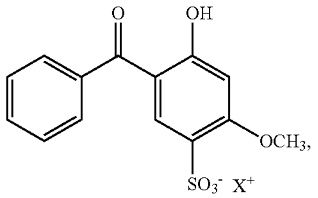

wherein $X^+$ is an alkali metal ion, alkaline metal ion, $H^+$, or combinations thereof.

In some embodiments, including any of the foregoing, the additive is according to Formula IX:

(IX)

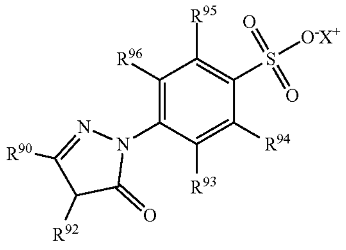

wherein $R^{90}$ and $R^{92}$ are independently selected from H, $C_{1-3}$alkyl, C(O)OR$^{30}$, wherein at least one of $R^{90}$ and $R^{92}$ is $C_{1-3}$alkyl, C(O)OR$^{31}$; wherein $R^{30}$ is absent, H, Na, Li, K, or combinations thereof;

wherein $R^{93}$, $R^{94}$, $R^{95}$, and $R^{96}$ are independently selected from H or a halogen.

In some embodiments, including any of the foregoing, the additive is according to one of the following structures:
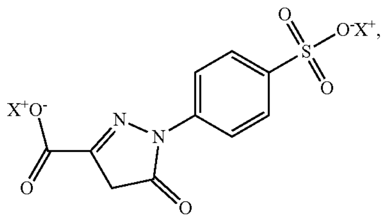
or
-continued
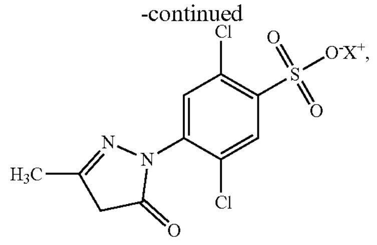
wherein $X^+$ is an alkali metal ion, alkaline metal ion, $H^+$, or combinations thereof.
In some embodiments, including any of the foregoing, the additive is according to one of the following structures:
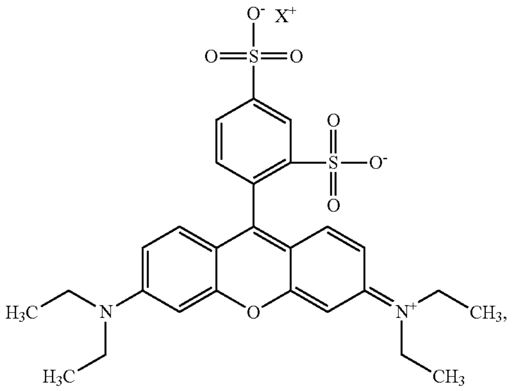
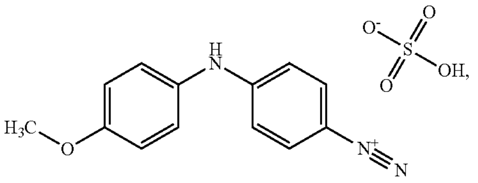
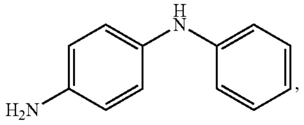
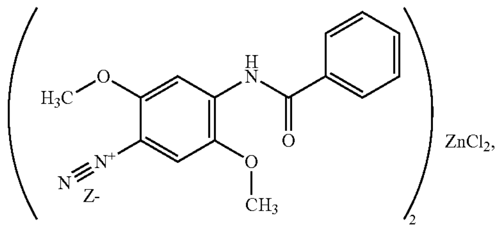
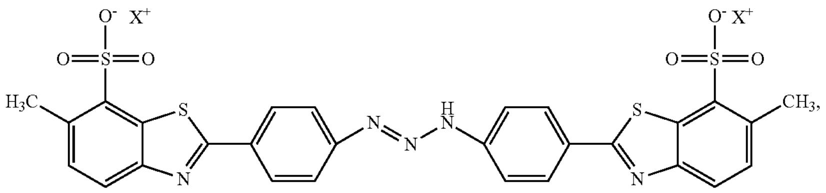
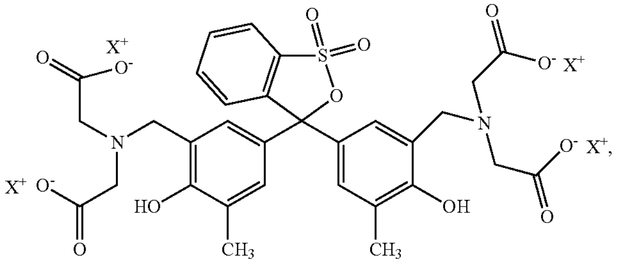

-continued
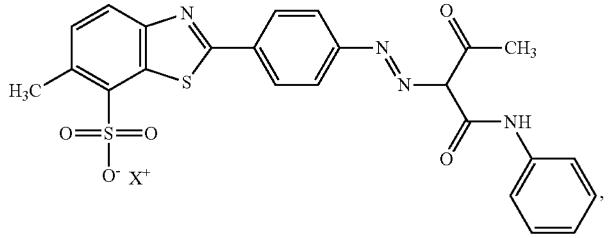
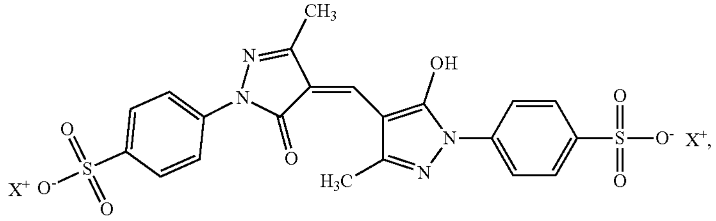
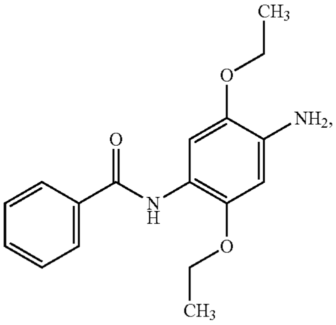
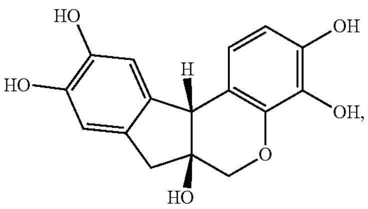
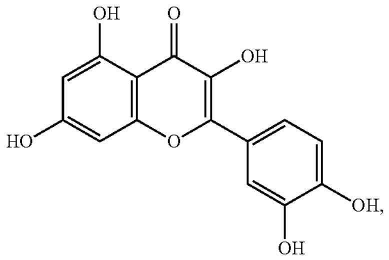
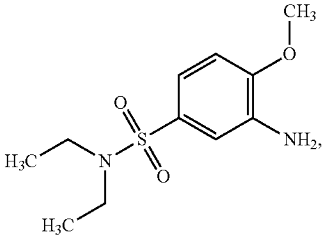
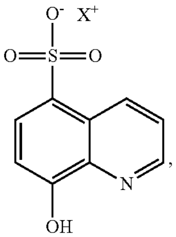
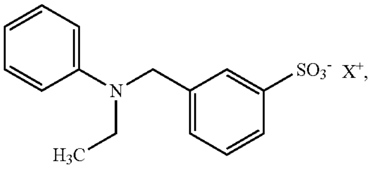
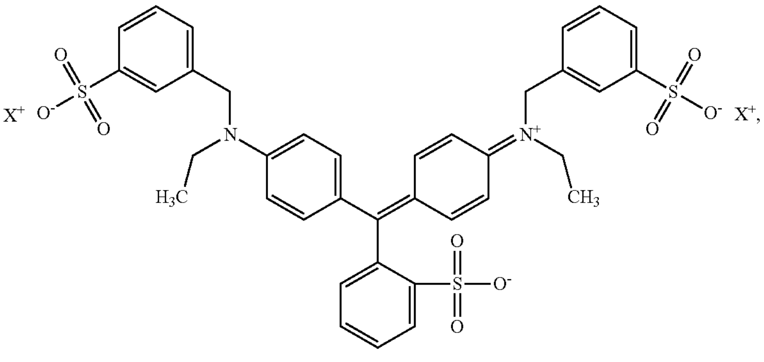
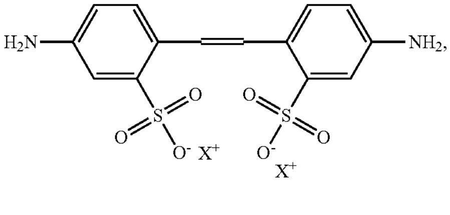
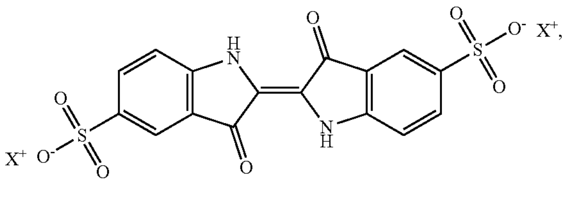

-continued

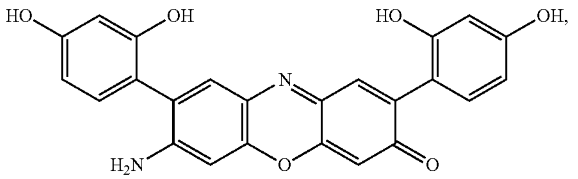

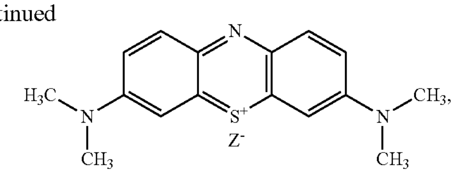

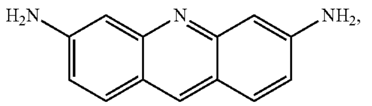

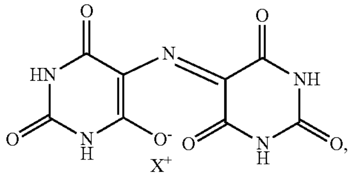

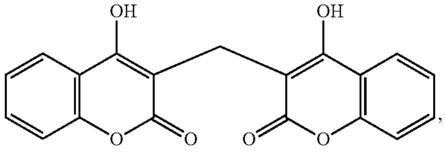

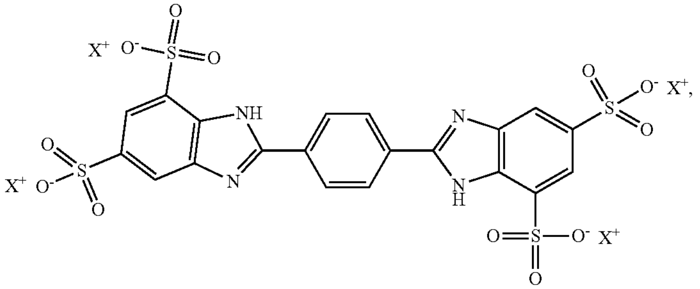

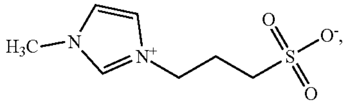

or

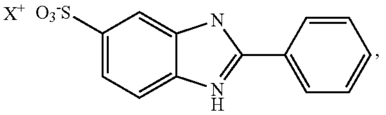

wherein $X^+$ is an alkali metal ion, alkaline metal ion, $H^+$, $NH_4^+$, or combinations thereof;

wherein $Z^-$ is a halide ion.

In some embodiments, including any of the foregoing, the additive is present at a concentration of 1% to 40% w/w.

In some embodiments, including any of the foregoing, the additive is present at a concentration of 1% to 25% w/w.

In some embodiments, including any of the foregoing, the additive is present at a concentration of 1% to 10% w/w.

In some embodiments, including any of the foregoing, the additive is present at a concentration of 1% to 5% w/w.

In some embodiments, including any of the foregoing, the additive is present at a concentration of 10 ppm to 100 ppm.

In some embodiments, including any of the foregoing, the additive is present at a concentration of 100 ppm to 1% w/w.

In some embodiments, including any of the foregoing, the additive is present at a concentration of 10 ppm, 100 ppm, 1% w/w, 4% w/w, 5% w/w, 10% w/w, 25% w/w, or 40% w/w.

In some embodiments, set forth herein is a battery comprising an aqueous electrolyte herein.

In some embodiments, including any of the foregoing, the battery is a zinc battery, an iron battery, an aluminum battery, a vanadium battery, a magnesium battery, a nickel battery, a silver battery, or a lead battery.

In some embodiments, including any of the foregoing, the zinc battery is a zinc-air, zinc-manganese dioxide, zinc-nickel, zinc-sulfate, zinc-carbon, zinc-chloride, zinc-bromide, zinc-iodide, zinc-silver, zinc-cerium, or zinc-ion battery.

In some embodiments, including any of the foregoing, the iron battery is an iron-air, iron-chloride, iron-chromium, iron-zinc, iron-sodium, or iron-redox battery.

In some embodiments, including any of the foregoing, the aluminum battery is an aluminum-air, aluminum-sulfur, aluminum-chloride, or aluminum-ion battery.

In some embodiments, including any of the foregoing, the vanadium battery is a vanadium-redox battery.

In some embodiments, including any of the foregoing, the magnesium battery is a magnesium-air, magnesium-sulfur, magnesium-sodium, or magnesium-ion battery.

In some embodiments, including any of the foregoing, the nickel battery is a nickel-zinc, nickel-iron, nickel-hydride, or nickel-cadmium battery.

In some embodiments, including any of the foregoing, the silver battery is a silver-zinc, or silver-cadmium battery.

In some embodiments, including any of the foregoing, the lead battery is a lead-sulfuric acid battery.

In some embodiments, including any of the foregoing, the battery is not a redox flow battery.

In some embodiments, including any of the foregoing, the battery is an iron (or other metal) battery but not a redox flow battery. As used herein, a redox flow battery is a type of electrochemical cell where chemical energy is stored and released in two chemical components of different potentials that remain dissolved in liquids. In a redox battery, energy is stored directly in the electrolyte chemicals, and these charge-carrier molecules are, thus, a major component of the cell. Energy in some redox batteries is stored in organic chelate complexes. In contrast to this, a metal-based battery stores energy in metal layers created during charging, while the electrolyte chemicals act as a support system to facilitate ion movement. Molecules described herein augment that support system in metals batteries rather than store charge as in redox batteries.

In some embodiments, including any of the foregoing, the battery is an iron battery that is a flow battery but is not a redox flow battery. In such a battery, the energy is stored in the potential difference between the cathode and the anode but not in the electrolyte chemicals.

In an embodiment, set forth herein is an iron battery, comprising:

- an aqueous electrolyte that comprises an additive present at 10 parts per million (ppm) to less than 50% weight percent (w/w) of the aqueous electrolyte,
- wherein the additive has a structure according to Formula X:

(X)

$$Ar^2-[N=N]_s-(Ar^1)_t-[\underset{H}{C}-\underset{H}{C}]_n-(Ar^3)_m-[N=N]_q-(Ar^4)_p$$

- wherein $Ar^2$ is selected from phenyl, naphthyl, or anthraquinone;
- wherein $Ar^1$ is selected from phenyl or naphthyl;
- wherein the $Ar^1$ and $Ar^2$ are independently optionally substituted with at least one substituent selected from a halogen, $C_{1-6}$alkoxy, $C_{1-6}$alkyl, NO, $NO_2$, $N_2^+$, $N(R^{20})_2$, $OR^{45}$, $CO_2R^{45}$, $SO_2R^{55}$, or $SO_3R^{30}$, or combinations thereof;
- wherein $Ar^3$ and $Ar^4$ are independently selected from phenyl, naphthyl, or pyrazolyl;
- wherein $Ar^3$ and $Ar^4$ are substituted with at least one $O^-$, OH or $SO_3R^{30}$, wherein $R^{30}$ is absent or H;
- wherein $R^{20}$ is independently H, $C_{1-6}$alkyl, $C(O)R^{60}$, wherein $R^{60}$ is H, $C_{1-6}$alkyl, or $C_{1-6}$alkoxy;
- wherein $R^{45}$ is absent, H, $C_{1-6}$alkyl, or combinations thereof;
- wherein $R^{55}$ is H, $O^-$, OH, $C_{1-6}$alkyl, $C_{1-6}$alkoxy, $C_{5-8}$aryl, $C_{5-8}$heteroaryl, or combinations thereof;
- wherein the aqueous electrolyte optionally comprises $Li^+$, $Na^+$, $K^+$, $Mg^{2+}$, $Ca^{2+}$, $Fe^{3+}$, or combinations thereof;
- wherein subscripts s, t, n, m, q, and p are independently selected from 0 or 1;
- wherein when $Ar^2$ is anthraquinone, $Ar^2$ is substituted with at least one $SO_3R^{30}$;
- wherein the iron battery is an iron-air, iron-chloride, iron-chromium, iron-zinc, or iron-sodium.

In some embodiments, including any of the foregoing, the additive is according to Formula XI:

(XI)

$$Ar^2-N=N-Ar^1$$

- wherein $Ar^1$ and $Ar^2$ are independently selected from phenyl or naphthyl, and independently optionally substituted with at least one substituent selected from a halogen, $C_{1-6}$alkoxy, $C_{1-6}$alkyl, NO, $NO_2$, $N_2^+$, $N(R^{20})_2$, $OR^{45}$, $CO_2R^{45}$, $SO_2R^{55}$, or $SO_3R^{30}$, or combinations thereof.

In some embodiments, including any of the foregoing, at least one or both of $Ar^1$ and $Ar^2$ are substituted with at least one $SO_3R^{30}$.

In some embodiments, including any of the foregoing, the additive is according to one of the following structures:

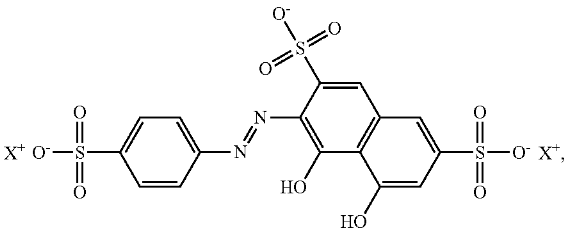

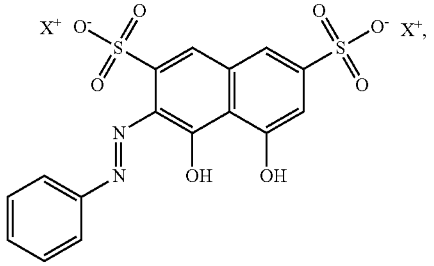

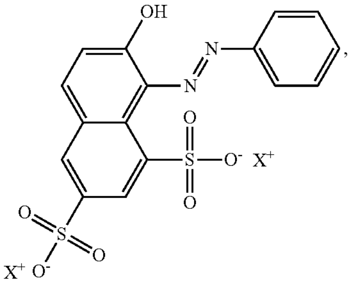

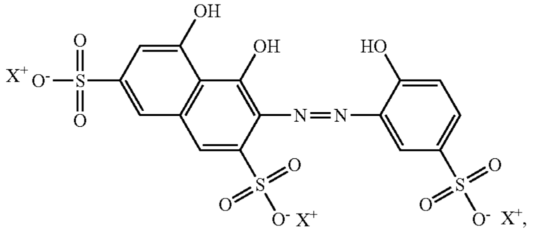

or

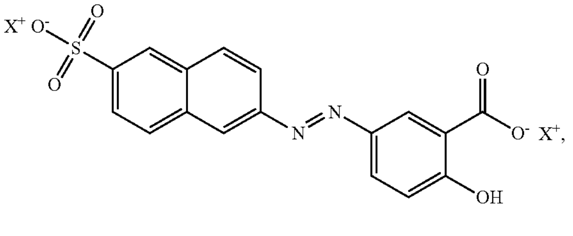

wherein $X^+$ is $Li^+$, $Na^+$, $K^+$, $Mg^{2+}$, $Ca^{2+}$, $Fe^{3+}$, $H^+$, or combinations thereof.

In some embodiments, including any of the foregoing, the additive is according to Formula XII:

(XII)

$$Ar^2-N=N-Ar^1-\underset{H}{C}=\underset{H}{C}-Ar^3-N=N-Ar^4$$

- wherein $Ar^1$, $Ar^2$, $Ar^3$, and $Ar^4$ are independently selected from phenyl or naphthyl, wherein at least two of $Ar^1$, $Ar^2$, $Ar^3$, and $Ar^4$ are substituted with at least one of OH or $SO_3R^{30}$, wherein $R^{30}$ is absent or H.

In some embodiments, including any of the foregoing, the additive is according to the following structure:

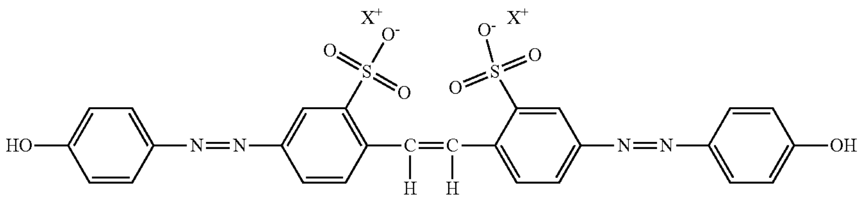

wherein $X^+$ is $Li^+$, $Na^+$, $K^+$, $Mg^{2+}$, $Ca^{2+}$, $Fe^{3+}$, $H^+$, or combinations thereof.

In some embodiments, including any of the foregoing, the additive is according to Formula (XIII):

(XIII)

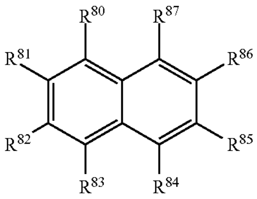

wherein $R^{80}$, $R^{81}$, $R^{82}$, $R^{83}$, $R^{84}$, $R^{85}$, $R^{86}$, and $R^{87}$ are independently selected from H, OH, $O^-$, NO, $NO_2$, NC(H)-phenol, $OCH_3$, $SO_3R^{30}$, wherein $R^{30}$ is absent or H;

wherein at least one of $R^{80}$, $R^{81}$, $R^{82}$, $R^{83}$, $R^{84}$, $R^{85}$, $R^{86}$, and $R^{87}$ is OH, $O^-$, $OCH_3$, or $SO_3R^{30}$, wherein $R^{30}$ is absent or H, wherein subscripts s, t, n, m, q, and p are 0.

In some embodiments, including any of the foregoing, the additive is according to one of the following structure:

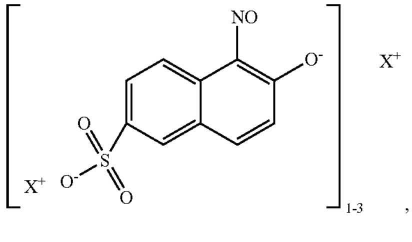

, or

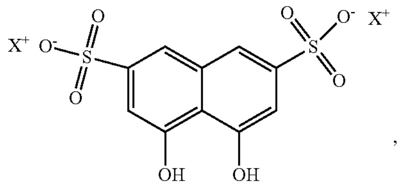

, wherein $X^+$ is $Li^+$, $Na^+$, $K^+$, $Mg^{2+}$, $Ca^{2+}$, $Fe^{3+}$, $H^+$, or combinations thereof.

In some embodiments, including any of the foregoing, the additive is according to Formula XIV:

(XIV)

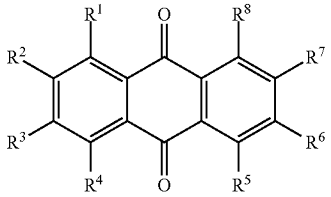

wherein $R^1$, $R^2$, $R^3$, $R^4$, $R^5$, $R^6$, $R^7$, and $R^8$ are independently selected from H, $NH_2$, $NO_2$, NO, $NHR^{40}$, $OR^{40}$, $CO_2R^{40}$, $SO_2R^{50}$, or $SO_3R^{30}$, wherein $R^{30}$ is absent or H;

wherein $R^{40}$ is absent or H, $C_{1-6}$alkyl, $C_6$aryl-$S(O)_2$—$CH_2$—$CH_2$—O—$SO_3$—$R^{30}$—, or combinations thereof;

wherein $R^{50}$ is H, $O^-$, O—$R^{30}$, $C_{1-6}$alkyl, $C_{1-6}$alkoxy, $C_{5-8}$aryl, $C_{5-8}$heteroaryl, or combinations thereof;

wherein subscripts s, t, n, m, q, and p are 0.

In some embodiments, including any of the foregoing, the additive is according to Formula XV:

(XV)

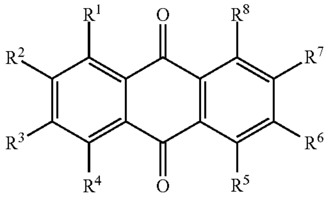

wherein $R^2$, $R^3$, $R^6$, and $R^7$ are independently selected from H, OH, or $SO_3R^{30}$, wherein $R^{30}$ is absent or H; wherein $R^1$, $R^4$, $R^5$, and $R^8$ are independently selected from H, $NH_2$, or OH.

In some embodiments, including any of the foregoing, at least one or more substituents selected from the group consisting of $R^2$, $R^3$, $R^6$, and $R^7$, is $SO_3R^{30}$, wherein $R^{30}$ is absent or H.

In some embodiments, including any of the foregoing, the additive is according to the following structure:

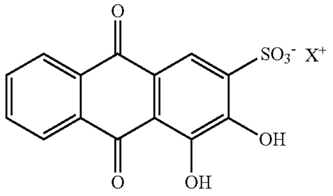

wherein $X^+$ is $Li^+$, $Na^+$, $K^+$, $Mg^{2+}$, $Ca^{2+}$, $Fe^{3+}$, $H^+$, or combinations thereof.

In some embodiments, including any of the foregoing, the additive is present at a concentration of 10 ppm to 5% w/w.

In some embodiments, including any of the foregoing, the additive is present at a concentration of 10 ppm to 4% w/w.

In some embodiments, including any of the foregoing, the additive is present at a concentration of 10 ppm to 3% w/w.

In some embodiments, including any of the foregoing, the additive is present at a concentration of 10 ppm to 2% w/w.

In some embodiments, including any of the foregoing, the additive is present at a concentration of 10 ppm to 100 ppm.

In some embodiments, including any of the foregoing, the additive is present at a concentration of 50 ppm to 5% w/w.

In some embodiments, including any of the foregoing, the additive is present at a concentration of 10 ppm, 50 ppm, 100 ppm, 500 ppm, 1000 ppm, 0.1 wt %, 0.5 wt %, 1% w/w, 4% w/w, 5% w/w, or 10% w/w

EXAMPLES

In the following examples, chemicals were commercially purchased unless stated explicitly otherwise.

Example 1

Static Gas Test: 8M KOH Electrolyte and Iron Powder

A base electrolyte of an 8M potassium hydroxide (KOH) water solution was prepared; to this an amount of additive was added to achieve the concentrations listed in Table 1. Glass headspace vials of 10 mL volume were loaded with 1) 3.125 g of iron (Fe) metal powder with an average particle size of 1-9 m and iron purity of 99.9% and 2) 12.5 mL of the electrolyte with or without (for control) additive. Vials were sealed using crimp-on caps with rubber injection stoppers. A graduated 5 mL plastic disposable syringe with 18-gauge needle was inserted into each vial. The vials were placed in a 50° C. oven and the volume of gas produced was measured as the volume of electrolyte displaced from the vial into the syringe. The control consisted of vials containing only metal powder and 8M KOH with no additive present. The control produced 5 mL of gas after 4 hours in the oven. In Table 1, additives are categorized based on the percentage of gas suppressed at 4 hours, as compared to the control. A score of * means ≥25% gas suppression, a score of  means ≥50% gas suppression, and a score of * means ≥75% gas suppression.

TABLE 1

Additive static gas suppression in 8M KOH electrolyte in the presence of iron powder.

| Additive Structure | Additive Concentration (wt. %) | Gas Suppression |
|---|---|---|
| 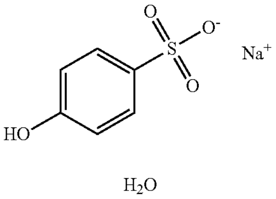 | 1% | *** |
| 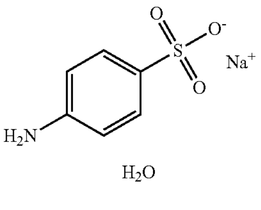 | 1% | *** |
| 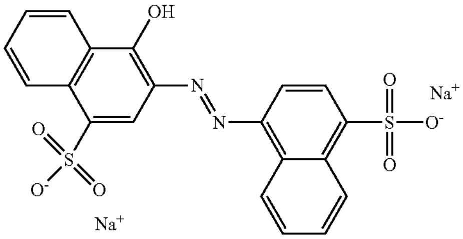 [SMILES: O=S(=O)([O-])c1ccc(/N=N/c2cc(S(=O)(=O)[O-])c3ccccc3c2O)c2ccccc12 ; [Na+] ; [Na+]] | 0.1% | *** |

TABLE 1-continued
| Additive static gas suppression in 8M KOH electrolyte in the presence of iron powder. | | |
|---|---|---|
| Additive Structure | Additive Concen-tration (wt. %) | Gas Sup-pression |
| 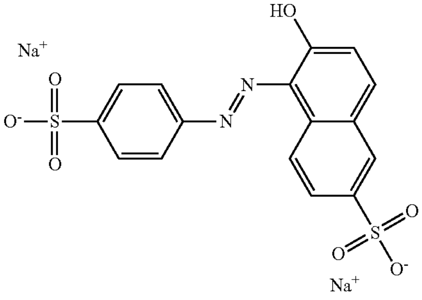 [SMILES: O=S(=O)([O-])c1ccc(/N=N/c2c(O)ccc3cc(S(=O)(=O)[O-])ccc23)cc1 ; [Na+] ; [Na+]] | 0.1% | *** |
| 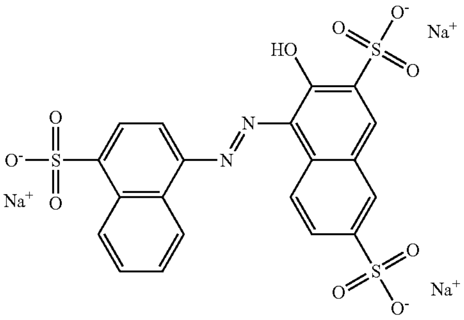 [SMILES: [Na+] ; O=S(=O)([O-])c1ccc2c(/N=N/c3ccc(S(=O)(=O)[O-])c4ccccc34)c(O)c(S(=O)(=O)[O-])cc2c1 ; [Na+] ; [Na+]] | 0.1% | *** |
| 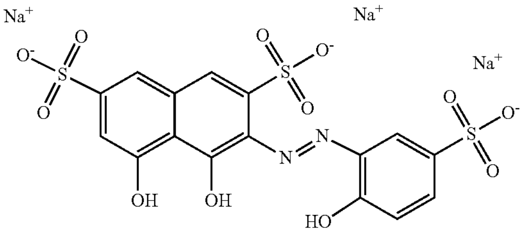 [SMILES: [Na+] ; [Na+] ; O=S(=O)([O-])c1ccc(O)c(/N=N/c2c(S(=O)(=O)[O-])cc3cc(S(=O)(=O)[O-])cc(O)c3c2O)c1 ; [Na+]] | 1% | *** |
| 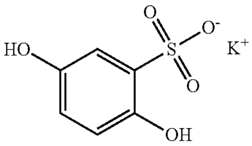 [SMILES: O=S(=O)([O-])c1cc(O)ccc1O ; [K+]] | 1% | *** |
| 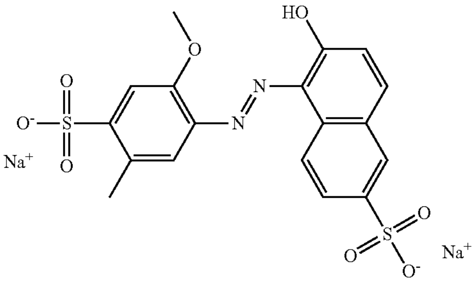 [SMILES: [Na+] ; COc1cc(S(=O)(=O)[O-])c(C)cc1/N=N/c1c(O)ccc2cc(S(=O)(=O)[O-])ccc12 ; [Na+]] | 0.1% | ** |
| 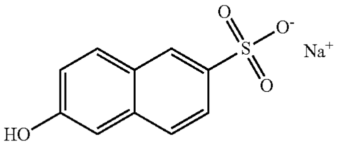 [SMILES: O=S(=O)([O-])c1ccc2cc(O)ccc2c1 ; [Na+]] | 0.1% | * |

TABLE 1-continued
Additive static gas suppression in 8M KOH electrolyte in the presence of iron powder.
| Additive Structure | Additive Concentration (wt. %) | Gas Suppression |
|---|---|---|
| 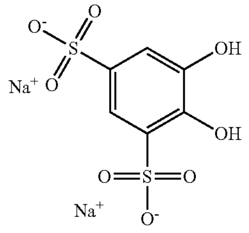 [SMILES: [Na+] ; O=S(=O)([O-])c1cc(O)c(O)c(S(=O)(=O)[O-])c1 ; [Na+]] | 1% | ** |
| 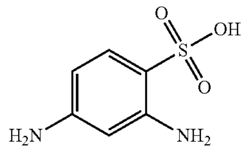 | 0.1% | ** |
| 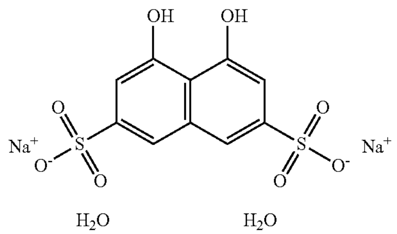 | 1% | *** |
| 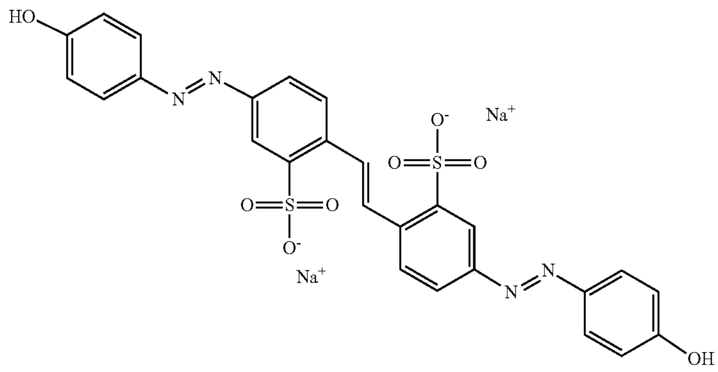 [SMILES: O=S(=O)([O-])c1cc(/N=N/c2ccc(O)cc2)ccc1/C=C/c1ccc(/N=N/c2ccc(O)cc2)cc1S(=O)(=O)[O-] ; [Na+] ; [Na+]] | 1% | *** |
| 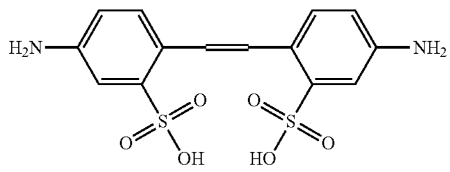 [SMILES: Nc1ccc(C=Cc2ccc(N)cc2S(=O)(=O)O)c(S(=O)(=O)O)c1] | 0.01% | ** |
| 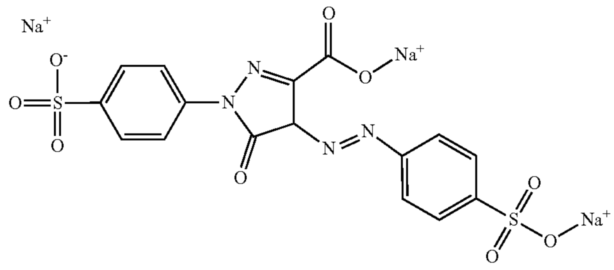 | 1% | *** |

TABLE 1-continued
| Additive static gas suppression in 8M KOH electrolyte in the presence of iron powder. | | |
|---|---|---|
| Additive Structure | Additive Concen-tration (wt. %) | Gas Sup-pression |
| 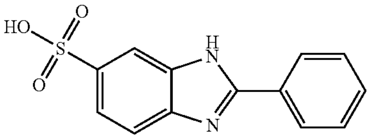 | 1% | *** |
| 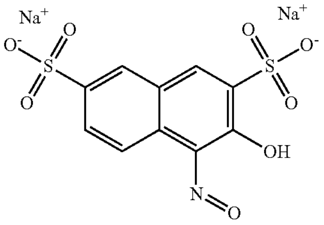 [SMILES: [Na+] ; [Na+] ; O=Nc1c(O)c(S(=O)(=O)[O-])cc2cc(S(=O)(=O)[O-])ccc12] | 0.01% | *** |
| 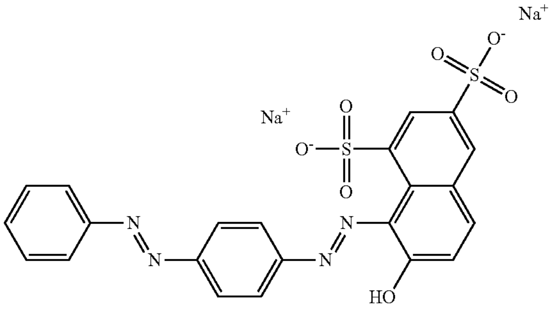 [SMILES: [Na+] ; O=S(=O)([O-])c1cc(S(=O)(=O)[O-])c2c(/N=N/c3ccc(/N=N/c4ccccc4)cc3)c(O)ccc2c1 ; [Na+]] | 0.1% | * |
| 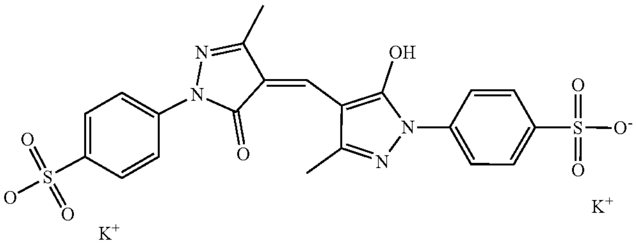 | 0.1% | * |
| 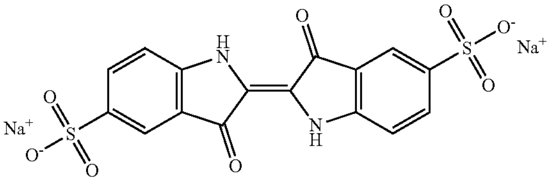 [SMILES: [Na+] ; O=C1/C(=C2\Nc3ccc(S(=O)(=O)[O-])cc3C2=O)Nc2ccc(S(=O)(=O)[O-])cc21 ; [Na+]] | 1% | *** |
| 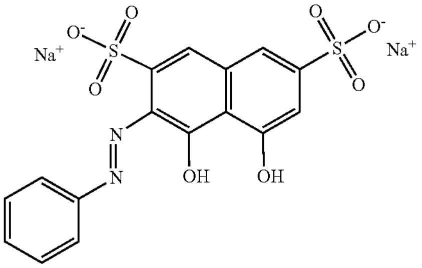 [SMILES: O=S(=O)([O-])c1cc(O)c2c(O)c(/N=N/c3ccccc3)c(S(=O)(=O)[O-])cc2c1 ; [Na+] ; [Na+]] | 1% | *** |

TABLE 1-continued
Additive static gas suppression in 8M KOH electrolyte in the presence of iron powder.
| Additive Structure | Additive Concentration (wt. %) | Gas Suppression |
| --- | --- | --- |
| 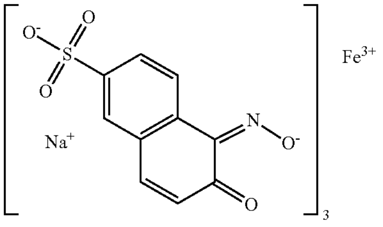 | 1% | *** |
| $H_2O$ 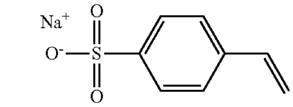 | 0.01% | * |
| 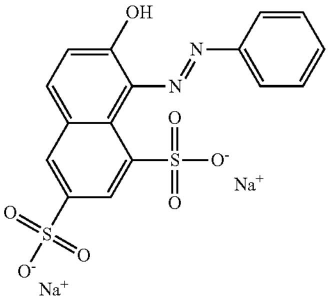 [SMILES: O=S(=O)([O-])c1cc(S(=O)(=O)[O-])c2c(/N=N/c3ccccc3)c(O)ccc2c1 ; [Na+] ; [Na+]] | 1% | *** |
| 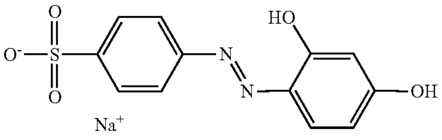 | 1% | *** |
| 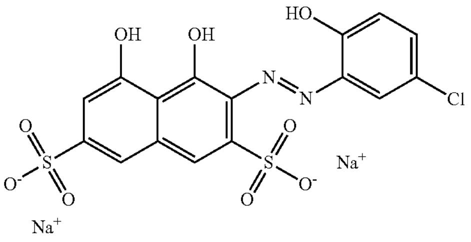 [SMILES: O=S(=O)([O-])c1cc(O)c2c(O)c(/N=N/c3cc(Cl)ccc3O)c(S(=O)(=O)[O-])cc2c1 ; [Na+] ; [Na+]] | 1% | *** |
| 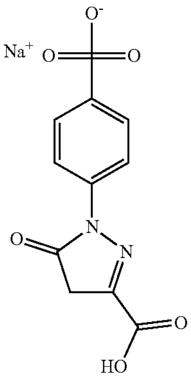 | 1% | *** |

TABLE 1-continued
| Additive static gas suppression in 8M KOH electrolyte in the presence of iron powder. | | |
|---|---|---|
| Additive Structure | Additive Concentration (wt. %) | Gas Suppression |
| 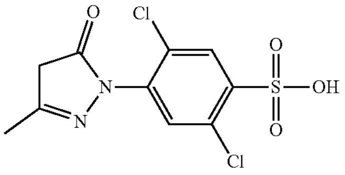 [SMILES: CC1=NN(c2cc(Cl)c(S(=O)(=O)O)cc2Cl)C(=O)C1] | 1% | ** |
| 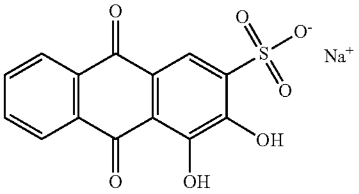 [SMILES: O=C1c2ccccc2C(=O)c2c1cc(S(=O)(=O)[O-])c(O)c2O ; [Na+]] | 1% | *** |
| 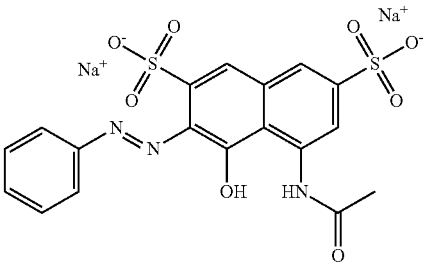 [SMILES: [Na+] ; CC(=O)Nc1cc(S(=O)(=O)[O-])cc2cc(S(=O)(=O)[O-])c(/N=N/c3ccccc3)c(O)c12 ; [Na+]] | 1% | *** |
| 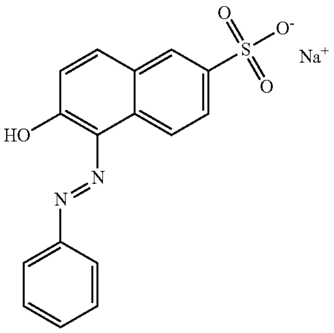 [SMILES: O=S(=O)([O-])c1ccc2c(/N=N/c3ccccc3)c(O)ccc2c1 ; [Na+]] | 0.1% | *** |
| 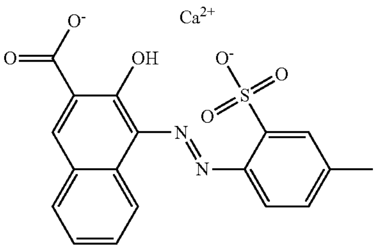 [SMILES: [Ca+2] ; Cc1ccc(/N=N/c2c(O)c(C(=O)[O-])cc3ccccc23)c(S(=O)(=O)[O-])c1] | 0.01% | *** |
| 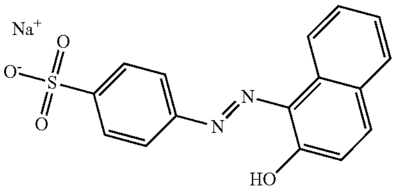 [SMILES: O=S(=O)([O-])c1ccc(/N=N/c2c(O)ccc3ccccc23)cc1 ; [Na+]] | 1% | *** |

TABLE 1-continued
| Additive static gas suppression in 8M KOH electrolyte in the presence of iron powder. | | |
|---|---|---|
| Additive Structure | Additive Concen-tration (wt. %) | Gas Sup-pression |
| 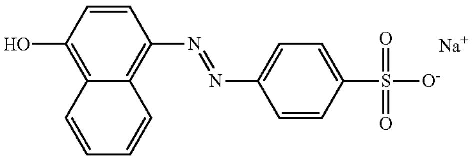 [SMILES: O=S(=O)([O-])c1ccc(/N=N/c2ccc(O)c3ccccc23)cc1 ; [Na+]] | 0.1% | *** |
| 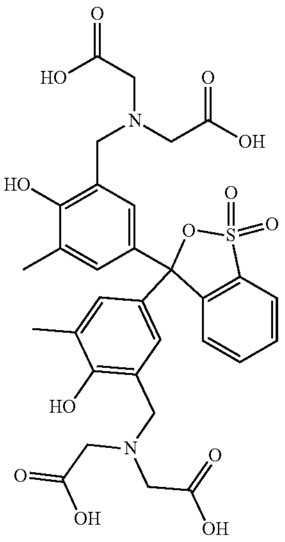 [SMILES: Cc1cc(C2(c3cc(C)c(O)c(CN(CC(=O)O)CC(=O)O)c3)OS(=O)(=O)c3ccccc32)cc(CN(CC(=O)O)CC(=O)O)c1O] | 1% | *** |
| 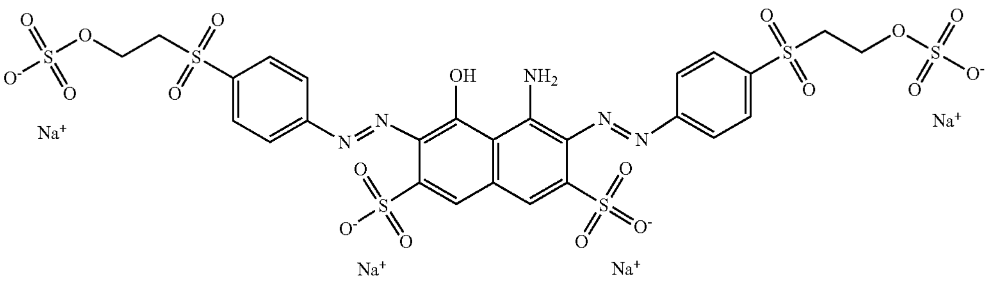 | 0.1% | *** |
| 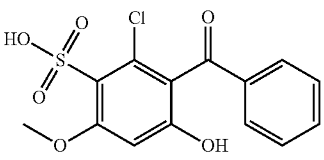 | 0.01% | *** |

TABLE 1-continued
| Additive static gas suppression in 8M KOH electrolyte in the presence of iron powder. | | |
|---|---|---|
| Additive Structure | Additive Concen-tration (wt. %) | Gas Sup-pression |
| 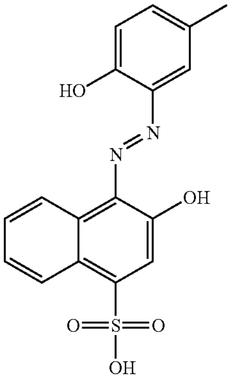 [SMILES: Cc1ccc(O)c(/N=N/c2c(O)cc(S(=O)(=O)O)c3ccccc23)c1] | 1% | *** |
| 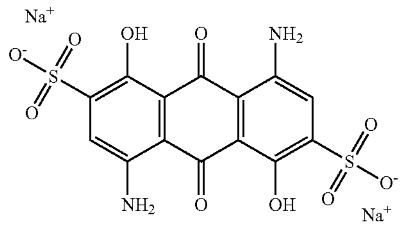 [SMILES: [Na+] ; Nc1cc(S(=O)(=O)[O-])c(O)c2c1C(=O)c1c(O)c(S(=O)(=O)[O-])cc(N)c1C2=O ; [Na+]] | 0.01% | *** |
| 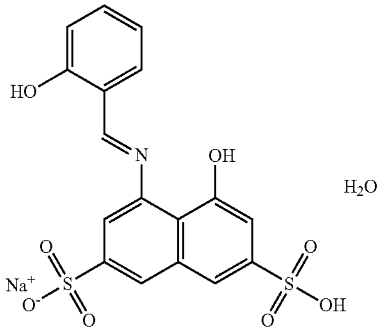 [SMILES: [Na+] ; O=S(=O)([O-])c1cc(/N=C/c2ccccc2O)c2c(O)cc(S(=O)(=O)O)cc2c1 ; O] | 0.1% | *** |
| 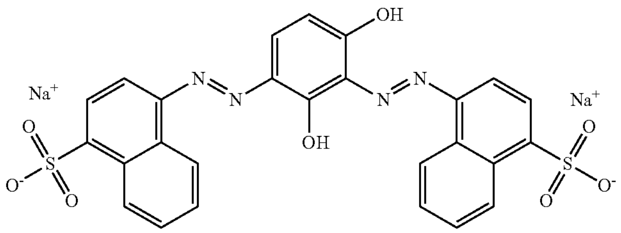 [SMILES: O=S(=O)([O-])c1ccc(/N=N/c2ccc(O)c(/N=N/c3ccc(S(=O)(=O)[O-])c4ccccc34)c2O)c2ccccc12 ; [Na+] ; [Na+]] | 0.1% | *** |
| 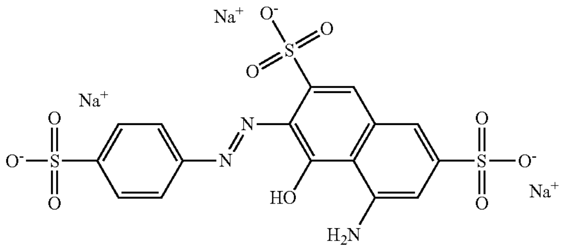 [SMILES: Nc1cc(S(=O)(=O)[O-])cc2cc(S(=O)(=O)[O-])c(/N=N/c3ccc(S(=O)(=O)[O-])cc3)c(O)c12 ; [Na+] ; [Na+] ; [Na+]] | 1% | *** |

TABLE 1-continued

Additive static gas suppression in 8M KOH electrolyte in the presence of iron powder.

| Additive Structure | Additive Concentration (wt. %) | Gas Suppression |
|---|---|---|
| 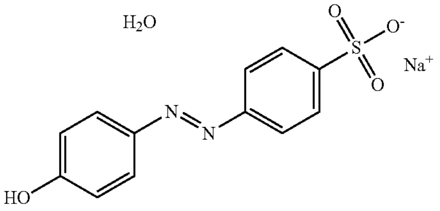 [SMILES: O=S(=O)([O-])c1ccc(/N=N/c2ccc(O)cc2)cc1 ; O ; [Na+]] | 0.01% | *** |
| 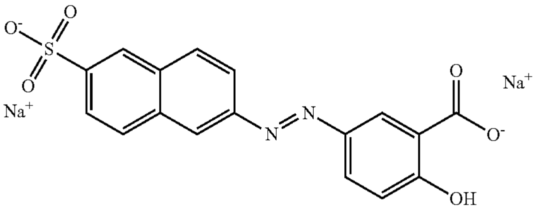 [SMILES: [Na+] ; O=C([O-])c1cc(/N=N/c2ccc3cc(S(=O)(=O)[O-])ccc3c2)ccc1O ; [Na+]] | 0.1% | *** |

(*) is ≥ 25% gas suppression, () is ≥ 50% gas suppression, and (*) is ≥ 75% gas suppression.

Example 2

Static Gas Test: 8M KOH Electrolyte and Zinc Powder

The base electrolyte was an 8M potassium hydroxide (KOH) water solution; to this an amount of additive was added to achieve the concentrations listed in Table 2. Glass headspace vials of 10 mL volume were loaded with 1) 3.125 g of zinc (Zn) metal powder with an average particle size of <10 μm and zinc purity of ≥98% and 2) 12.5 mL of the electrolyte with or without (for control) additive. A graduated 5 mL plastic disposable syringe with 18-gauge needle was inserted into each vial. The vials were placed in a 50° C. oven and the volume of gas produced was measured as the volume of electrolyte displaced from the vial into the syringe. The control consisted of vials containing only metal powder and 8M KOH with no additive present. The control reached 4.8 mL in 5 hours. In Table 2, additives are categorized based on the % gas suppression achieved at 5 hours, as compared to the control. A score of * refers to >15% gas suppression, a score of  refers to >25%, and a score of refers to >35% gas suppression.

TABLE 2

Additive static gas suppression in 8M KOH electrolyte in the presence of zinc powder.

| Additive Structure | Additive Concentration (wt. %) | Gas Suppression |
|---|---|---|
| 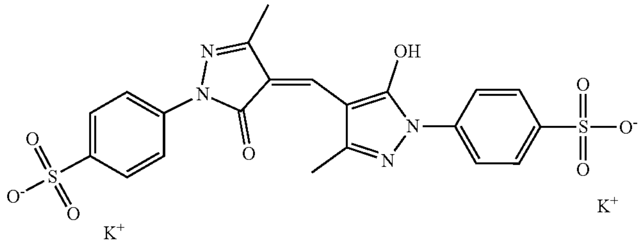 [SMILES: CC1=NN(c2ccc(S(=O)(=O)[O-])cc2)C(=O)/C1=C\c1c(C)nn(-c2ccc(S(=O)(=O)[O-])cc2)c1O ; [K+] ; [K+]] | 0.1% | ** |

TABLE 2-continued
Additive static gas suppression in 8M KOH electrolyte in the presence of zinc powder.
| Additive Structure | Additive Concentration (wt. %) | Gas Suppression |
|---|---|---|
| 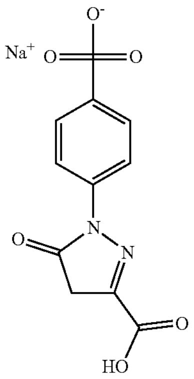 | 1% | ** |
| 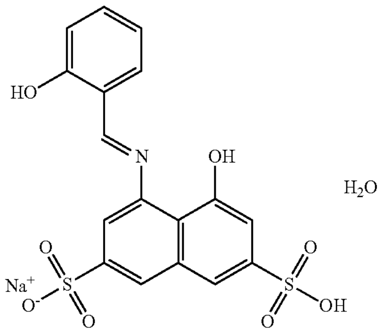 [SMILES: [Na+] ; O=S(=O)([O-])c1cc(/N=C/c2ccccc2O)c2c(O)cc(S(=O)(=O)O)cc2c1 ; O] | 0.1% | ** |
| 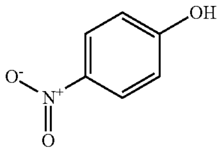 | 0.01% | * |
| 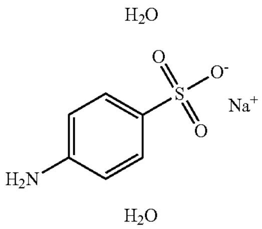 [SMILES: O ; Nc1ccc(S(=O)(=O)[O-])cc1 ; [Na+] ; O] | 1% | * |

TABLE 2-continued

| Additive static gas suppression in 8M KOH electrolyte in the presence of zinc powder. | | |
|---|---|---|
| Additive Structure | Additive Concentration (wt. %) | Gas Suppression |
| 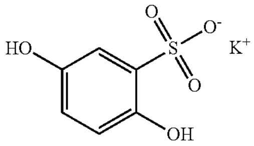 [SMILES: O=S(=O)([O-])c1cc(O)ccc1O ; [K+]] | 1% | * |
| 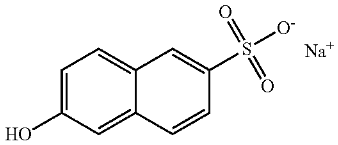 [SMILES: O=S(=O)([O-])c1ccc2cc(O)ccc2c1 ; [Na+]] | 0.1% | *** |
| 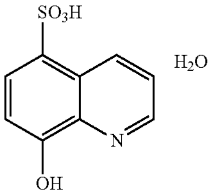 | 0.1% | * |
| 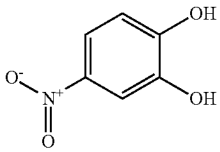 [SMILES: O=[N+]([O-])c1ccc(O)c(O)c1] | 1% | *** |
| 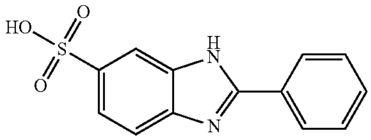 [SMILES: O=S(=O)(O)c1ccc2nc(-c3ccccc3)[nH]c2c1] | 1% | ** |

(*) is >15% gas suppression, () is >25%, and (*) is >35%.

Example 3

Static Gas Test: 2M $ZnSO_4$ and 0.1M $MnSO_4$ with Zinc Alloyed Powder

The base electrolyte was 2M solution of zinc sulfate ($ZnSO_4$) and 0.1M manganese sulfate ($MnSO_4$) in water; to this an amount of additive was added to achieve the concentrations listed in Table 3. Glass headspace vials of 5 mL volume were prepared with 1) 2 g of zinc alloyed powder and 2) 8 mL of the electrolyte. Vials were sealed using crimp on caps with rubber injection stoppers. A graduated 3 mL plastic disposable syringe, with an 18-gauge needle, was inserted into each vial. The vials were placed in a 60° C. oven and the volume of gas produced was measured as the volume of electrolyte displaced from the vial into the syringe. The control consisted of vials containing only metal powder and base electrolyte, no additive present. The control reached 3 mL of gas produced after 72 hours in the oven. Table 3 displays additives that exhibited ≥30% gas suppression at 72 hours, as compared to control.

TABLE 3

| Additive static gas suppression in a 2M ZnSO4 and 0.1M $MnSO_4$ electrolyte in the presence of alloyed zinc powder. | | |
|---|---|---|
| Additive Structure | Additive Concentration (wt.%) | ≥30% gas suppression at hour 72. |
| 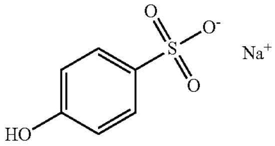 [SMILES: O=S(=O)([O-])c1ccc(O)cc1 ; [Na+]] | 1% | Yes |

TABLE 3-continued

Additive static gas suppression in a 2M ZnSO4 and 0.1M $MnSO_4$ electrolyte in the presence of alloyed zinc powder.

| Additive Structure | Additive Concentration (wt.%) | ≥30% gas suppression at hour 72. |
|---|---|---|
| 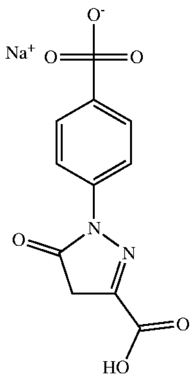 | 0.05% | Yes |

Example 4

Hydrogen Evolution Reaction Overpotential: 8M KOH Electrolyte and Iron Electrode.

The base electrolyte was an 8M potassium hydroxide (KOH) water solution; to this an amount of additive was added to achieve the concentrations listed in Table 4. The working electrode was an epoxy-coated 99.5% pure iron (Fe) rod with a 3.2 mm diameter and 0.08 $cm^2$ working area. The reference electrode was a Hg/HgO electrode filled with 4.24M KOH. The counter electrode was a 0.5 mm diameter platinum wire. Linear scan voltammetry (LSV) was performed at a scan rate of 1 mV/s from −1.1 to −1.4 V vs. Hg/HgO (4.24M KOH) to measure the hydrogen evolution reaction (HER) overpotential in the presence of additives vs. control.

By letting $E_0$ (V) and $E'_0$ (V) be the HER onset voltages of electrolytes without and with the presence of HER suppressing additive, respectively, the HER overpotential $\eta$ (mV) is defined as:

$$\eta = E_0 - E'_0.$$

In the presence of HER suppressing additive, the HER onset voltage is more negative compared to that of the blank electrolyte. A positive q value indicates that the additive is suppressing the HER, which is desired. In Table 4, a score of * refers to a test where $\eta > 7$ mV, a score of  refers to $\eta > 12$ mV, and a score of * refers to $\eta > 25$ mV.

TABLE 4

Additive HER overpotential on iron (Fe) electrodes in 8M KOH.

| Additive Structure | Additive Concentration (wt.%) | HER |
|---|---|---|
| 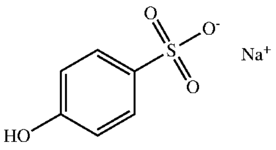 [SMILES: O=S(=O)([O-])c1ccc(O)cc1 ; [Na+]] | 1% | ** |
| 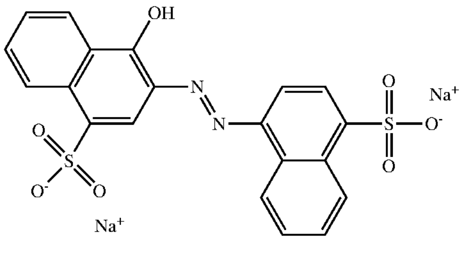 [SMILES: O=S(=O)([O-])c1ccc(/N=N/c2cc(S(=O)(=O)[O-])c3ccccc3c2O)c2ccccc12 ; [Na+] ; [Na+]] | 0.1% | *** |
| 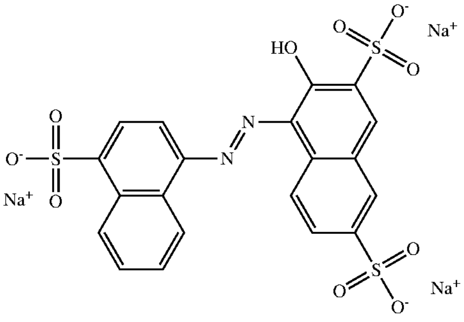 [SMILES: [Na+] ; O=S(=O)([O-])c1ccc2c(/N=N/c3ccc(S(=O)(=O)[O-])c4ccccc34)c(O)c(S(=O)(=O)[O-])cc2c1 ; [Na+] ; [Na+]] | 0.1% | ** |

TABLE 4-continued
| Additive HER overpotential on iron (Fe) electrodes in 8M KOH. | | |
|---|---|---|
| Additive Structure | Additive Concentration (wt.%) | HER |
| 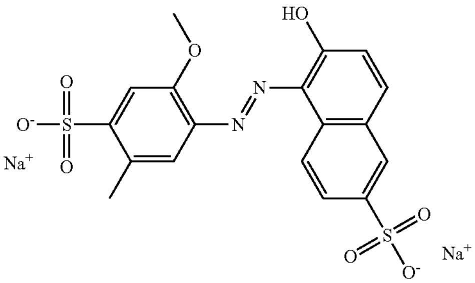 [SMILES: [Na+] ; COc1cc(S(=O)(=O)[O-])c(C)cc1/N=N/c1c(O)ccc2cc(S(=O)(=O)[O-])ccc12 ; [Na+]] | 0.1% | * |
| 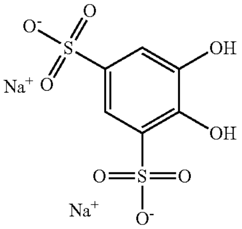 [SMILES: [Na+] ; O=S(=O)([O-])c1cc(O)c(O)c(S(=O)(=O)[O-])c1 ; [Na+]] | 1% | *** |
| 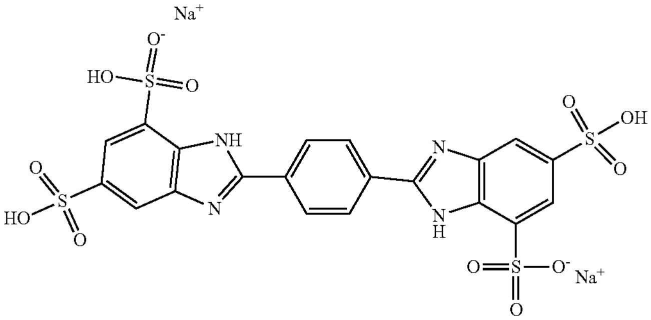 | 1% | * |
| 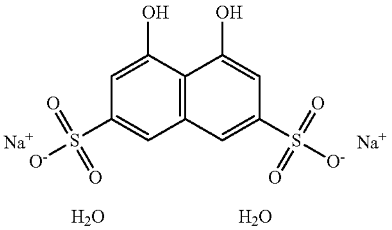 | 1% | * |
| 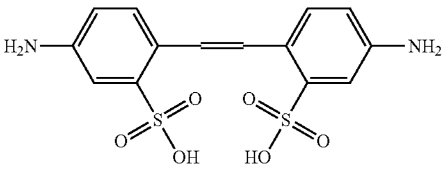 [SMILES: Nc1ccc(C=Cc2ccc(N)cc2S(=O)(=O)O)c(S(=O)(=O)O)c1] | 0.01% | ** |
| 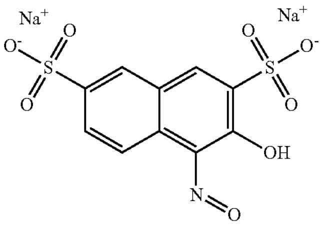 [SMILES: [Na+] ; [Na+] ; O=Nc1c(O)c(S(=O)(=O)[O-])cc2cc(S(=O)(=O)[O-])ccc12] | 0.05% | * |

TABLE 4-continued

Additive HER overpotential on iron (Fe) electrodes in 8M KOH.

| Additive Structure | Additive Concentration (wt.%) | HER |
|---|---|---|
| 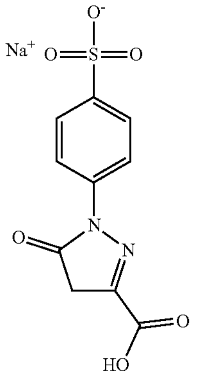 [SMILES: [Na+] ; O=C(O)C1=NN(c2ccc(S(=O)(=O)[O-])cc2)C(=O)C1] | 1% | * |
| 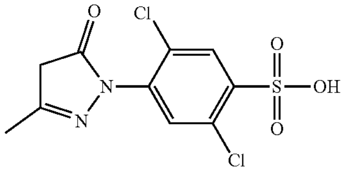 [SMILES: CC1=NN(c2cc(Cl)c(S(=O)(=O)O)cc2Cl)C(=O)C1] | 1% | * |
| 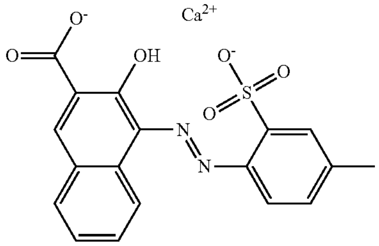 [SMILES: [Ca+2] ; Cc1ccc(/N=N/c2c(O)c(C(=O)[O-])cc3ccccc23)c(S(=O)(=O)[O-])c1] | 0.01% | ** |
| 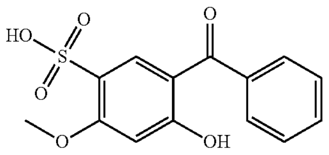 [SMILES: COc1cc(O)c(C(=O)c2ccccc2)cc1S(=O)(=O)O] | 0.02% | *** |
| 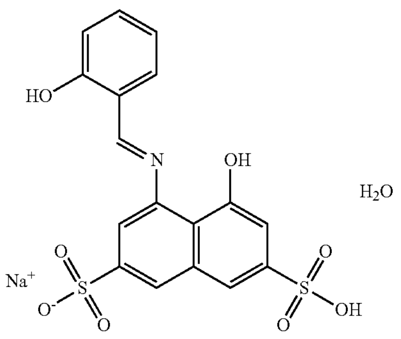 [SMILES: [Na+] ; O=S(=O)([O-])c1cc(/N=C/c2ccccc2O)c2c(O)cc(S(=O)(=O)O)cc2c1 ; O] | 0.1% | ** |

(*) is η > 7 mV, () is η > 12 mV, and (*) is η > 25 mV.

Example 5

Coulombic Efficiency: $FeCl_2$

The base electrolyte was 2M iron (II) chloride ($FeCl_2$) water solution. The additives were added to 50 mL of the base electrolyte at the concentrations listed in Table 5. Additive-electrolyte solutions were maintained at 55° C. for the duration of the test. The working electrode was a 2 mm diameter, 0.03 $cm^2$ area, gold electrode. The reference electrode was an Ag/AgCl electrode filled with a saturated KCl solution. The counter electrode was a 0.5 mm diameter platinum wire. During the charge cycle, iron was deposited galvanostatically on the working electrode at a current density of 20 mA/$cm^2$ for the duration of 30 minutes. During the discharge cycle, deposited iron was stripped galvanostatically at a current density of 20 mA/$cm^2$ until the voltage reached 0 V vs Ag/AgCl (saturated KCl), indicating that the iron has been fully stripped.

To calculate the total charge (Coulombs) stored in the charge cycle, the charge currents (Amperes) over the charge duration (hours) were integrated. The total charge (Coulombs) released during the discharge cycle was calculated by integrating the discharge currents (Amperes) over the duration of time (hours) it took to strip the electrodeposited iron from the working electrode. The coulombic efficiency (CE) is given as:

$$CE = \frac{\text{Total charge (Coulombs) during the discharge cycle}}{\text{Total charge (Coulombs) during the charge cycle}}$$

The control was the base electrolyte (no additive present) and had a CE of 71.4%. When an additive is present, a CE value greater than that of the control indicates the additive is effectively suppressing the side reactions that lead to the low CE see in the control case. In Table 5, a score of * indicates that the additive produced CE >74.0%, a score of  produced CE >78.0%, and a score of * produced CE >85.0%.

TABLE 5

Coulombic efficiency for additives in an $FeCl_2$ electrolyte.

| Additive Structure | Additive Concentration (wt. %) | Coulombic Efficiency |
|---|---|---|
| 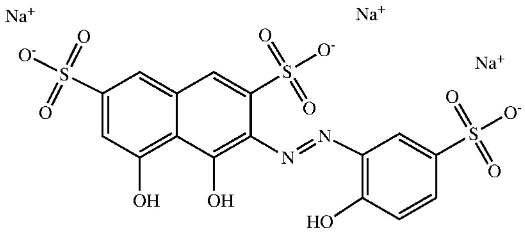 [SMILES: [Na+] ; [Na+] ; O=S(=O)([O-])c1ccc(O)c(/N=N/c2c(S(=O)(=O)[O-])cc3cc(S(=O)(=O)[O-])cc(O)c3c2O)c1 ; [Na+]] | 1% | *** |
| 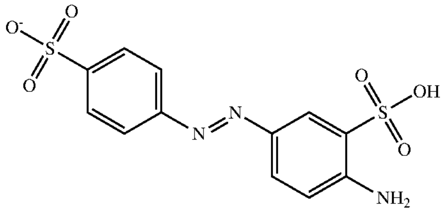 [SMILES: Nc1ccc(/N=N/c2ccc(S(=O)(=O)[O-])cc2)cc1S(=O)(=O)O] | 1% | *** |
| 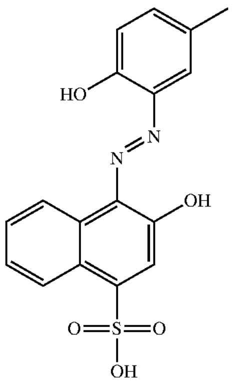 [SMILES: Cc1ccc(O)c(/N=N/c2c(O)cc(S(=O)(=O)O)c3ccccc23)c1] | 0.05% | *** |

TABLE 5-continued
Coulombic efficiency for additives in an $FeCl_2$ electrolyte.
| Additive Structure | Additive Concentration (wt. %) | Coulombic Efficiency |
|---|---|---|
| 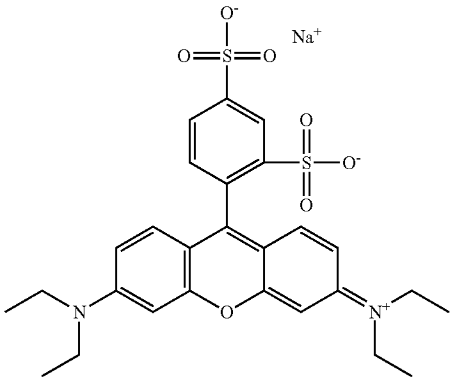 [SMILES: CCN(CC)c1ccc2c(-c3ccc(S(=O)(=O)[O-])cc3S(=O)(=O)[O-])c3ccc(=[N+](CC)CC)cc-3oc2c1 ; [Na+]] | 0.01% | ** |
| 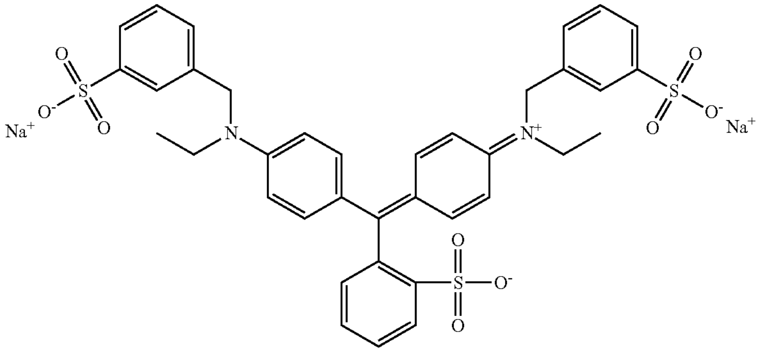 [SMILES: [Na+] ; CCN(Cc1cccc(S(=O)(=O)[O-])c1)c1ccc(C(=C2C=CC(=[N+](CC)Cc3cccc(S(=O)(=O)[O-])c3)C=C2)c2ccccc2S(=O)(=O)[O-])cc1 ; [Na+]] | 1% | * |
| 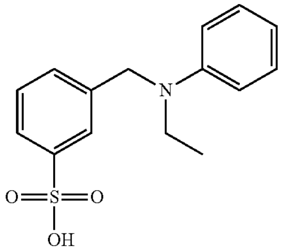 [SMILES: CCN(Cc1cccc(S(=O)(=O)O)c1)c1ccccc1] | 0.05% | * |
| 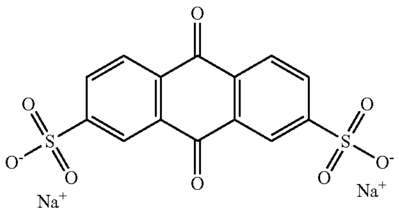 [SMILES: O=C1c2ccc(S(=O)(=O)[O-])cc2C(=O)c2cc(S(=O)(=O)[O-])ccc21 ; [Na+] ; [Na+]] | 0.5% | *** |
| 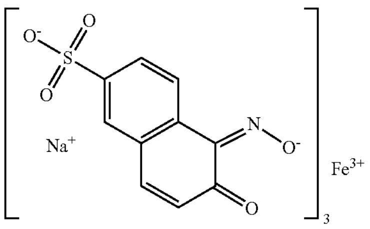 | 0.1% | *** |

TABLE 5-continued

| Coulombic efficiency for additives in an $FeCl_2$ electrolyte. | | |
|---|---|---|
| Additive Structure | Additive Concentration (wt. %) | Coulombic Efficiency |
| 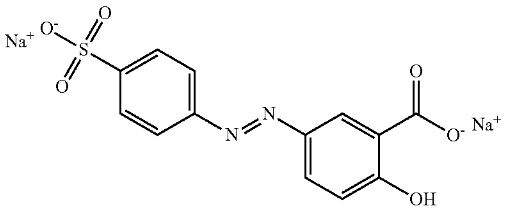 [SMILES: [Na+] ; O=C([O-])c1cc(/N=N/c2ccc(S(=O)(=O)[O-])cc2)ccc1O ; [Na+]] | 0.04% | * |
| 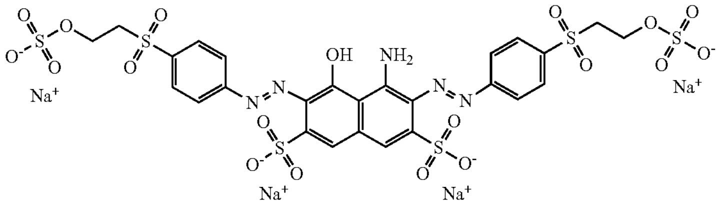 [SMILES: Nc1c(/N=N/c2ccc(S(=O)(=O)CCOS(=O)(=O)[O-])cc2)c(S(=O)(=O)[O-])cc2cc(S(=O)(=O)[O-])c(/N=N/c3ccc(S(=O)(=O)CCOS(=O)(=O)[O-])cc3)c(O)c12 ; [Na+] ; [Na+] ; [Na+] ; [Na+]] | 1% | ** |

(*) means CE > 74.0%, () is CE > 78.0%, and (*) is CE >85.0%.

Example 6

Linear Scan Voltammetry Plating Test: $FeCl_2$

The base electrolyte was 2M iron (II) chloride $FeCl_2$ water solution. The additives were added to 50 mL of the base electrolyte at the concentrations listed in Table 6. Additive-electrolyte solutions were maintained at 55° C. for the duration of the test. The working electrode was a 3 mm diameter, 0.07 $cm^2$ area, glassy carbon electrode. The reference electrode was an Ag/AgCl electrode filled with a saturated KCl solution. The counter electrode was a 0.5 mm diameter platinum wire. Linear scan voltammetry (LSV) was performed at a scan rate of 1 mV/s from −0.5 to −1.2 V vs Ag/AgCl (saturated KCl). During the test, the glassy carbon electrode surface was video recorded. This allowed for the observation of the electrodeposition and, in some cases, the subsequent delamination of iron from the electrode surface. The control was the base electrolyte (no additive present) and in this case the Fe electrodeposition reaction and HER occur simultaneously. Due to HER, the electrodeposited Fe has poor adhesion to the glassy carbon surface. In the control case, a significant amount of electrodeposited Fe started to delaminate at −0.89 V vs Ag/AgCl (saturated KCl). The delamination pattern and level of adherence seen on the glassy carbon surface was evaluated in the presence of additives. In Table 6 a score of * indicates that while delamination did eventually occur, there was some improvement in the adherence of electrodeposited Fe. A score of  means that there was visible cracking in the plated Fe, but complete delamination was not observed. A score of * means that there was strong adherence of the electrodeposited Fe to the glassy carbon surface and no delamination or cracking was observed throughout the test duration.

TABLE 6

| Adherence of electrodeposited Fe to a glassy carbon surface in the presence of additives. The base electrolyte was 2M $FeCl_2$. | | |
|---|---|---|
| Additive Structure | Additive Concentration (wt.%) | Plating |
| 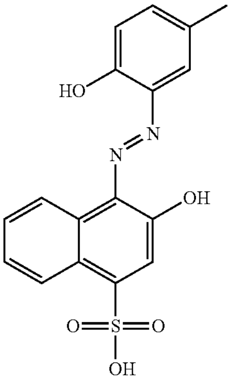 [SMILES: Cc1ccc(O)c(/N=N/c2c(O)cc(S(=O)(=O)O)c3ccccc23)c1] | 0.05% | *** |

TABLE 6-continued
Adherence of electrodeposited Fe to a glassy carbon surface in the presence of additives. The base electrolyte was 2M $FeCl_2$.
| Additive Structure | Additive Concentration (wt.%) | Plating |
|---|---|---|
| 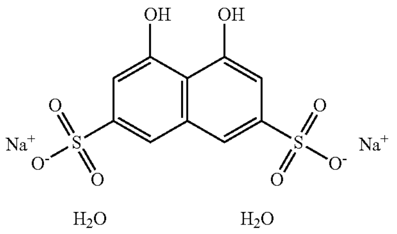 | 0.05% | * |
| 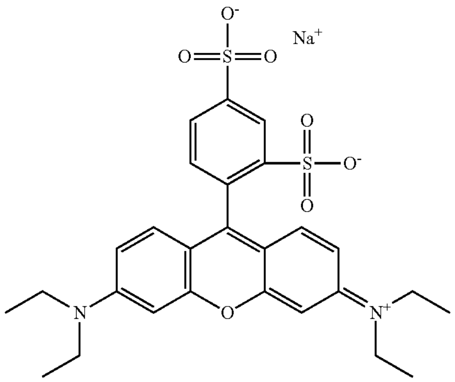 [SMILES: CCN(CC)c1ccc2c(-c3ccc(S(=O)(=O)[O-])cc3S(=O)(=O)[O-])c3ccc(=[N+](CC)CC)cc-3oc2c1 ; [Na+]] | 0.01% | *** |
| 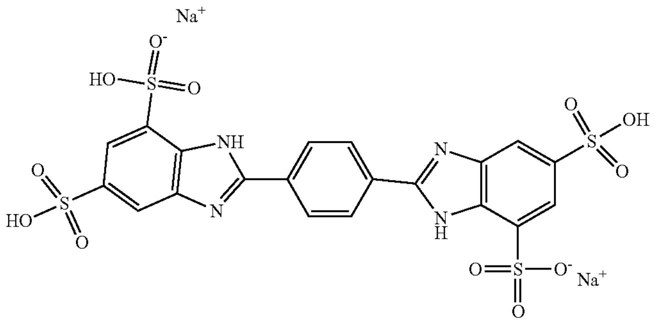 | 0.01% | * |
| 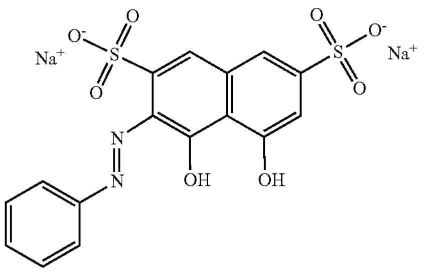 [SMILES: O=S(=O)([O-])c1cc(O)c2c(O)c(/N=N/c3ccccc3)c(S(=O)(=O)[O-])cc2c1 ; [Na+] ; [Na+]] | 0.01% | *** |
| 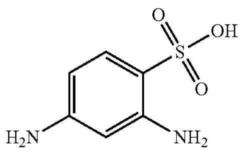 | 0.5% | ** |

TABLE 6-continued
Adherence of electrodeposited Fe to a glassy carbon surface in the presence of additives. The base electrolyte was 2M $FeCl_2$.
| Additive Structure | Additive Concentration (wt.%) | Plating |
|---|---|---|
| 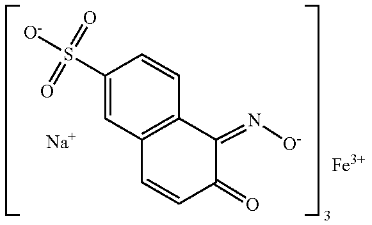 | 0.1% | ** |
| 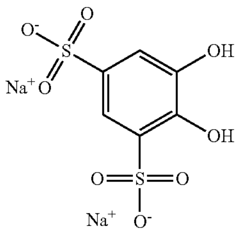 [SMILES: [Na+] ; O=S(=O)([O-])c1cc(O)c(O)c(S(=O)(=O)[O-])c1 ; [Na+]] | 1% | * |
| 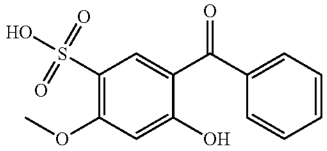 [SMILES: COc1cc(O)c(C(=O)c2ccccc2)cc1S(=O)(=O)O] | 0.05% | * |
| 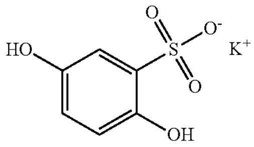 [SMILES: O=S(=O)([O-])c1cc(O)ccc1O ; [K+]] | 0.1% | ** |
| 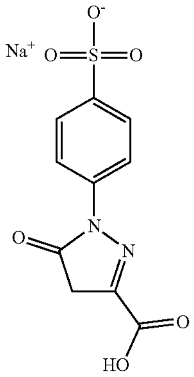 | 0.1% | * |
| 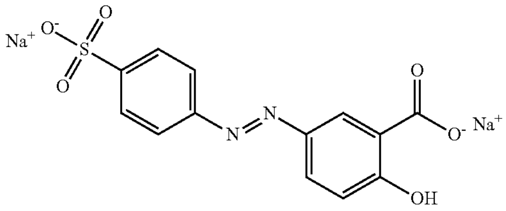 [SMILES: [Na+] ; O=C([O-])c1cc(/N=N/c2ccc(S(=O)(=O)[O-])cc2)ccc1O ; [Na+]] | 0.04% | *** |

TABLE 6-continued

Adherence of electrodeposited Fe to a glassy carbon surface in the presence of additives. The base electrolyte was 2M $FeCl_2$.

| Additive Structure | Additive Concentration (wt.%) | Plating |
|---|---|---|
| 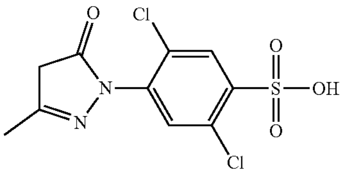 [SMILES: CC1=NN(c2cc(Cl)c(S(=O)(=O)O)cc2Cl)C(=O)C1] | 0.04% | * |

(*) means adherence was somewhat improved in comparison to control, () means there was cracking but not complect delamination, and (*) means no cracking or delamination.

Example 7

Potentiostatic Plating Test: 2M $ZnSO_4$ and 0.1M $MnSO_4$

The base electrolyte was 2M zinc sulfate ($ZnSO_4$) and 0.1M manganese sulfate $MnSO_4$ water solution. The additives were added to 60 mL of the base electrolyte at the concentrations listed in Table 7. The working electrode was a 3 mm diameter, 0.07 $cm^2$ area, glassy carbon electrode. The reference electrode was an Ag/AgCl electrode filled with saturated KCl. The counter electrode was a 0.5 mm diameter platinum wire. After charging the working electrode at −1.5V vs Ag/AgCl for 30 minutes, microscope images were taken of the plated zinc. This allowed for visual assessment of the quality of zinc plating. The control was the base electrolyte (no additive present) and it exhibited extensive dendrite growth during the test. In the presence of additives dendrite growth was suppressed either partially or nearly completely (Table 7).

TABLE 7

Potentiostatic zinc plating with a base electrolyte of 2M $ZnSO_4$ and 0.1M $MnSO_4$.

| Additive Structure | Additive Concen tration (wt.%) | Dendrite growth supp-ression |
|---|---|---|
| 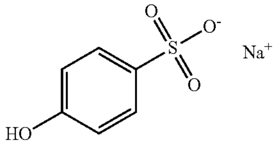 [SMILES: O=S(=O)([O-])c1ccc(O)cc1 ; [Na+]] | 1% | Partial |
| 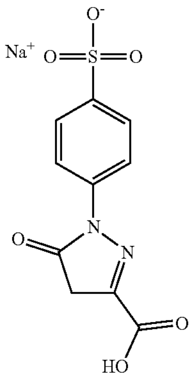 [SMILES: [Na+] ; O=C(O)C1=NN(c2ccc(S(=O)(=O)[O-])cc2)C(=O)C1] | 0.05% | Partial |

TABLE 7-continued

Potentiostatic zinc plating with a base electrolyte of 2M $ZnSO_4$ and 0.1M $MnSO_4$.

| Additive Structure | Additive Concen tration (wt.%) | Dendrite growth supp-ression |
|---|---|---|
| 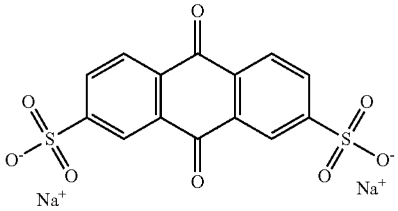 [SMILES: O=C1c2ccc(S(=O)(=O)[O-])cc2C(=O)c2cc(S(=O)(=O)[O-])ccc21 ; [Na+] ; [Na+]] | 1% | Nearly complete |

Example 8

Potentiostatic Plating Test: $ZnBr_2$

The base electrolyte was 2M zinc bromide ($ZnBr_2$) with 0.5M potassium chloride (KCl) water solution. The additives were added to 30 mL of the base electrolyte at the concentrations listed in Table 8. The working electrode was a 3 mm diameter, 0.07 $cm^2$ area, glassy carbon electrode. The reference electrode was an Ag/AgCl electrode filled with saturated KCl. The counter electrode was 0.5 mm diameter platinum wire. After charging the working electrode at −1.2 V vs Ag/AgCl for 15 minutes microscopic images were taken of the plated zinc. This allowed for visual assessment of the quality of zinc plating and edge dendrite growth during plating. The control was the base electrolyte (no additive present) and exhibited edge dendrite growth exceeding 0.5 mm in length. In Table 8, a score of * indicates that edge dendrite growth was reduced to 0.3-0.4 mm, a score of  indicates that edge dendrite growth was reduced to 0.2-0.3 mm, and a score of  indicates that edge dendrite growth was reduced to <0.2 mm.

TABLE 8
Potentiostatic Zn plating with a base electrolyte of 2M $ZnBr_2$ and 0.5M KCl.
| Additive Structure | Additive Concentration (wt. %) | Plating |
| --- | --- | --- |
| 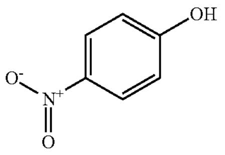 | 0.1% | ** |
| 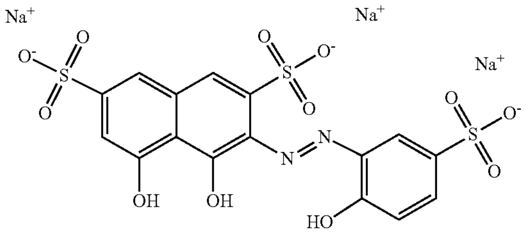 [SMILES: [Na+] ; [Na+] ; O=S(=O)([O-])c1ccc(O)c(/N=N/c2c(S(=O)(=O)[O-])cc3cc(S(=O)(=O)[O-])cc(O)c3c2O)c1 ; [Na+]] | 0.1% | * |
| 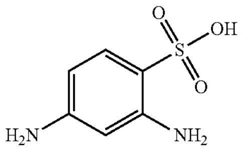 | 0.1% | ** |
| 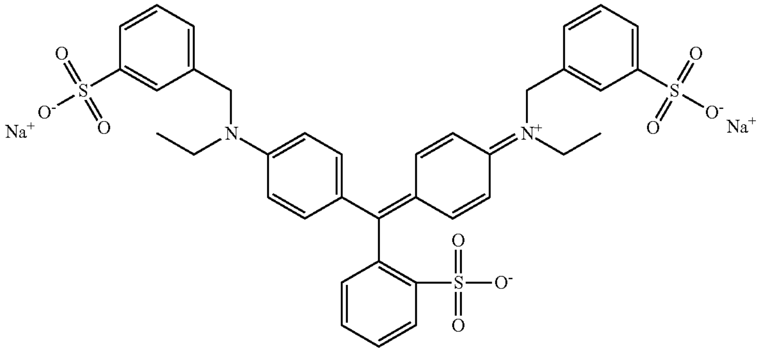 [SMILES: [Na+] ; CCN(Cc1cccc(S(=O)(=O)[O-])c1)c1ccc(C(=C2C=CC(=[N+](CC)Cc3cccc(S(=O)(=O)[O-])c3)C=C2)c2ccccc2S(=O)(=O)[O-])cc1 ; [Na+]] | 1% | *** |
| 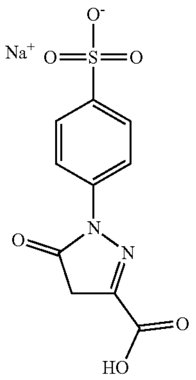 | 0.1% | ** |
(*) means edge dendrite growth was reduced to ~ 0.3-0.4 mm, () means edge dendrite growth was ~ 0.2-0.3 mm, and (*) means edge dendrite growth was < 0.2 mm.

Example 9

Static Gas Test: 4.5M KOH Electrolyte and Iron Powder

The base electrolyte was 4.5M potassium hydroxide (KOH) water solution. To this, 40 wt. % of an additive was added (Table 9). A 5 mL glass headspace vial was loaded with 1) 2 g of iron powder with an average particle size of 1-9 μm and metal purity of 99.9%, and 2) 8 mL of the base electrolyte. Vials were sealed using crimp-on caps with rubber injection stoppers. A graduated 3 mL plastic disposable syringe with 18-gauge needle was inserted into the vial. The vial was placed in a 50° C. oven and the volume of gas produced was measured as the volume of electrolyte displaced from the vial into the syringe. The control consisted of vials containing only metal powder and 4.5M KOH electrolyte, no additive present. The control reached 3 mL of gas produced after 6 hours in the oven. Table 9 displays an additive that maintained complete gas suppression for the full 48 hour test duration.

TABLE 9

Additive static gas suppression in a 4.5M KOH electrolyte in the presence of iron powder.

| Additive Structure | Additive Concentration (wt. %) | Gas Suppression |
|---|---|---|
| 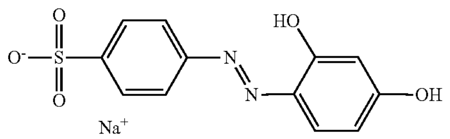 [SMILES: O=S(=O)([O-])c1ccc(/N=N/c2ccc(O)cc2O)cc1 ; [Na+]] | 40% | Full suppression |

TABLE 10

Mass of electrodeposited metal Zn from a base electrolyte of $ZnBr_2$ and 0.5M KCl.

| Additive Structure | Concentration of $ZnBr_2$ | Additive Concentration (wt.%) | Zn plated |
|---|---|---|---|
| 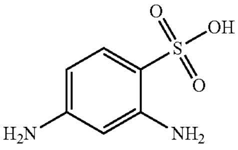 [SMILES: Nc1ccc(S(=O)(=O)O)c(N)c1] | 2M | 0.1% | * |

Example 10

Mass of Electrodeposited Metal Test: $ZnBr_2$

The base electrolyte was a water solution of 0.5M potassium chloride (KCl) with zinc bromide ($ZnBr_2$) at either 2M (to represent bottom-of-charge) or 0.1M (to represent top-of-charge). The additives were added to 30 mL of that base electrolyte at the concentrations listed in Table 10. The working electrode was a 3 mm diameter, 0.07 $cm^2$ area, glassy carbon electrode. The reference electrode was an Ag/AgCl electrode filled with saturated KCl. The counter electrode was 0.5 mm diameter platinum wire. The working electrode was charged at −1.2 V vs Ag/AgCl for 30 minutes. This allowed for the calculation of the mass of plated zinc using Faraday's equation for electrodeposition. The control was the base electrolyte with no additive present. The mass of zinc plated in the presence of additives was compared to that of the control. In Table 10, a score of * indicates a >1% increase in zinc deposition by mass relative to control and a score of ** means that a >15% increase in zinc deposition was observed for that condition.

TABLE 10-continued

Mass of electrodeposited metal Zn from a base electrolyte of $ZnBr_2$ and 0.5M KCl.

| Additive Structure | Concentration of $ZnBr_2$ | Additive Concentration (wt.%) | Zn plated |
|---|---|---|---|
| 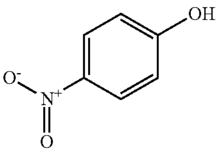 | 0.1M | 0.001% | ** |
| 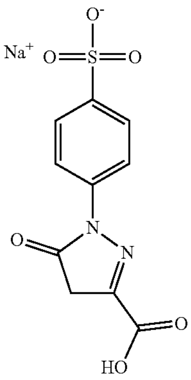 [SMILES: [Na+] ; O=C(O)C1=NN(c2ccc(S(=O)(=O)[O-])cc2)C(=O)C1] | 0.1M | 0.001% | ** |

(*) means > 1% increase by mass, and (**) mean > 15% increase by mass.

Example 11

Static Gas Test: 4.5M or 8M KOH Electrolyte and Iron Powder

A base electrolyte consisting of either a 4.5M or 8M potassium hydroxide (KOH) water solution was prepared; to this an amount of additive was added to achieve the concentrations listed in Table 1. Glass headspace vials of 10 mL volume were loaded with 1) 3.125 g of iron (Fe) metal powder with an average particle size of 1-9 m and iron purity of 99.9% and 2) 12.5 mL of the electrolyte with or without (for control) additive. Vials were sealed using crimp-on caps with rubber injection stoppers. A graduated 5 mL plastic disposable syringe with 18-gauge needle was inserted into each vial. The vials were placed in a 50° C. oven and the volume of gas produced was measured as the volume of electrolyte displaced from the vial into the syringe. The controls consisted of vials containing only metal powder and base electrolyte, no additive present. The controls with 4.5M KOH and 8M KOH electrolyte produced 5 mL of gas after being in the oven for 5 hours and 4 hours respectively. In Table 1, additives are categorized based on the percentage of gas suppressed at either 5 or 4 hours, as compared to the 4.5M KOH or 8M KOH controls respectively. A score of * means ≥25% gas suppression, a score of  means ≥50% gas suppression, and a score of * means ≥75% gas suppression.

TABLE 11

Additive static gas suppression in 4.5M or 8M KOH electrolyte in the presence of iron powder.

| Additive Structure | Concentration of KOH (M) | Additive Concentration (wt. %) | Gas Suppression |
|---|---|---|---|
| 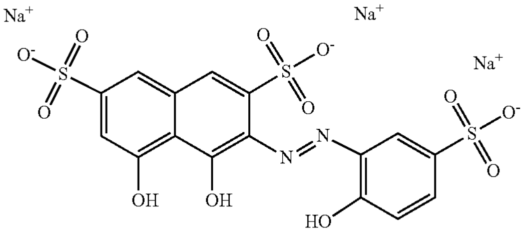 [SMILES: [Na+] ; [Na+] ; O=S(=O)([O-])c1ccc(O)c(/N=N/c2c(S(=O)(=O)[O-])cc3cc(S(=O)(=O)[O-])cc(O)c3c2O)c1 ; [Na+]] | 8M | 0.001% | ** |
| 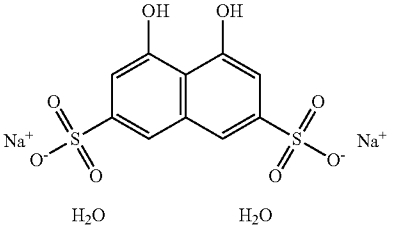 [SMILES: [Na+] ; O=S(=O)([O-])c1cc(O)c2c(O)cc(S(=O)(=O)[O-])cc2c1 ; [Na+] ; O ; O] | 4.5M | 10% | *** |
| 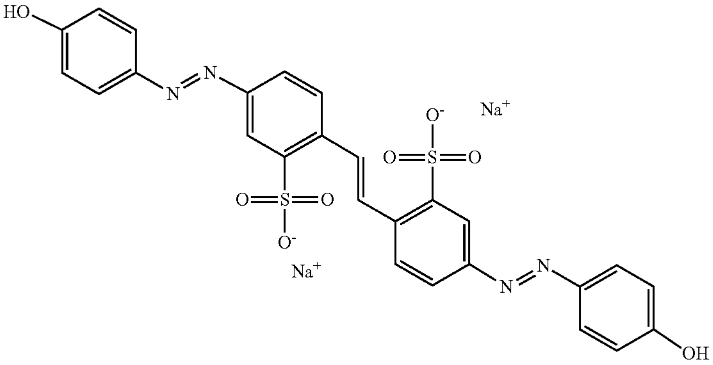 [SMILES: O=S(=O)([O-])c1cc(/N=N/c2ccc(O)cc2)ccc1/C=C/c1ccc(/N=N/c2ccc(O)cc2)cc1S(=O)(=O)[O-] ; [Na+] ; [Na+]] | 8M | 1% | *** |
| 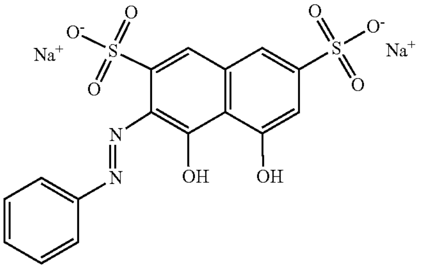 [SMILES: O=S(=O)([O-])c1cc(O)c2c(O)c(/N=N/c3ccccc3)c(S(=O)(=O)[O-])cc2c1 ; [Na+] ; [Na+]] | 8M | 1% | *** |

TABLE 11-continued

| Additive static gas suppression in 4.5M or 8M KOH electrolyte in the presence of iron powder. | | | |
|---|---|---|---|
| Additive Structure | Concentration of KOH (M) | Additive Concentration (wt. %) | Gas Suppression |
| 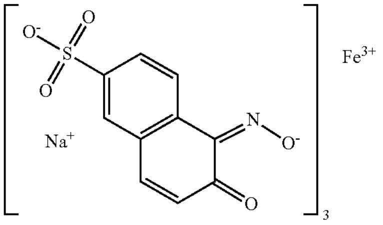 | 8M | 1% | *** |
| 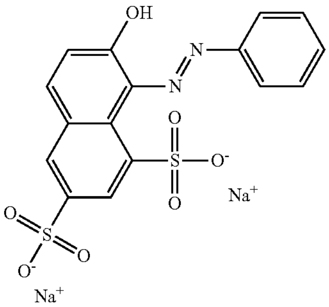 [SMILES: O=S(=O)([O-])c1cc(S(=O)(=O)[O-])c2c(/N=N/c3ccccc3)c(O)ccc2c1 ; [Na+] ; [Na+]] | 8M | 1% | *** |
| 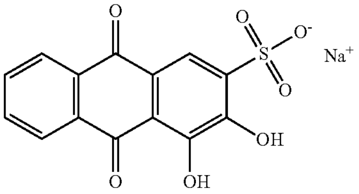 [SMILES: O=C1c2ccccc2C(=O)c2c1cc(S(=O)(=O)[O-])c(O)c2O ; [Na+]] | 8M | 1% | *** |
| 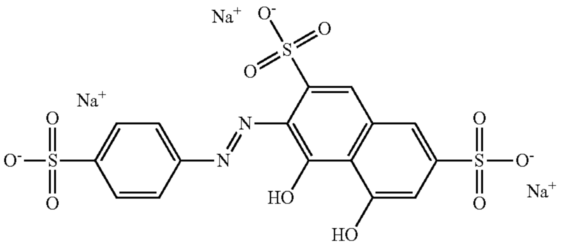 [SMILES: O=S(=O)([O-])c1ccc(/N=N/c2c(S(=O)(=O)[O-])cc3cc(S(=O)(=O)[O-])cc(O)c3c2O)cc1 ; [Na+] ; [Na+] ; [Na+]] | 8M | 1% | *** |
| 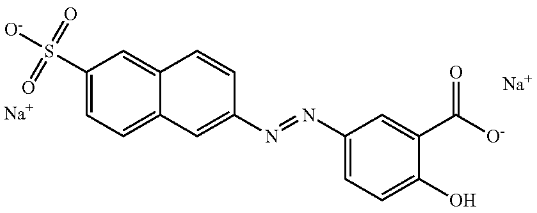 [SMILES: [Na+] ; O=C([O-])c1cc(/N=N/c2ccc3cc(S(=O)(=O)[O-])ccc3c2)ccc1O ; [Na+]] | 8M | 0.1% | *** |

(*) is ≥ 25% gas suppression, () is ≥ 50% gas suppression, and (*) is ≥ 75% gas suppression. Additive concentrations are given in a wt% defined as mass of additive per mass of electrolyte.

Example 12

Coulombic Efficiency: $FeCl_2$

A base electrolyte was created as a 2M iron (II) chloride ($FeCl_2$) water solution. The additives were added to 50 mL of the base electrolyte at the concentrations listed in Table 2. value greater than that of the control indicates the additive is effectively suppressing the side reactions that lead to the low CE see in the control case. In Table 2, a score of * indicates that the additive produced CE >74.0%, a score of  produced CE >78.0%, and a score of * produced CE >85.0%.

TABLE 12

Coulombic efficiency for additives in an $FeCl_2$ electrolyte.

| Additive Structure | Additive Concentration (wt. %) | Coulombic Efficiency |
|---|---|---|
| 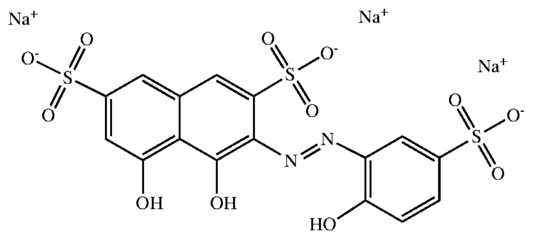 [SMILES: [Na+] ; [Na+] ; O=S(=O)([O-])c1ccc(O)c(/N=N/c2c(S(=O)(=O)[O-])cc3cc(S(=O)(=O)[O-])cc(O)c3c2O)c1 ; [Na+]] | 1% | *** |
| 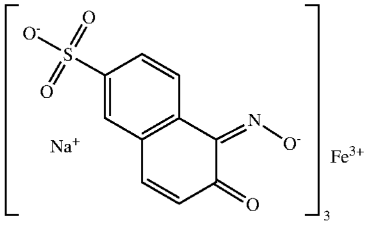 | 0.1% | *** |

(*) means CE > 74.0%, () is CE > 78.0%, and (*) is CE > 85.0%. Additive concentrations are given in a wt % defined as mass of additive per mass of electrolyte.

Additive-electrolyte solutions were maintained at 55° C. for the duration of the test. The working electrode was circular with a 2 mm diameter, 0.03 $cm^2$ area, and gold electrode. The reference electrode was an Ag/AgCl electrode filled with a saturated KCl solution. The counter electrode was a 0.5 mm diameter platinum wire. During the charge cycle, iron was deposited galvanostatically on the working electrode at a current density of 20 $mA/cm^2$ for the duration of 30 minutes. During the discharge cycle, deposited iron was stripped galvanostatically at a current density of 20 $mA/cm^2$ until the voltage reached 0 V vs Ag/AgCl (saturated KCl), indicating that the iron has been fully stripped.

To calculate the total charge (in Coulombs) stored in the charge cycle, the charge currents (in Amperes) over the charge duration (in hours) were integrated. The total charge (in Coulombs) released during the discharge cycle was calculated by integrating the discharge currents (in Amperes) over the duration of time (in hours) it took to strip the electrodeposited iron from the working electrode. The coulombic efficiency (CE) is given as:

$$CE = \frac{\text{Total charge (Coulombs) during the discharge cycle}}{\text{Total charge (Coulombs) during the charge cycle}}$$

The control was the base electrolyte (no additive present) and had a CE of 71.4%. When an additive is present, a CE

Example 13

Linear Scan Voltammetry Plating Test: $FeCl_2$

A base electrolyte was created as 2M iron (II) chloride $FeCl_2$ water solution. The additives were added to 50 mL of the base electrolyte at the concentrations listed in Table 3. Additive-electrolyte solutions were maintained at 55° C. for the duration of the test. The working electrode was circular with a 3 mm diameter, 0.07 $cm^2$ area, glassy carbon electrode. The reference electrode was an Ag/AgCl electrode filled with a saturated KCl solution. The counter electrode was a 0.5 mm diameter platinum wire. Linear scan voltammetry (LSV) was performed at a scan rate of 1 mV/s from −0.5 to −1.2 V vs Ag/AgCl (saturated KCl). During the test, the glassy carbon electrode surface was video recorded. This allowed for the observation of the electrodeposition and, in some cases, the subsequent delamination of iron from the electrode surface. The control was the base electrolyte (no additive present) and in this case the Fe electrodeposition reaction and hydrogen evolution reaction (HER) occur simultaneously. Due to HER, the electrodeposited Fe has poor adhesion to the glassy carbon surface. In the control case, a significant amount of electrodeposited Fe started to delaminate at −0.89 V vs Ag/AgCl (saturated KCl). The delamination pattern and level of adherence seen on the glassy carbon surface was evaluated in the presence of additives. In Table 3 a score of * indicates that while delamination did eventually occur, there was some improvement in the adherence of electrodeposited Fe. A score of  means that there was visible cracking in the plated Fe, but complete delamination was not observed. A score of * means that there was strong adherence of the electrodeposited Fe to the glassy carbon surface and no delamination or cracking was observed throughout the test duration.

TABLE 13

Adherence of electrodeposited Fe to a glassy carbon surface in the presence of additives. The base electrolyte was 2M $FeCl_2$.

| Additive Structure | Additive Concentration (wt. %) | Plating |
|---|---|---|
| 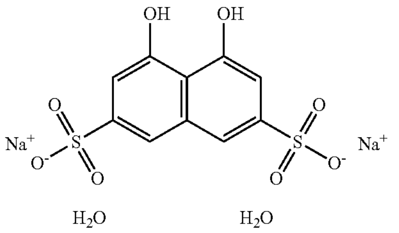 [SMILES: [Na+] ; O=S(=O)([O-])c1cc(O)c2c(O)cc(S(=O)(=O)[O-])cc2c1 ; [Na+] ; O ; O] | 0.05% | * |
| 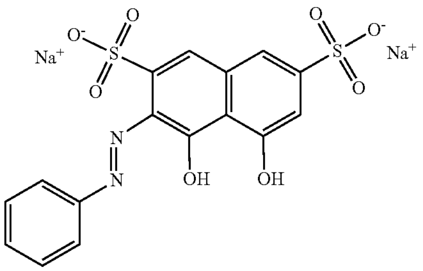 [SMILES: O=S(=O)([O-])c1cc(O)c2c(O)c(/N=N/c3ccccc3)c(S(=O)(=O)[O-])cc2c1 ; [Na+] ; [Na+]] | 0.01% | *** |
| 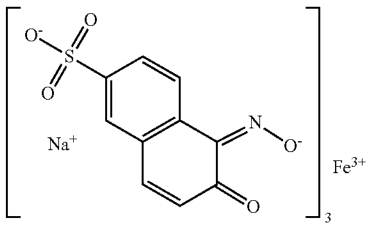 | 0.1% | ** |

(*) means adherence was somewhat improved in comparison to control, () means there was cracking but not complect delamination, and (*) means no cracking or delamination. Additive concentrations are given in a wt% defined as mass of additive per mass of electrolyte.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. An iron battery, comprising:

an aqueous electrolyte that comprises an additive present at 10 parts per million (ppm) to less than 50% weight percent (w/w) of the aqueous electrolyte, wherein the additive is according to Formula XI:

$$Ar^2—N=N—Ar^1 \quad (XI)$$

wherein $Ar^1$ and $Ar^2$ are independently selected from phenyl or naphthyl, and independently optionally substituted with at least one substituent selected from a halogen, $C_{1-6}$alkoxy, $C_{1-6}$alkyl, NO, $NO_2$, $N_2^+$, $N(R^{20})_2$, $OR^{45}$, $CO_2R^{45}$, $SO_2R^{55}$, or $SO_3R^{30}$, or combinations thereof;

wherein $R^{20}$ is independently H, $C_{1-6}$alkyl, $C(O)R^{60}$, wherein $R^{60}$ is H, $C_{1-6}$alkyl, or $C_{1-6}$alkoxy;

wherein $R^{45}$ is absent, H, $C_{1-6}$alkyl, or combinations thereof;

wherein $R^{55}$ is H, $O^-$, OH, $C_{1-6}$alkyl, $C_{1-6}$alkoxy, $C_{5-8}$aryl, $C_{5-8}$heteroaryl, or combinations thereof;

wherein $R^{30}$ is absent or H;

wherein the iron battery is an iron-air, iron-chloride, iron-chromium, iron-zinc, or iron-sodium.

2. The iron battery of claim 1, wherein at least one or both of $Ar^1$ and $Ar^2$ are substituted with at least one $SO_3R^{30}$.

3. The iron battery of claim 1, wherein the additive is according to one of the following structures:

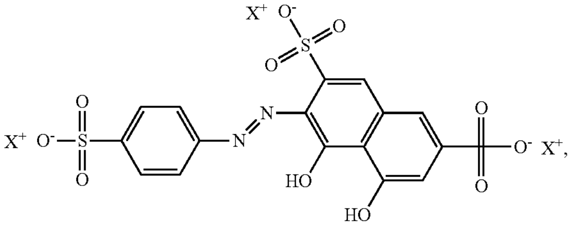

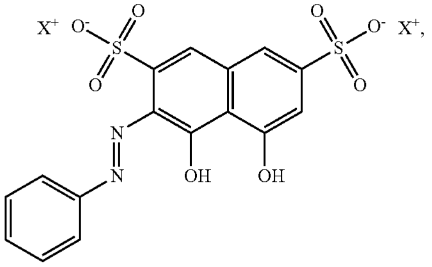

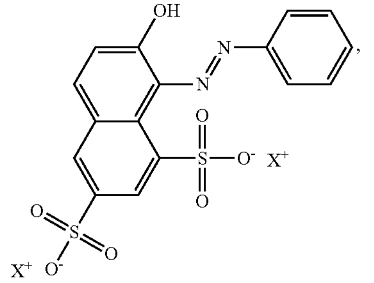

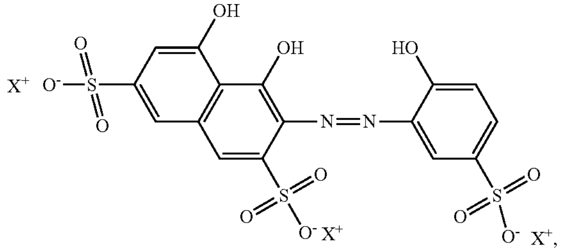

-continued
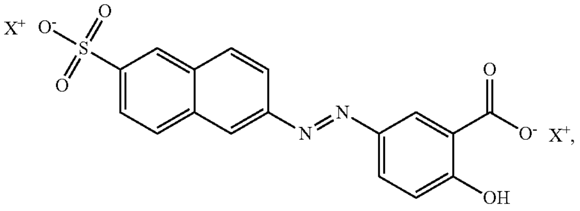
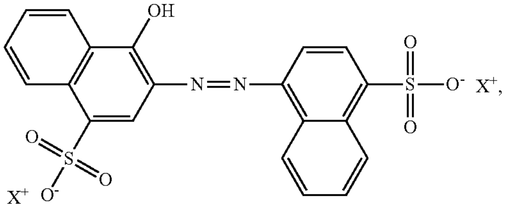
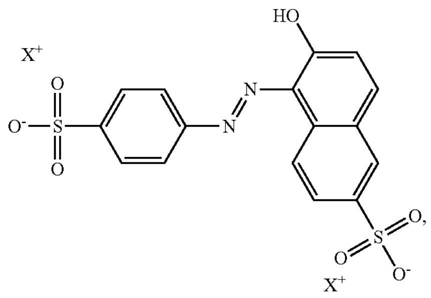
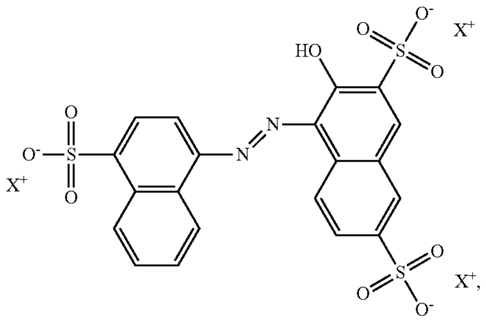
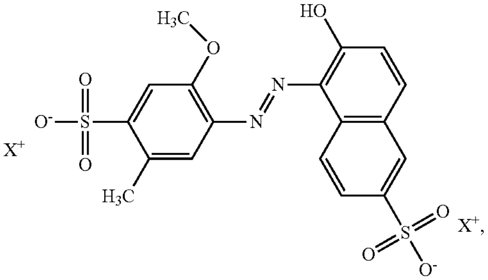
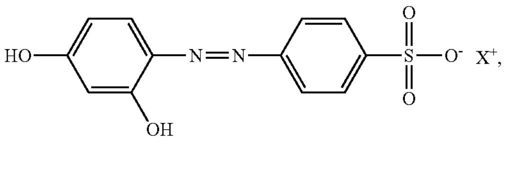
-continued
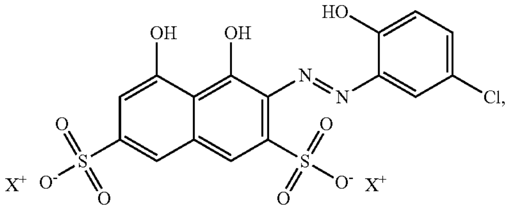
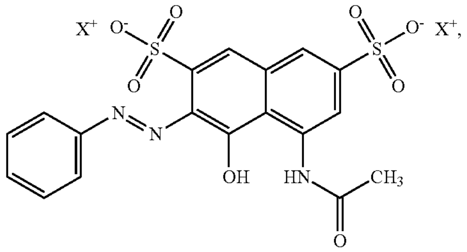
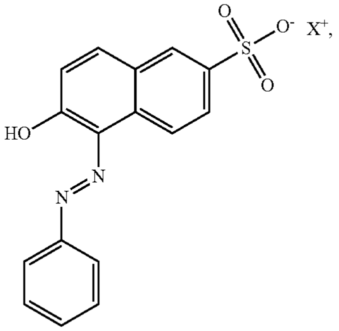
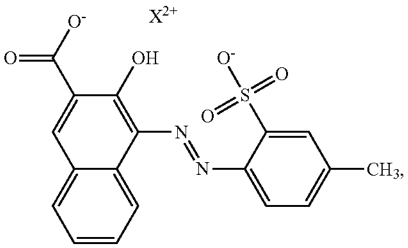
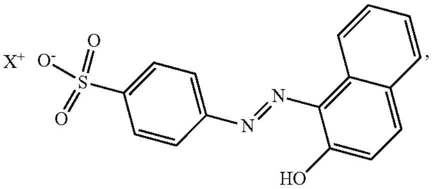
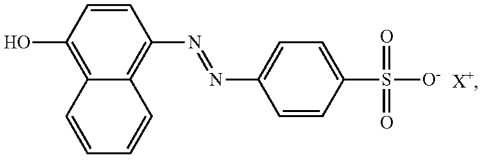

-continued

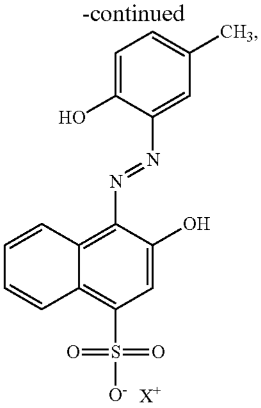

,

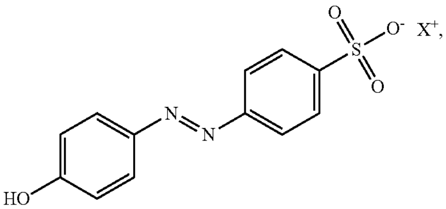

,

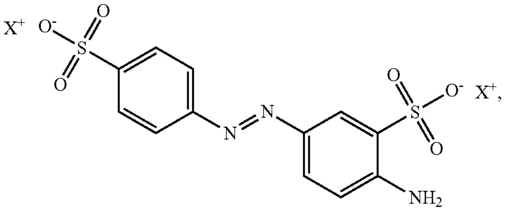

, or

-continued

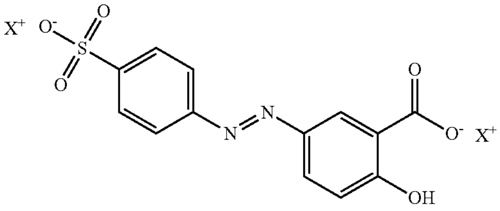

wherein $X^+$ is $Li^+$, $Na^+$, $K^+$, $Mg^{2+}$, $Ca^{2+}$, $Fe^{3+}$, $H^+$, or combinations thereof.

4. The iron battery of claim 1, wherein the additive is present at a concentration of 10 ppm to 5% w/w.

5. The iron battery of claim 1, wherein the additive is present at a concentration of 10 ppm to 4% w/w.

6. The iron battery of claim 1, wherein the additive is present at a concentration of 10 ppm to 3% w/w.

7. The iron battery of claim 1, wherein the additive is present at a concentration of 10 ppm to 2% w/w.

8. The iron battery of claim 1, wherein the additive is present at a concentration of 10 ppm to 100 ppm.

9. The iron battery of claim 1, wherein the additive is present at a concentration of 50 ppm to 5% w/w.

10. The iron battery of claim 1, wherein the additive is present at a concentration of 10 ppm, 50 ppm, 100 ppm, 500 ppm, 1000 ppm, 0.1 wt %, 0.5 wt %, 1% w/w, 4% w/w, 5% w/w, or 10% w/w.

* * * * *